United States Patent [19]

Yamaguchi et al.

[11] Patent Number: 5,546,598
[45] Date of Patent: Aug. 13, 1996

[54] WORKING SITUATION MANAGEMENT APPARATUS

[75] Inventors: Takao Yamaguchi; Masahiro Hamada, both of Osaka, Japan

[73] Assignee: Matsushita Electric Industrial Co., Ltd., Kadoma, Japan

[21] Appl. No.: 190,982

[22] Filed: Feb. 2, 1994

[30] Foreign Application Priority Data

| Feb. 4, 1993 | [JP] | Japan | 5-017250 |
| Jun. 21, 1993 | [JP] | Japan | 5-148899 |
| Jul. 30, 1993 | [JP] | Japan | 5-189984 |
| Jul. 30, 1993 | [JP] | Japan | 5-189985 |

[51] Int. Cl.⁶ ............................ G06F 13/00; G06F 15/16
[52] U.S. Cl. ............ 395/800; 395/200.01; 364/940; 364/284
[58] Field of Search ............................ 395/200, 325, 395/650, 800

[56] References Cited

U.S. PATENT DOCUMENTS

| 4,414,621 | 11/1983 | Bown et al. | 364/200 |
| 4,791,566 | 12/1988 | Sudama et al. | 364/200 |
| 5,027,198 | 6/1991 | Yoshioka | 358/85 |
| 5,129,061 | 8/1992 | Wang et al. | 395/200 |
| 5,138,704 | 8/1992 | Takahashi et al. | 395/325 |
| 5,155,857 | 10/1992 | Kunisaki et al. | 395/800 |
| 5,165,020 | 11/1992 | Sudama et al. | 395/200 |
| 5,208,912 | 5/1993 | Nakayama | 395/200 |
| 5,214,760 | 5/1993 | Hammond | 395/250 |
| 5,280,583 | 1/1994 | Nakayama | 395/200 |

FOREIGN PATENT DOCUMENTS

| 4264976 | 9/1992 | Japan. |
| 4373386 | 12/1992 | Japan. |

OTHER PUBLICATIONS

Watabe et al; Journal of Information Processing Society of Japan, vol. 32, No. 9, pp. 1200–1209, Sep. 1991; "Multimedia Distributed Conferencing System Mermaid.".

N. Nakayama et al; Journal of Information Processing Society of Japan, vol. 32, No. 9, pp. 1190–1199, Sep. 1991; "Multiparty Telecommunicating System: ASSOCIA".

*Primary Examiner*—David Y. Eng
*Attorney, Agent, or Firm*—Renner, Otto, Boisselle & Sklar, P.L.L.

[57] ABSTRACT

A working situation management system which includes an input section for inputting information relating to working, and a detecting section for detecting an occurrence of a predetermined change in the input information. A producing section included in the system produces information indicating a time at which the predetermined change occurs and information specifying the predetermined change, in accordance with the detected predetermined change. A storing section stores the information indicating a time at which the predetermined change occurs and the information specifying the predetermined change, as a working situation.

27 Claims, 40 Drawing Sheets

| Voice block | Speaker | Start time | Voice block length (sec.) |
|---|---|---|---|
| No. 1 | Yamaguchi | 12 : 15 : 10 | 15 |
| No. 2 | Okamoto | 12 : 15 : 20 | 60 |
| No. 3 | Hamada | 12 : 16 : 00 | 20 |
| No. 4 | Yamaguchi | 12 : 16 : 05 | 30 |
| No. 5 | Okamoto | 12 : 17 : 00 | 40 |
| : | : | : | : |

Fig.13

| Event | Subject user | Time | Location |
|---|---|---|---|
| Change of video scene | Yamaguchi | 5/3 18:03 | Document camera |
| Absense of user | Okamoto | 5/3 18:01 | Personal camera |
| Change of video scene | Hamada | 5/3 18:02 | Document camera |
| Presence of user | Hamada | 5/4 12:00 | Personal camera |
| : | : | : | : |
| : | : | : | : |
| : | : | : | : |

Fig.14

| Event | Subject user | Time | Location |
|---|---|---|---|
| Magnifying zoom | Yamaguchi | 5/3 18:03 | Document camera |
| Locate focus close | Okamoto | 5/3 18:01 | Personal camera |
| Locate focus distantly | Hamada | 5/3 18:02 | Document camera |
| Reducing zoom | Hamada | 5/4 12:00 | Personal camera |
| Change video channel | Yamaguchi | 5/4 12:01 | From document camera to material video |
| Change video channel | Okamoto | 5/4 13:00 | From document camera to personal camera |
| ⋮ | ⋮ | ⋮ | ⋮ |

Fig.15

| Event | Subject user | Time | Location |
|---|---|---|---|
| Indication by mouse pointer | Yamaguchi | 5/3 18:00 | Material No.1 Chapter 1 |
| Indication on touch panel screen | Okamoto | 5/3 18:01 | Material No.1 Chapter 1 |
| Indication on screen by light-pen | Hamada | 5/3 18:02 | Material No.2 Chapter 3 |
| Window creation | Hamada | 5/4 12:00 | Material No.1 Chapter 1 |
| Window open | Yamaguchi | 5/4 12:01 | Material No.1 Chapter 1 |
| Window close | Okamoto | 5/4 13:00 | Material No.2 Chapter 3 |
| Window destruction | Yamaguchi | 5/4 13:05 | Material No.2 Chapter 3 |
| Make a note in materials | Yamaguchi | 5/4 13:02 | Material No.2 Chapter 3 |
| ⋮ | ⋮ | ⋮ | ⋮ |

Fig.16

RANGE INDICATED BY THE USER

THE CIRCUIT BOARD IS DESIGNED

IN VIEW OF THE SAFETY, THE LOW COST—

Fig.24A

| NAME OF USER WHO MAKES INDICATION | INDICATION TIME ZONE | INDICATED RANGE |
|---|---|---|
| YAMAGUCHI | 10:00→10:01 | sample 1.doc, lines 5 to 10 |
| HAMADA | 10:10→10:11 | sample 2.doc, lines 8 to 13 |
| OKAMOTO | 10:00→10:02 | sample 3.doc, lines 1 to 10 |
| YAMAGUCHI | 10:03→10:04 | sample 1.doc, lines 3 to 15 |
| ⋮ | ⋮ | ⋮ |

Fig.24B

| TITLE | SUBJECT PERSON | TIME ZONE | PERSONAL MEMORANDUM |
|---|---|---|---|
| HARDWARE | YAMAGUCHI | 11:00 -> 11:05 | MAKE THE ISSUES CLEAR |
| CIRCUIT BOARD | HAMADA | 11:02 -> 11:06 | NONE |
| SOFTWARE | OKAMOTO | 11:02 -> 11:10 | DETERMINE THE SPECIFICATION AS SOON AS POSSIBLE |
| ⋮ | ⋮ | ⋮ | ⋮ |
| ⋮ | ⋮ | ⋮ | ⋮ |

| Speaker | Time zone | Speaker contents |
|---------|-----------|------------------|
| Yamaguchi | 10:00 → 10:01 | Circuit board |
| Hamada | 10:01 → 10:02 | Softwave |
| Okamoto | 10:01 → 10:02 | Server |
| ⋮ | ⋮ | ⋮ |

| Rule No. | Determination Rule for keyword attached to video voice information |
|---|---|
| 1 | Give priority to keyword in memorandum |
| 2 | Give priority to keyword at indicated position of document |
| 3 | Give priority to keyword in materials |
| 4 | Give priority to keyword obtained from conversation (voice information) |
| 5 | Give priority to keyword extracted by using keyword evaluation value |
| 6 | : |
| 7 | : |

Keyword evaluation value (U) = Keyword occurrence ratio (U)

Keyword overall evaluation value considering keyword extracting section = $\sum_U$ Keyword occurrence ratio (U) × Evaluation for the extracting section (U)

Keyword significance (U) = $\dfrac{\sum_{\text{Video (Voice) block}} \text{Keyword evaluation value (U)}}{\sum_{\text{Video (Voice) block}} \text{Keyword occurrence time (U.L)}}$ Keyword overall significance considering keyword extracting section = $\sum_U$ keyword significance (U) × Evaluation for the extracting section (U)

U: Keyword extracting section
        Document keyword extracting section
        Indication keyword extracting section
        Personal keyword extracting section
        Title keyword extracting section
        Voice keyword extracting section L: Time zone to be evaluated as to keyword significance
        Only sound portion, all intervals in which materials are used, interval in which wording situation information exists, any interval indicated by user, etc.

Keyword occurrence ratio (U)

= $\dfrac{\text{Occurrence frequency of specific keyword in extracting section (U)}}{\text{Total number of keyword candidates obtained by extracting section (U)}}$ Evaluation for extracting section (U)
    For example,
        as evaluation for extracting section, a continuous amount between values 0 and 1, or discrete values 0 and 1

Fig.31

Fig.32 (1)
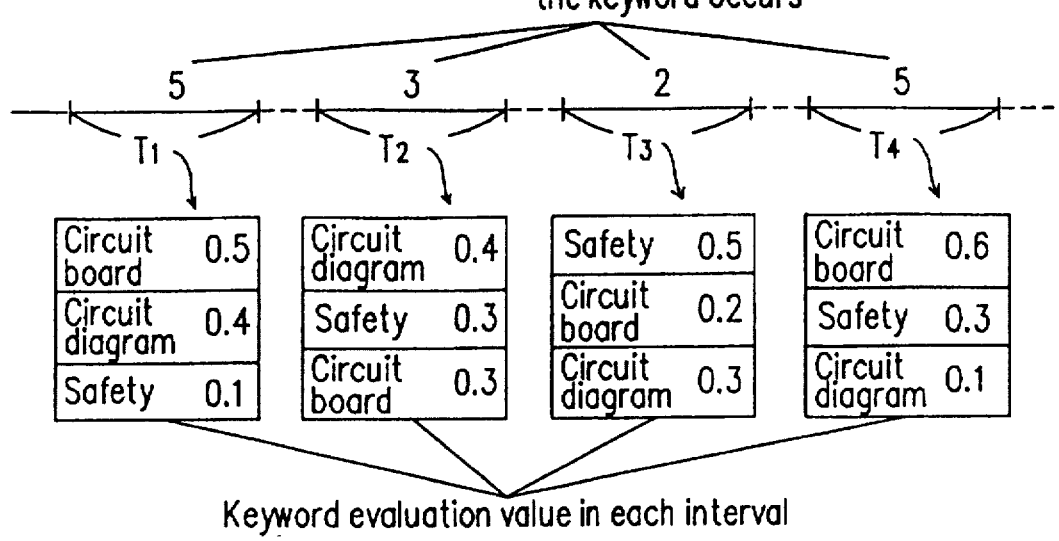
Fig.32 (2)
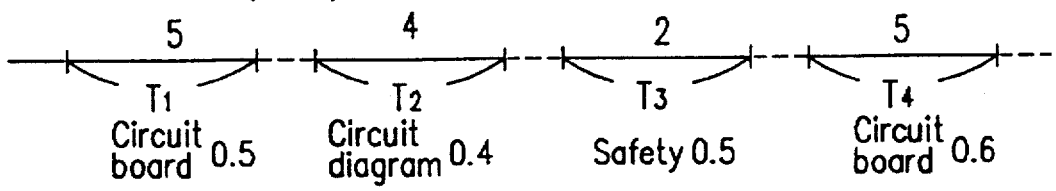
Fig.32 (3) Constrain for number of keywords (keyword significance)
| Keyword | Evaluation value |
|---|---|
| Circuit board | (0.5+0.6)/(5+5) = 0.11 |
| Circuit diagram | 0.4 / 4 = 0.1 |
| Safety | 0.5 / 2 = 0.25 |
| Presentation order of keywords | |
|---|---|
| 1 | Safety |
| 2 | Circuit board |
| 3 | Circuit diagram |

| Rule No. | Keyword integration rule in conflicting interval |
|---|---|
| 1 | Evaluate from lengths of video (voice) blocks |
| 2 | Evaluate from start times of video (voice) blocks |
| 3 | Evaluate values based on information on working situation |
| 4 | Evaluate from frequency information of keywords |
| 5 | . |

Attribute information to video (voice) block

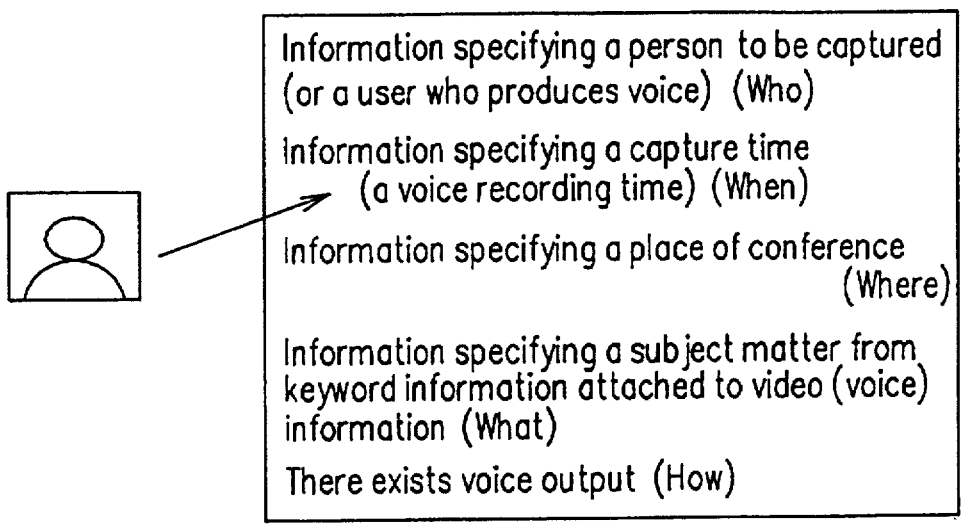

Information specifying a person to be captured (or a user who produces voice) (Who)

Information specifying a capture time (a voice recording time) (When)

Information specifying a place of conference (Where)

Information specifying a subject matter from keyword information attached to video (voice) information (What)

There exists voice output (How)

Fig. 39A

Documentation rules

| 1 | Do not document no sound interval |
|---|---|
| 2 | A series of video frames in which specific status attribute exists |
| 3 | When change of video scene and voice block occur, produce "Explanation with document camera" |

Fig. 39B

Example of documentation

Mr. Yamaguchi talked regarding ΔΔ at about ΟΟ o'clock

Information on "Who" — Information on "How" — Information on "What" — Information on "When"

Fig. 39C

| Keyword | Subject group | User | Time & Date | Item name | Retrieved document name | Adoption result |
|---|---|---|---|---|---|---|
| Yamaguchi | Budget conference | Hamada | 5/1 18:00 | Who | abc..doc | Adopted |
| Document camera | System conference | Yamaguchi | 5/1 18:01 | What | bcd..doc | Not adopted |
| Design drawing | System conference | Okamoto | 5/2 13:30 | Free keyword | cde..doc | Adopted |
| Countermeasure | Budget conference | Yamaguchi | 5/2 13:40 | Why | abc..doc | Not adopted |
| Video material 1 | Project conference | Hamada | 5/1 18:02 | What | bcd..doc | Adopted |
| .. | .. | .. | .. | .. | .. | .. |
| .. | .. | .. | .. | .. | .. | .. |

Fig. 42

| Rule No. | Priority rule in the case where a plurality of video blocks exist |
|---|---|
| 1 | To preferentially select video block which starts earlier along time axis |
| 2 | To preferentially select video block which starts latest along time axis |
| 3 | To preferentially select video block which is the longest |
| 4 | To preferentially select video block which is the shortest |
| 5 | To preferentially select video block which includes a larger amount of information on change of situation in one unit time |
| 6 | To preferentially select video block which matches combination rule of events |
| 7 | To preferentially select video block corresponding to document information which includes the designated keyword |
| 8 | To preferentially select video block corresponding to document information which includes the largest number of designated keywords |
| 9 | To preferentially select video block which includes information on the designated change of situation |
| 10 | To preferentially select video block of the designated subject person |
| . . . | . . . |

Fig. 47

| EVENT NAME | COMBINATION OF EVENTS |
|---|---|
| EXPLANATION WITH DOCUMENT CAMERA | CHANGE OF VIDEO SCENE AND VOICE BLOCK |
| EXPLANATION ON DISPLAY | INDICATION BY MOUSE POINTER AND VOICE BLOCK |
| EXPLANATION ON DISPLAY | INDICATION ON SCREEN BY LIGHT-PEN AND VOICE BLOCK |
| EXPLANATION ON DISPLAY | INDICATION ON TOUCH PANEL SCREEN AND VOICE BLOCK |
| CONTENTS OF CONFERENCE DURING ABSENCE | TIME ZONE FROM THE BEGINNING OF ABSENCE OF USER TO TIME WHEN THE USER RETURNS |
| CHANGE OF TOPICS (WINDOW) | TIME ZONE FROM THE OPEN OF A WINDOW TO THE CLOSE OF THE WINDOW |
| CHANGE OF TOPICS (CAMERA) | TIME ZONE FOR WHICH ONE AND THE SAME VIDEO CHANNEL IS SELECTED |
| ⋮ | ⋮ |
| ⋮ | ⋮ |

WORKING SITUATION MANAGEMENT APPARATUS

BACKGROUND OF THE INVENTION

1. Field of the Invention

The present invention relates to a working situation management apparatus for processing information in a single terminal or between a plurality of terminals, and for managing information in accordance with the working situation of a user.

2. Description of the Related Art

Recently, a network conference system which supports cooperative working such as conference and decision making by exchanging various kinds of information in real time has been proposed and constructed. For example, such systems are proposed in Warabe et al., "Multimedia Distributed Conferencing System: MERMAID", Journal of Information Processing Society of Japan, Vol. 32, No. 9 (1991), and Nakayama etal., "Multiparty Telecommunicating system: ASSOCIA", Journal of Information Processing Society of Japan Vol. 32, No. 9 (1991).

According to the conventional technique, one of the participants opens a window for personal use or for exchanging information between a plurality of terminals. Then, the participant edits and/or presents conference materials (i.e., documents including texts, images and graphics) in the window for a unit of document files. Therefore, after the conference, the participant has only the memorandum of the conference and the conference materials as the minutes of the conference. Dynamic information which is difficult to be handled systematically, such as the progress of a conference situation can not be left as the minutes of the conference (for example, the dynamic information includes such information as positional change of a finger of a participant who indicates the materials displayed by a camera with the finger). In view of the support of a user's memory, the conventional method is not sufficient.

In another method, a VTR or the like is used for recording the progress of the conference situation. If all the progress of the conference is captured by the VTR or the like, a huge amount of information is generated. Accordingly, after the conference, the user has a lot of trouble in performing the retrieval and editing of the captured video and voice information.

In addition, the purpose of a conventional CAI (computer-aided instruction) system is to commonly use the instructional aid materials between the teacher and the students, so as to provide a chance for conversation. Accordingly, by the conventional CAI system, it is difficult for a student to remember the contents of conversation from a personal viewpoint, and it is difficult for the teacher to create instructional aid materials which reflects the contents of previous conversation.

SUMMARY OF THE INVENTION

The working situation management apparatus of this invention includes an input section for inputting information relating to working; a detecting section for detecting an occurrence of predetermined change in the input information; a producing section for producing information indicating a time at which the predetermined change occurs and information specifying the predetermined change, in accordance with the detected predetermined change; a storing section for storing the information indicating a time at which the predetermined change occurs and the information specifying the predetermined change, as working situation.

According to another aspect of the invention, a system including a plurality of terminal devices and a working situation management apparatus which is connected to the plurality of terminal devices via a network is provided. Each of the plurality of terminal devices includes an input section for inputting information relating to working, and a transmitting section for transmitting the input information to the working situation management apparatus, and the working situation management apparatus includes: a receiving section for receiving the information from each of the plurality of terminal devices; a detecting section for detecting an occurrence of predetermined change in the received information; producing section for a producing information indicating a time at which the predetermined change occurs and information specifying the predetermined change, in accordance with the detected predetermined change; and a storing section for a storing the information indicating a time at which the predetermined change occurs and the information specifying the predetermined change, as working situation.

According to another aspect of the invention, a working situation management apparatus is provided. The apparatus includes: a storing section for storing information representing progress of working in time sequence; a time zone specifying section for specifying a time zone to which a keyword is to be attached among the time required for the working, based on the information representing the progress of working in time sequence stored in the storing section; a keyword candidate specifying section for specifying at least one keyword candidate for the time zone specified by the time zone specifying section; and a keyword determining section for selecting one keyword candidate from the at least one keyword candidate in accordance with a prescribed rule, and for determining the selected keyword candidate as a keyword corresponding to the time zone.

According to another aspect of the invention, a working situation management apparatus is provided. The apparatus includes: a storing section for storing information representing progress of working in time sequence; a retrieval keyword input section for inputting a retrieval keyword from a user: a retrieving section for retrieving the information representing the progress of working in time sequence stored in the storing section, based on the input retrieval keyword; retrieval keyword; a storing section for storing the input retrieval keyword and a retrieved result; and a retrieval keyword evaluating section for evaluating whether the retrieval keyword is proper, based on the retrieved result.

According to another aspect of the invention, a working situation management apparatus is provided. The apparatus includes: a video information dividing section for dividing first video information into a plurality of first video blocks, and for dividing second video information into a plurality of second video blocks; and a video block evaluating section for judging whether there are one of the plurality of first video blocks and one of the plurality of second video blocks existing in a certain time zone, and for, when it is judged that there are one of the plurality of first video blocks and one of the plurality of second video blocks existing in the time zone, determining which one of the video blocks existing in the time zone is preferentially selected in accordance with a prescribed rule, whereby the first video information and the second video information are integrated to produce one unit of video information.

According to the invention, various kinds of information produced by participants of the conference are managed by the working situation management apparatus. In addition, according to the invention, in order for the user to effectively use necessary information (materials, comments, progress of conference situation), it is possible to handle dynamic information which cannot be systematically handled, such as conversation situation.

Thus, the invention described herein makes possible the advantage of providing a working situation management apparatus which manages various information produced by users, and performs necessary information management in accordance with the working situation of a user.

This and other advantages of the present invention will become apparent to those skilled in the art upon reading and understanding the following detailed description with reference to the accompanying figures.

BRIEF DESCRIPTION OF THE DRAWINGS

FIG. 13 is a diagram showing information indicating working situation stored in a working situation storing section.

FIG. 14 is a diagram showing information indicating working situation stored in the working situation storing section.

FIG. 15 is a diagram showing information indicating working situation stored in the working situation storing section.

FIG. 16 is a diagram showing information indicating working situation stored in the working situation storing section.

FIG. 24A is a diagram illustrating a scene in which part of the material information is indicated by a user in the working.

FIG. 24B is a diagram showing exemplary information stored in the working situation storing section by the operation shown in FIG. 24A.

FIG. 31 is a diagram illustrating a method for calculating a keyword evaluation value.

FIG. 32 is a diagram illustrating a specific method for using the keyword evaluation value and a keyword significance.

FIGS. 39A to 39C are diagrams illustrating a method for producing character information indicating the working situation.

FIG. 42 is a diagram showing exemplary information stored in a retrieval keyword storing section.

FIG. 47 is a diagram illustrating priority rules for preferentially selecting one video block.

FIG. 51 is a diagram showing combination rules of events.

DESCRIPTION OF THE PREFERRED EMBODIMENTS

Hereinafter, the present invention will be described by way of examples with reference to the accompanying drawings.

Figure 1A:
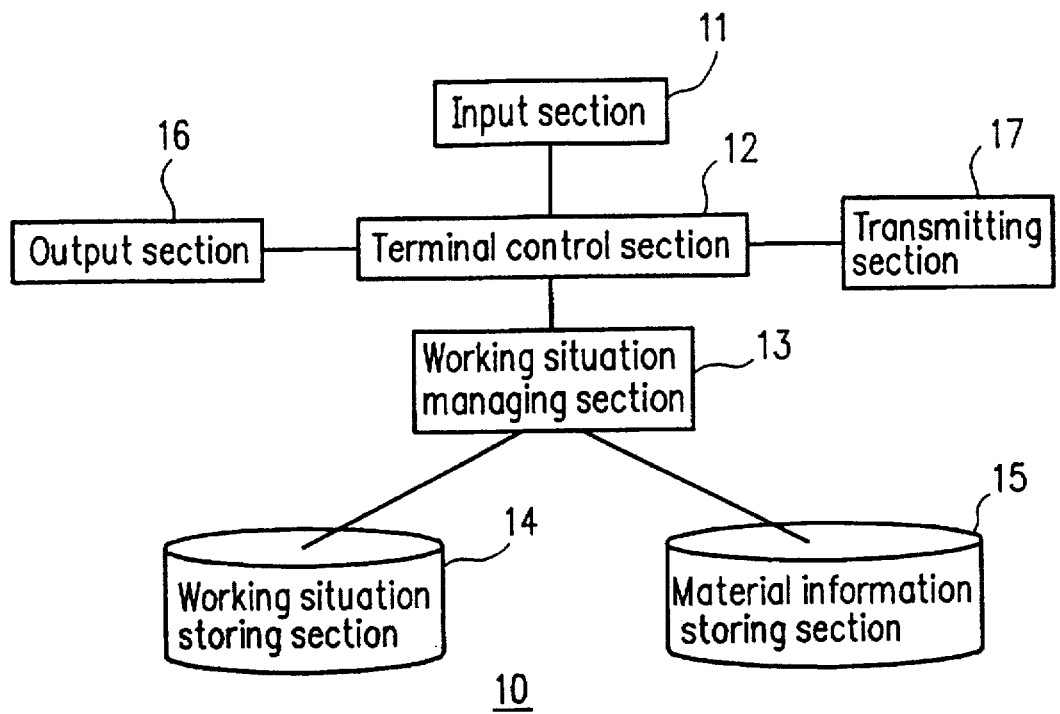
FIG. 1A is a diagram showing a construction of a working situation management apparatus according to the invention.

FIG. 1A shows a construction of a working situation management apparatus 10 of an example of the invention. The working situation management apparatus 10 includes an input section 11 for inputting information on working, a working situation managing section 13 for managing the working situation by a user, a working situation storing section 14 for storing material information on materials, and a terminal control section 12 for controlling the input section 11 and the working situation managing section 13. Typically, the term "working" means the act that one or more users present materials and explain the materials. Specifically An this specification, the typical working is assumed to be the teleconference in which a plurality of users examine the common materials and exchange views with each other on the materials in a real-time manner. However, it is appreciated that the working described in this specification is not limited to the specific case. In this specification, the term "working situation" means time-series collective information indicating how the working progressed. The term "material information" means the information on the materials presented by the users in the working.

Figure 1B:
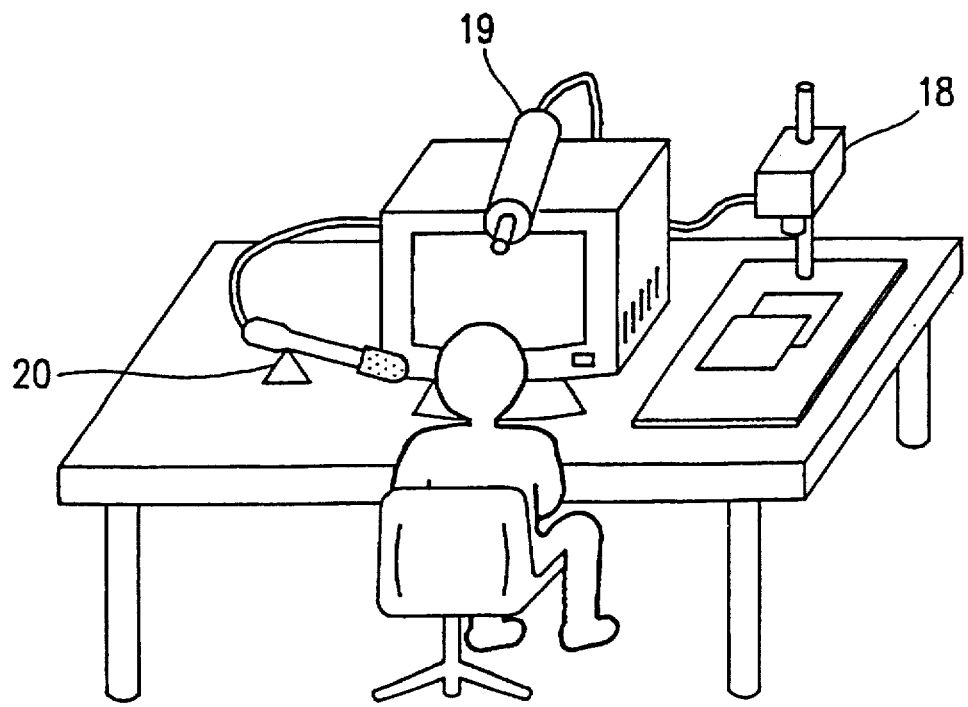
FIG. 1B shows an exemplary working scene.

FIG. 1B shows a typical working scene in which a user presents materials and explains the materials. The user sits in front of the working situation management apparatus and explains materials. To the working situation management apparatus, a camera 18 for capturing the material (hereinafter referred to as "a document camera"), a camera 19 for capturing the user (hereinafter referred to as "a personal camera"), and a microphone 20 for capturing the voice uttered by the user are connected. The video information captured by the document camera 18 and the personal camera 19 and the voice information captured by the microphone 20 are supplied to the terminal control section 12 via the input section 11 of the working situation management apparatus. In this way, the information indicating the progress of working such as the expression of the user during the explanation, the contents of the materials, and the presentation sequence of the materials is input into the working situation management apparatus. For the input section 11, a keyboard, a mouse, a digitizer, a touch panel, and a light-pen may be used.

As described above, to the terminal control section 12, various input devices can be connected as the input section 11. In the terminal control section 12, identifiers for specifying the input devices connected to the terminal control section 12 are previously set. When units of information are input from several input devices, the terminal control section 12 identifies an input device from which a certain unit of information is input, based on the identifiers which are previously set. For example, when the video information captured by the personal camera 19 is supplied to the terminal control section 12, the terminal control section 12 outputs an identifier for specifying the personal camera 19 and the video information as a pair.

The working situation managing section 13 detects any occurrence of predetermined change in the input information. When plural units of information are input into the working situation managing section 13, the working situation managing section 13 detects any occurrence of predetermined change in each of the plural units of information. The predetermined change may be a change common to the plural units of information, or changes different from each other for the plural units of information. When the working situation managing section 13 detects the occurrence of predetermined change in the input information, the time at which the predetermined change occurs and the information specifying the predetermined change are stored in the working situation storing section 14 as the working situation. By storing such information in the working situation storing section 14, it is possible to retrieve a desired point in the working by using the predetermined change in the specific information as a retrieval key. In addition, the input voice information and the video information itself are also stored in the working situation storing section 14 as the working situation.

A material information storing section 15 stores the material information. For the material information storing section 15, a device such as a magnetic disk, a VTR, an optical disk or the like is used.

The working situation management apparatus 10 may further includes an output section 16 for outputting the working situation and the material information, and a transmitting section 17 for connecting the working situation management apparatus to another apparatus via a network. For the output section 16, a device such as a display, a speaker, a printer, or the like is used. For the transmitting section 12, a device such as a local area network (LAN), a cable television (CATV), a modem, a digital PBX, or the like is used.

Figure 2:
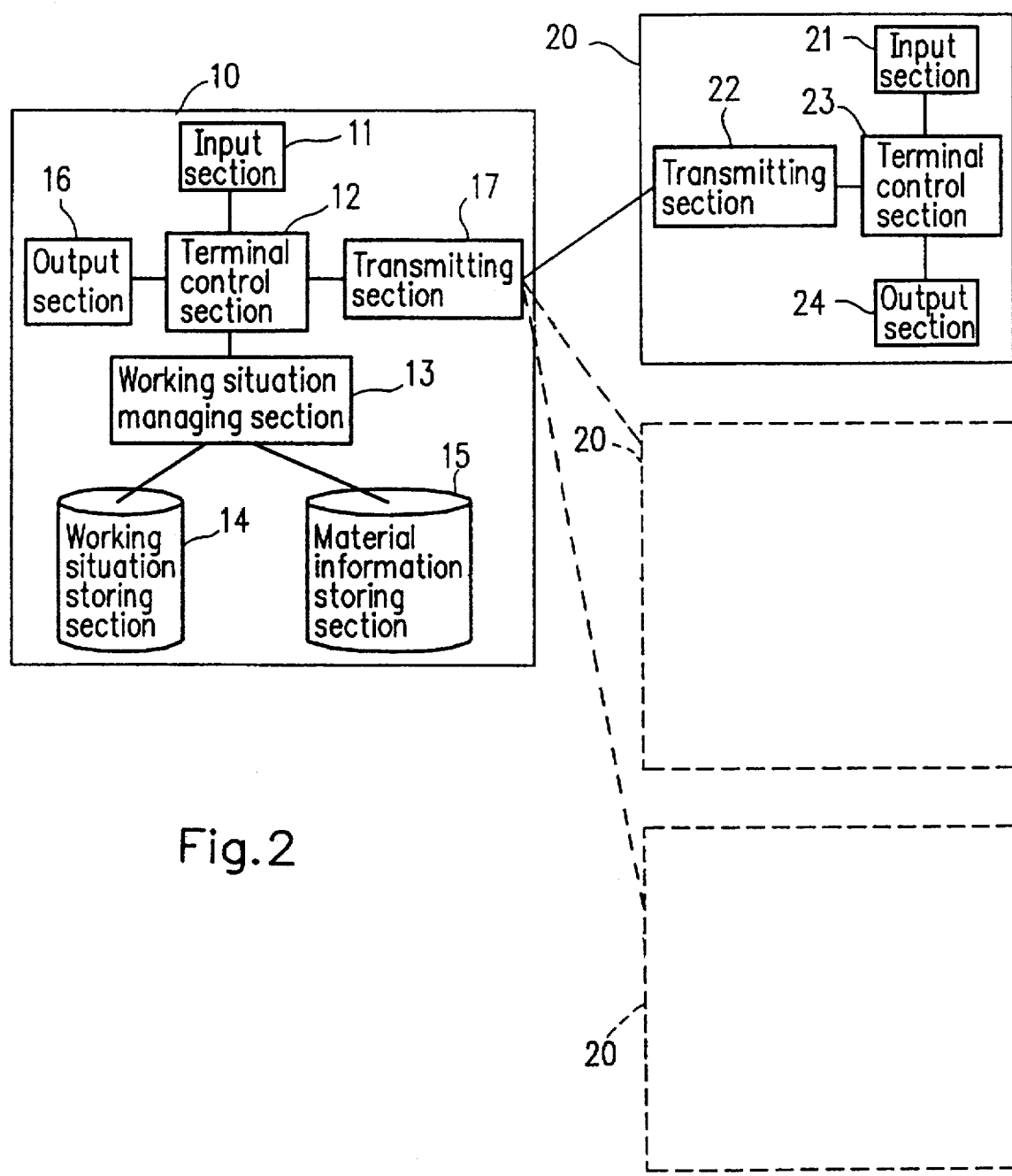
FIG. 2 is a diagram showing a construction of a system including a plurality of terminal devices and a working situation management apparatus which are connected via a network.

FIG. 2 shows the working situation management apparatus 10 which is connected to a plurality of terminal devices 20 via the network. Each of the terminal devices 20 includes an input section 21 for inputting information on the working, a transmitting section 22 for connecting the terminal device to the working situation management apparatus via the network, an output section 24 for outputting the working situation and the material information, and a terminal control section 23 for controlling the input section 21, the transmitting section 22 and the output section 24.

The information input from the input section 21 of the terminal device 20 is supplied to the terminal control section 12 of the working situation management apparatus 10 via the transmitting section 22 and the transmitting section 17. In the terminal control section 12, identifiers for specifying the input devices connected to the terminal control section 12 via the network and the input devices directly connected to the terminal control section 12 are previously set. When units of information are input from several input devices, the terminal control section 12 identifies an input device from which a certain unit of information is input, based on the identifiers which are previously set. In this way, various units of information indicating the time-series progress of working are collected from each of the plurality of terminal devices 20 used by the plurality of users. For the input section 21 of the terminal device 20, a device such as a keyboard, a mouse, a digitizer, a touch panel, a lightpen, a camera, a microphone, or the like is used. For the output section 24 of the terminal device 20, a device such as a display, a speaker, a printer, or the like is used. For the transmitting section 22 of the terminal device 20, a device such as a local area network (LAN), a cable television (CATV), a modem, a digital PBX, or the like is used.

Figure 3:
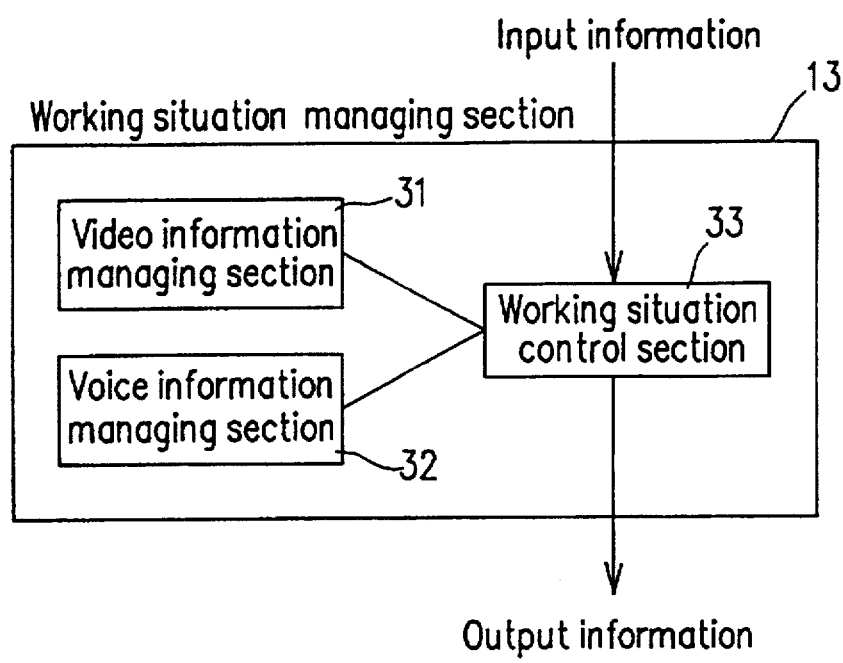
FIG. 3 is a diagram showing a construction of a working situation managing section.

FIG. 3 shows an exemplary construction of the working situation managing section 13. The working situation managing section 13 includes a video information managing section 31 for managing the changes in the video information, a voice information managing section 32 for managing the changes in the voice information, and a working situation control section 33 for controlling the video information managing section 31 and the voice situation control section 32. In this specification, the "video information" includes any information on video of the information indicating the time-series progress of working. For example, the video image constituted of a plurality of frames captured by the camera is included in the video information, and also control signals produced by the camera operations are also included in the video information. In this specification, the "voice information" includes any information on voice of the information indicating the time-series progress of working. For example, the voice signals produced by the microphone are included in the voice information.

The video information input from the input section 11 is input into the video information managing section 31 via the working situation control section 33. The video information managing section 31 detects any occurrence of predetermined change in the input video information, and produces information indicating the time at which the predetermined change occurs, and information specifying the predetermined change.

The voice information input from the input section 11 is also input into the voice information managing section 32 via the working situation control section 33. The voice information managing section 32 detects any occurrence of predetermined change in the input voice information, and produces information indicating the time at which the predetermined change occurs, and information specifying the predetermined change.

In the working situation managing section 13 shown in FIG. 3, the object to be managed as the working situation is limited to the video information and the voice information. As a result, the working situation managing section 13 has an advantage that it can be easily reduced in size, because it does not necessitate a display device, displaying windows, and an input device for giving instructions to the windows. By extending the function of the usual VTR apparatus, it will be able to realize a working situation management apparatus having a size substantially equal to that of the usual VTR apparatus. In addition, since the video information can be used, it becomes possible to record information on expression of a participant of the conference and information on 3D shape which is difficult to be taken into a computer. Accordingly, in the conference with tactics in which the expression of the participants on the other side is an important factor, and in the case where the assembling process and the operation process of a 3D shape which is difficult to be taken into a computer, it is preferred that the working situation managing section 13 includes the video information managing section 31.

Figure 4:
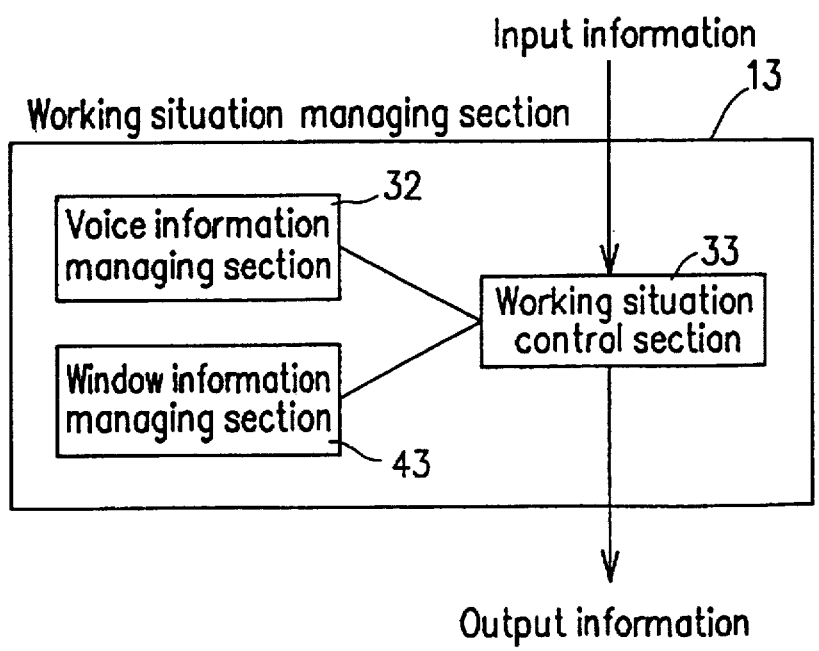
FIG. 4 is a diagram showing another construction of a working situation managing section.

FIG. 4 shows another exemplary construction of the working situation managing section 13. The working situation managing section 13 includes a voice information managing section 32 for managing the changes in the voice information, a window information managing section 43 for managing the change in window information, and a working situation control section 33 for controlling the voice information managing section 32 and the window information managing section 43. In this specification, the term "window information" means information indicating the resources provided for the windows. For example, the window information includes the number of windows, the sizes of windows, and the positions of windows. When the window information is changed by the operation of the user, a control signal indicating the change in the window information is input into the window information managing section 43 via the input section 11. The change in the window information by the operation of the user is detected by the terminal control section 12. A portion of the terminal control section 12 in charge of the detection of the window information is generally called a window managing portion (not shown). The window information managing section 43 receives the input control signal, and produces information indicating the time at which the control signal is received, and information specifying the control signal. The information produced by the window information managing section 43 is sent to the working situation control section 33, and stored in the working situation storing section 14 under the control of the working situation control section 33. By storing the changes in window information by the user during the working of the user, the voice information and the video information can be retrieved by using any window operation by the user during the working of the user as a retrieval key. As a result, the user can easily recall important parts in the progress of working.

In the working situation managing section 13 shown in FIG. 4, the video information which requires a large memory capacity is not stored in the working situation storing section 14. Therefore, it is advantageous that the amount of information stored in the working situation storing section 14 can be greatly reduced. The construction of the working situation managing section 13 shown in FIG. 4 is suitable for the case where the situation of conference is to be recorded for the conference in which users are assembled in one place such as a conference room, or for the case for realizing a working situation management apparatus by extending the function of a usual telephone which mainly handles the voice information.

Figure 5:
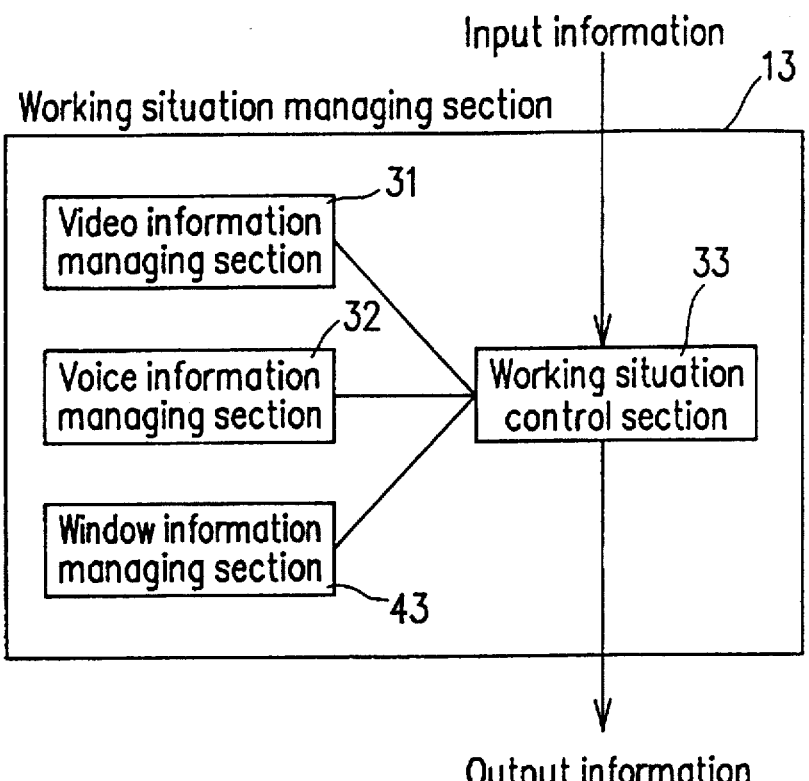
FIG. 5 is a diagram showing another construction of a working situation managing section.

FIG. 5 shows another exemplary construction of the working situation managing section 13. In the construction, a video information managing section 31 for managing the changes in the video information is added to the construction shown in FIG. 4. With the construction, it is possible to integrally manage the video information and the voice information in the real space, and the window information as the resources in the computer.

Figure 6:
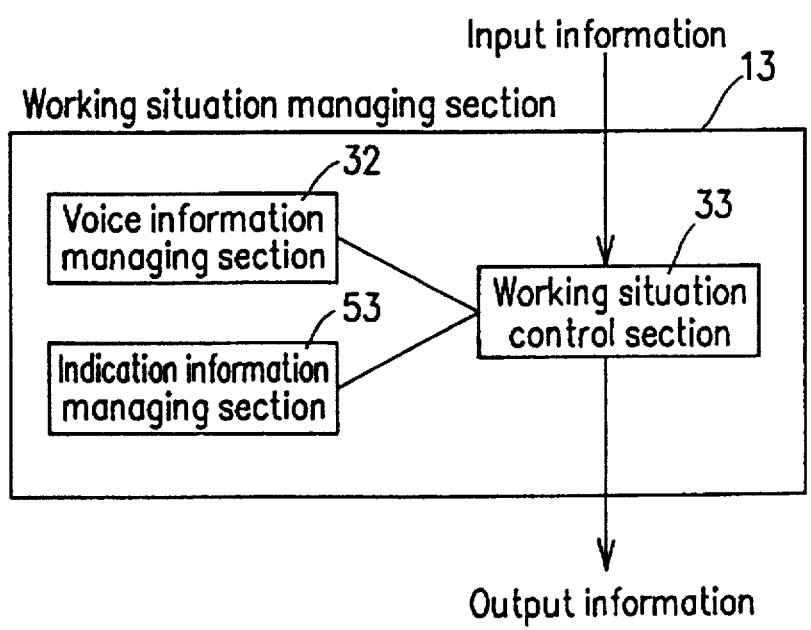
FIG. 6 is a diagram showing another construction of a working situation managing section.

FIG. 6 shows another exemplary construction of the working situation managing section 13. The working situation managing section 13 includes a voice information managing section 32 for managing the changes in the voice information, an indication information managing section 53 for managing changes in indication information, and a working situation control section 33 for controlling the voice information managing section 32 and the indication information managing section 53. In this specification, the term "indication information" means information indicating any indication to the material information. For example, the indication information includes the coordinate position detected by the position of a mouse pointer or a touch panel.

The indication information input from the input section 11 is input into the indication information managing section 53 via the working situation control section 33. The indication information managing section 53 detects any occurrence of predetermined change in the input indication information, and produces information indicating the time at which the predetermined change occurs, and information specifying the predetermined change.

By the working situation managing section 13 shown in FIG. 6, it is possible to detect a part at which both the change in the indication information and the change in the voice information simultaneously occur. Accordingly, the user can easily perform the retrieval operation for the conference situation based on the position of the materials which is explained by the user. The reason is that, when a person wants to explain a certain matter (materials), the person is likely to indicate a part of the materials at the same time when he or her utters a voice. In the working situation managing section 13 shown in FIG. 6, the same as in the working situation managing section 13 shown in FIG. 4, the video information which requires a large memory capacity is not stored in the working situation storing section 14. Therefore, it is advantageous that the amount of information stored in the working situation storing section 14 can be greatly reduced. The construction of the working situation managing section 13 shown in FIG. 6, the same as the construction of the working situation managing section 13 shown in FIG. 4, is suitable for the case where the situation of conference is to be recorded for the conference in which users are assembled in one place such as a conference room, or for the case for realizing a working situation management apparatus by extending the function of a usual telephone which mainly handles the voice information. Moreover, the construction of the working situation managing section 13 shown in FIG. 6 is suitable for the working which requires a reduced number of operations for windows, as compared with the construction of the working situation managing section 13 shown in FIG. 4. For example, the construction of the working situation managing section 13 shown in FIG. 6 is suitable for the conference of a report type in which writing into the materials does not often occur.

Figure 7:
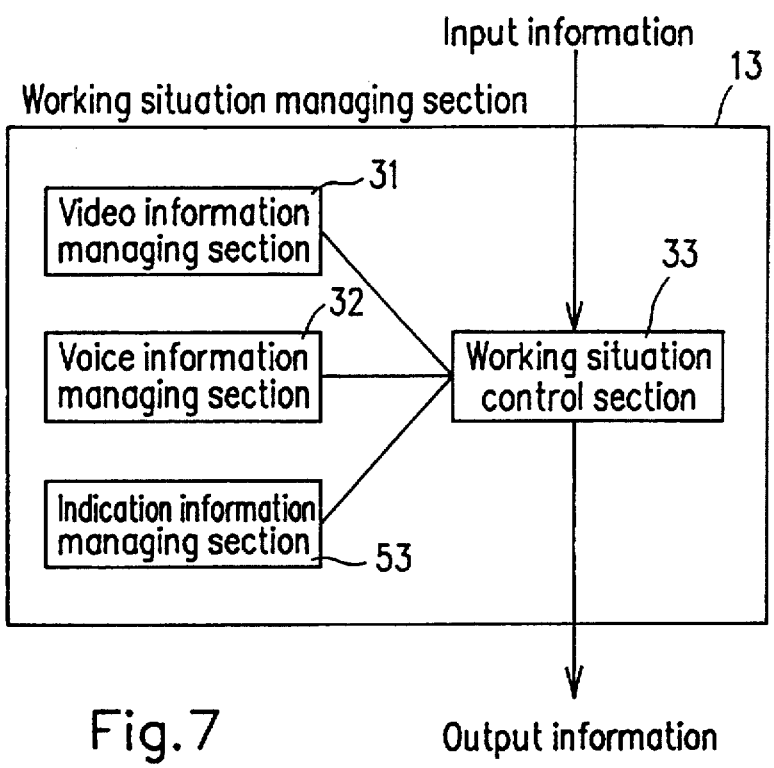
FIG. 7 is a diagram showing another construction of a working situation managing section.

FIG. 7 shows another exemplary construction of the working situation managing section 13. In the construction, a video information managing section 31 for managing the changes in the video information is added to the construction shown in FIG. 6. With the construction, it is possible to integrally manage the video information and the voice information in the real space, and the window information as the resources in the computer.

Figure 8:
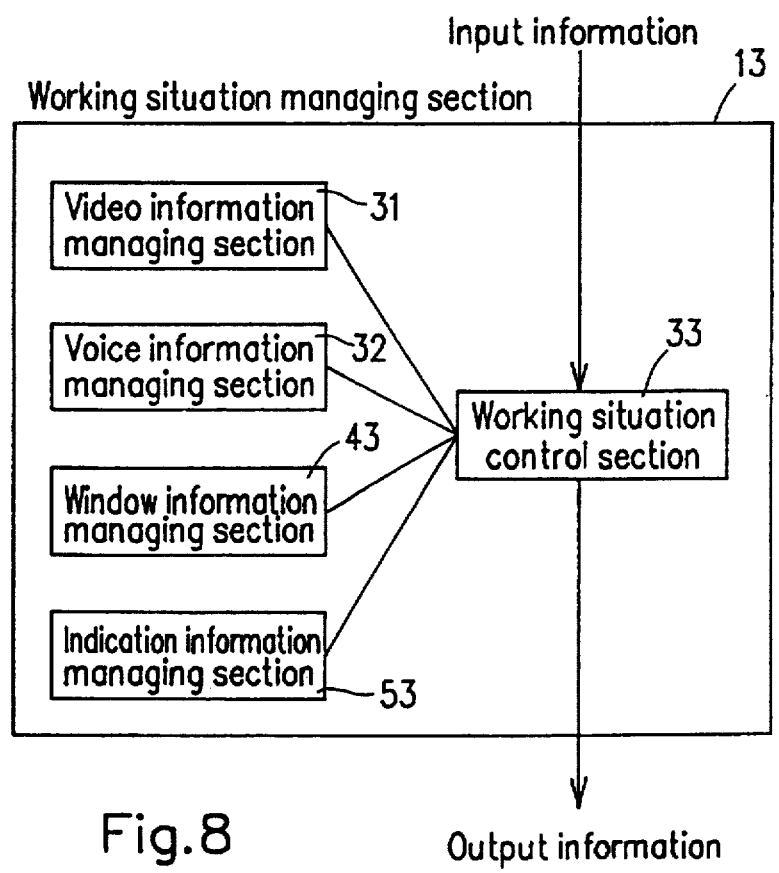
FIG. 8 is a diagram showing another construction of a working situation managing section.

FIG. 8 shows another exemplary construction of the working situation managing section 13. The construction is an integral construction of the constructions shown in FIGS. 3 to 7. With the construction, the advantages of the above-described respective constructions can be advantageously obtained.

Figure 9:
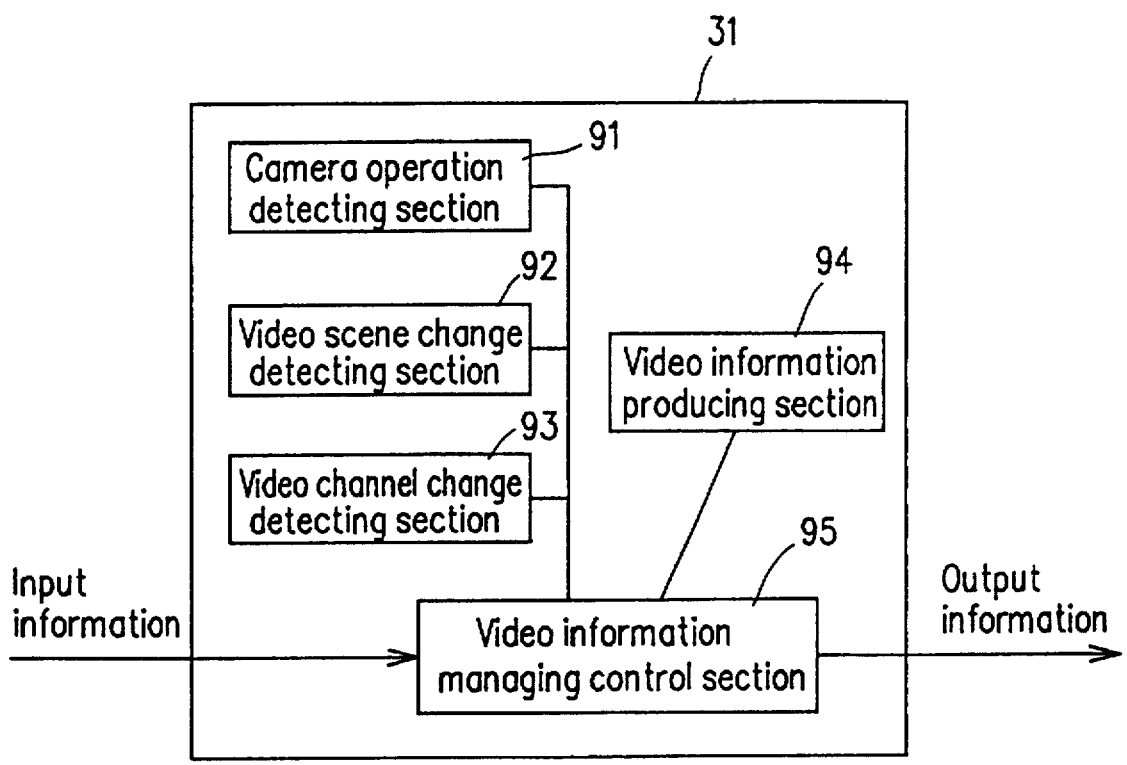
FIG. 9 is a diagram showing a construction of a video information managing section.

FIG. 9 shows an exemplary construction of the video information managing section 31. The video information managing section 31 includes a camera operation detecting section 91 for detecting a camera operation, a video scene change detecting section 92 for detecting changes of video scene, a video channel change detecting section 93 for detecting changes of video channel, a video information producing section 94 for producing, according to a change in video information, information indicating the time at which the change occurs and information specifying the change, and a video information managing control section 95.

The camera operation detecting section 91 detects a predetermined camera operation. The reason why the camera operation should be detected is that attractive information for the user is assumed to be often generated before or after the camera operation.

When a camera connected to the terminal control section 12 is operated, a camera operation signal is input into the terminal control section 12 in accordance with the camera operation. The camera operation includes a zooming operation for changing the magnification of the video image for the object, a focusing operation for focusing the object, a panning operation for changing the direction of the camera in the horizontal direction with the condition that the position of the camera is fixed, and a tilting operation for changing the direction of the camera in the vertical direction with the condition that the position of the camera is fixed. The camera operation signal includes a zooming operation signal indicating the zooming operation, a focusing operation signal indicating the focusing operation, a panning operation signal indicating the panning operation, and a tilting operation signal indicating the tilting operation.

The terminal control section 12 identifies from which camera the camera operation signal is input, and sends the identifier of the camera and the camera operation signal to the working situation managing section 13. The camera identifier and the camera operation signal are input into the camera operation detecting section 91 via the working situation control section 33 and the video information managing control section 95.

The camera operation detecting section 91 determines whether there occurs any predetermined change in the input camera operation signal or not. For example, in the case where the camera operation signal is represented by an analog value which varies in proportion to the operation amount, when the camera operation signal exceeds a predetermined level, it is determined that the predetermined change occurs. The predetermined level may be set to be 0. In another case where the camera operation signal is represented by a digital value of 0 or 1, when the camera operation signal is changed from 0 to 1, it is determined that the predetermined change occurs. In such a case, the digital value of 0 indicates no camera operation, and the digital value of 1 indicates any camera operation. If it is determined that the predetermined change occurs in the input camera operation signal, the camera operation detecting section 91 sends a detection signal indicative of the predetermined change to the video information producing section 94.

The video information producing section 94 produces information indicating the time at which the predetermined change occurs, and information specifying the camera operation. The information indicating the time at which the predetermined change occurs is a character string which represents at least one of year, month, day, o'clock, minute, and second. Exemplary character strings include "12:15:10", and "5/3 18:03". Alternatively, instead of the character string, the information indicating the time at which the predetermined change occurs may be data in binary form. Such information indicating the time is produced by asking the present time to a timer section (not shown) which manages the present time.

Next, the video scene change detecting section 92 is described. It is assumed that the personal camera for capturing the face of the user and the document camera for capturing the material information are connected to the terminal control section 12. The purposes of the video scene change detecting section 92 are to detect the motion of the user who sits in front of the personal camera, and to detect the motion of the material information or the motion of any finger or hand of the user which indicates the material information to be captured by the document camera.

The video images captured by the personal camera and the document camera are input into the video scene change detecting section 92 via the working situation control section 33 and the video information managing control section 95. The video scene change detecting section 92 calculates a difference between the input video frames, and determines whether the difference is larger than a predetermined value or not. If it is determined that the difference is larger than the predetermined value, the video scene change detecting section 92 judges that the video scene change occurs, and sends a detection signal indicating the change to the video information producing section 94. The video information producing section 94 produces information indicating the time at which the video scene change occurs and information specifying the video scene change, in accordance with the detection signal sent from the video scene change detecting section 92.

In the case where a sensor which detects the motion of any finger or hand of the user for the material information is provided, the video scene change detecting section 92 may detect the video scene change in accordance with the output signal of the sensor, instead of detecting the video scene change based on the difference between video frames. For example, the sensor detects that the hand of the user covers at least a portion of the material information. Similarly, in the case where a sensor which detects the motion of the user who sits in front of the personal camera is provided, the video scene change detecting section 92 may detect the video scene change in accordance with the output signal of the sensor, instead of detecting the video scene change based on the difference between the video frames. The sensor generates an output signal having a value of 1 only when a predetermined motion is detected. For such a sensor, an infrared ray sensor, or an ultrasonic sensor can be used. The video scene change detecting section 92 receives the output signal from the sensor and judges whether the value of the output signal is 1 or not. If the value of the output signal is judged to be 1, the video scene change detecting section 92 judges that the video scene change occurs, and sends a detection signal indicating the change to the video information producing section 94. The video information producing section 94 produces information indicating the time at which the video scene change occurs and information specifying the video scene change in accordance with the detection signal from the video scene change detecting section 92.

Next, the video channel change detecting section 93 is described. It is assumed that four cameras (first to fourth cameras) are connected to the terminal control section 12. It is not important whether the cameras are connected to the terminal control section 12 via the network, or the cameras are directly connected to the terminal control section 12. The terminal control section 12 has functions for assigning the inputs from the cameras to the windows, and for managing the assignment relationship between the inputs from the cameras and the windows. For example, the terminal control section 12 assigns the input from the first camera to the first window, and assigns the input from the second camera to the second window. In this specification, "video channel change" means changing the assignment relationship between the inputs from the cameras and the windows. For example, the change of the above-mentioned assignment relationship so that the input from the third camera is assigned to the first window and the input from the fourth camera is assigned to the second window is called the video channel change.

The terminal control section 12 changes the assignment relationship between the inputs from the cameras and the windows in accordance with a predetermined command input by the user or in accordance with a predetermined control instruction from the program. For example, if the chairman of the conference wants to display the face of a participant who wants to speak in one and the same window, the chairman of the conference may input a command for switching the video channel each time the speaker changes. In another case, in order to regularly display the face of one of the participants in one and the same window, the video channel is automatically switched by the program at a predetermined time period. When the predetermined command of the predetermined control instruction from the program is detected, the video channel change detecting section 93 judges that the video channel change occurs, and sends a detection signal indicating the change to the video information producing section 94.

The video information producing section 94 produces information indicating the time at which the video channel change occurs and information specifying the video channel change, in accordance with the detection signal from the video channel change detecting section 93. The detection of the video scene change is effective especially when the purpose for using the video channel is clearly defined (for example, a video channel for displaying the participants of the conference). In addition, according to the video channel change detecting section 93, the video scene change can be detected only based on the captured video information, even when the information relating to the camera operation is not stored during the image capturing.

As described above, the function of the camera operation detecting section 91, the function of the video scene change detecting section 92, and the function of the video channel change detecting section 93 are independent from each other. Accordingly, it is possible to construct the video information managing section 31 so as to include any one or two of the camera operation detecting section 91, the video scene change detecting section 92 and the video channel change detecting section 93.

Figure 10:
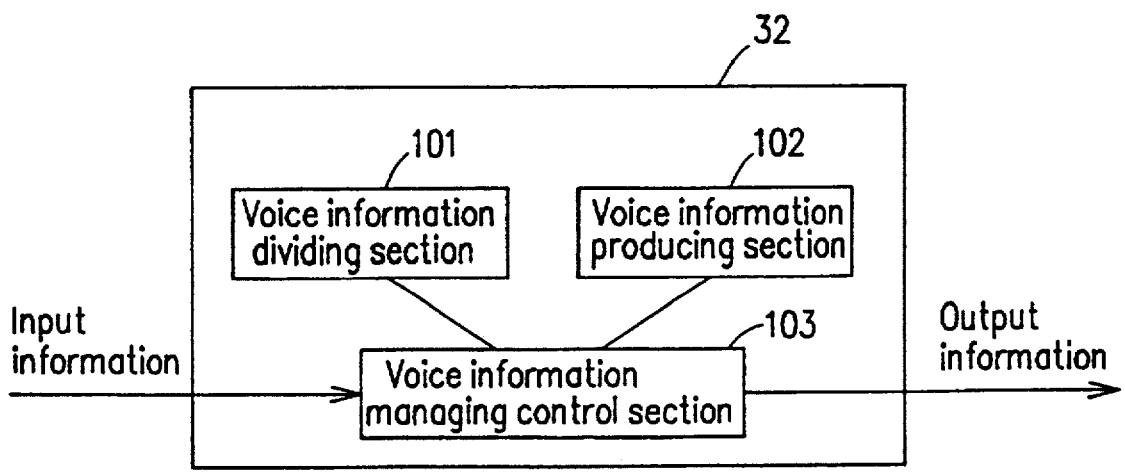
FIG. 10 is a diagram showing a construction of a voice information managing section.

FIG. 10 shows the construction of the voice information managing section 32. The voice information managing section 32 includes a voice information dividing section 10 for dividing the input voice into a sound portion and a no sound portion based on the power of the input voice signal, a voice information producing section 102 for, in response to the change from the no sound portion to the sound portion of the voice signal, producing information indicating the time at which the change occurs, and information specifying the change, and a voice information managing control section 103 for controlling the voice information dividing section 101 and the voice information producing section 102.

The voice information dividing section 101 measures the power of the input voice signal, and divides the input voice signal into the sound portion and the no sound portion based on the measured result. A specific method for dividing a voice signal into a sound portion and a no sound portion will be described later with reference to FIG. 34. The voice information dividing section 101 detects the change from the no sound portion to the sound portion of the voice signal and the number of voice blocks in which the sound portion continues.

The voice information producing section 102 produces information indicating the time at which the voice signal is changed from the no sound portion to the sound portion and information indicating the number of voice blocks in which the sound portion continues. The information indicating the change at which the voice signal is changed from the no sound portion to the sound portion and the information indicating the number of voice blocks in which the sound portion continues are stored in the working situation storing section 14. In this way, by storing the time at which the voice signal is changed from the no sound portion to the sound portion and the number of voice blocks in which the sound portion continues in the working situation storing section 14, it is possible to reproduce only the video information which is recorded or utilized by the user in a time zone corresponding to the sound portion of the voice signal. As a result, it is possible for the user to easily recall the important parts in the progress of working.

Figure 11:
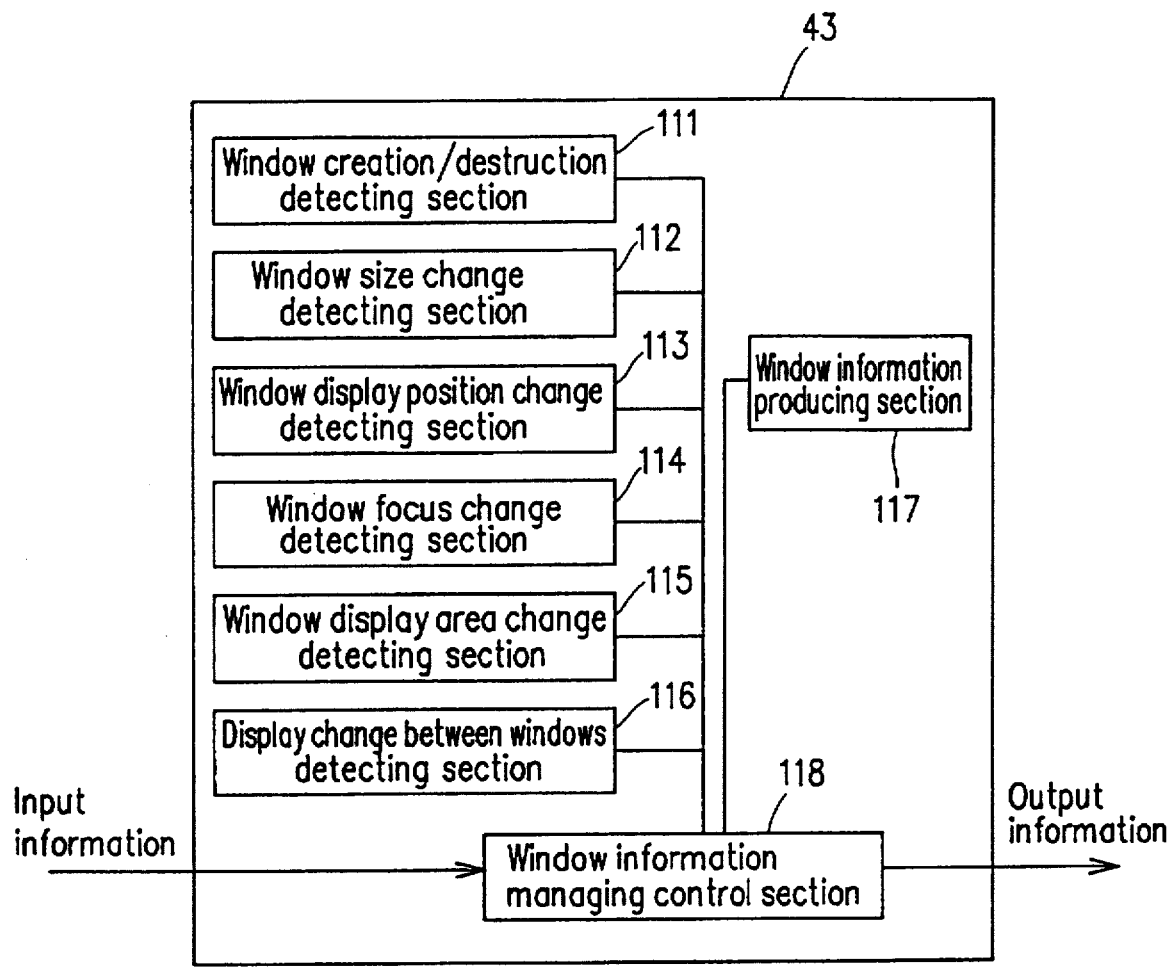
FIG. 11 is a diagram showing a construction of a window information managing section.

FIG. 11 shows a construction of the window information managing section 43. The window information managing section 43 includes a window creation/destruction detecting section 111 for detecting the creation/destruction of a window, a window size change detecting section 112 for detecting the change of window size, a window display position change detecting section 113 for detecting the change of the display position of a window, a window focus change detecting section 114 for detecting the change of focus for a window (a switching operation to a window to be edited (discussed) among the users), a window display area change detecting section 115 for detecting the change of the display area of the information to be displayed in the window, a display change between windows detecting section 116 for detecting the change of the overlap relationships among a plurality of windows, a window information producing section 117 for, in accordance with the change of the window information, producing information indicating the time at which the change occurs and information specifying the change, and a window information managing control section 118.

The window creation/destruction detecting section 111 detects the window creation or the window destruction, and sends a detection signal to the window information producing section 117. Each of the other detecting sections 112 to 116 also detects a predetermined change, and sends a detection signal to the window information producing section 117. When the window information producing section 117 receives a detection signal, the window information producing section 117 produces information indicating the time at which the change occurs and information specifying the change, based on the detection signal.

Figure 12:
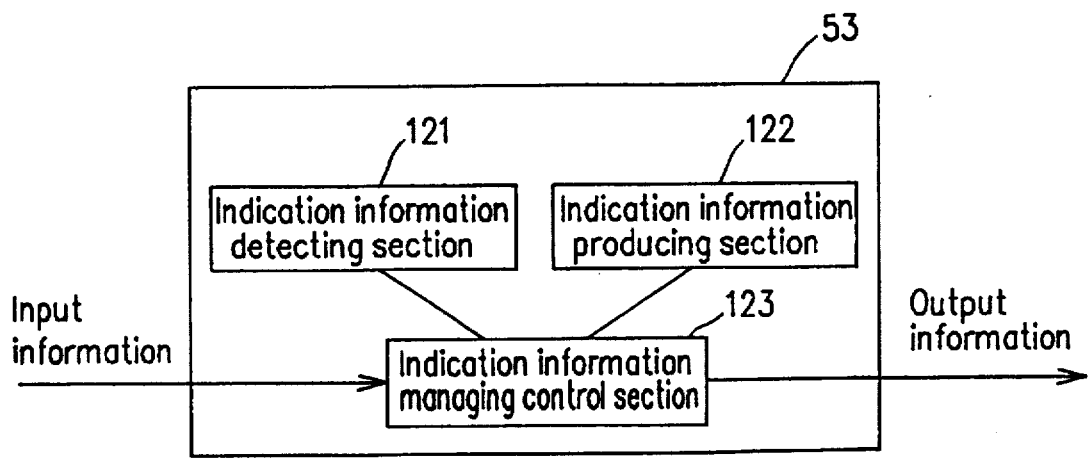
FIG. 12 is a diagram showing a construction of an indication information managing section.

FIG. 12 shows a construction of the indication information managing section 53. The indication information managing section 53 includes an indication information detecting section 121 for detecting the change in indication information, an indication information producing section 122 for, in response to the change in the indication information, producing information indicating the time at which the change occurs, and information specifying the change, and an indication information managing control section 123.

The operation of the indication information managing section 53 will be described, for example, in the case of indication by using a mouse pointer. When a button of a mouse is depressed by the user, a signal indicating the depression of the mouse button and a signal indicating the coordinate position of the mouse pointer are input into the indication information detecting section 121. The indication information detecting section 121 detects a predetermined change of the coordinate position of the mouse pointer end produces a detection signal indicating the predetermined change. For example, the predetermined change is the move of the mouse pointer from a certain position to another position on one window. Alternatively, the predetermined change is the move of the mouse pointer from a certain area to another area on one window. Alternatively, the predetermined change may be a double click of the mouse button, or a drag of the mouse. The indication information producing section 122 produces information indicating the time at which the predetermined change occurs and information specifying the change, in response to the detection signal from the indication information detecting section 121.

FIG. 13 illustrates exemplary information produced by the voice information producing section 102 and stored in the working situation storing section 14 by the working situation control section 33. In this example, each start time of the sound portion is stored as information indicating the time at which the change in the voice information occurs. An identifier of each voice block, the name of the user who utters a voice, and the voice block length of the sound portion are stored as the information specifying the change in the voice information. The user who utters a voice is specified based on the relationship between the identifiers of input devices and the users. This relationship is previously set. For example, the first row in FIG. 13 represents the working situation that, in the voice information input via the microphone connected to the terminal device which is used by "Mr. Yamaguchi", the sound portion continues for "15" seconds (block length) from the time "12:15:10".

FIG. 14 illustrates exemplary information produced by the video information producing section 94, and stored in the working situation storing section 14 by the working situation control section 33. In this example, a time at which the event occurs is stored as information indicating the time at which the change in video information occurs. The contents of event, the name of the subject user, and the location are stored as information specifying the change in the video information. In this specification, the term "event" is defined as being equivalent to a predetermined change. The event includes a change of video scene. The subject person and the location at which the event occurs are specified based on the relationship among the identifiers of input devices, the users, and the uses of the input devices. The relationship is previously set. For example, the first row in FIG. 14 represents the working situation that, in the video information input from the "document camera" connected to the terminal device which is used by "Mr. Yamaguchi", the "change of video scene" (event) occurs at "5/3 18:03" (time).

As methods for detecting the change in video information, there are a method in which an infrared ray sensor for detecting the motion of a hand is additionally provided for the document camera for presenting the materials, and a method in which an ultrasonic sensor for examining the present situation of the users is additionally provided for the personal camera for capturing the expression of the user. My using such methods, the change in the video information can be detected. In this way, by suitably using various sensors so as to serve the purposes, the motion information of the users can be obtained. In addition, by utilizing the information on differences between frames of video information obtained by the cameras, the motion information can also be obtained. These will be described later in detail with reference to FIG. 27.

FIG. 15 illustrates another exemplary information produced by the video information producing section 94 and stored in the working situation storing section 14 by the working situation control section 33. In this example, in addition to the change of video scene shown in FIG. 14, the change of camera operation and the change of video channel are also included. For example, the first row of FIG. 15 represents the working situation that, in the video information input from the "document camera" connected to the terminal device which is used by "Mr. Yamaguchi", the "magnifying zoom" (event) occurs at "5/3 18:03" (time).

FIG. 16 illustrates another exemplary information produced by the window information producing section 117 and the indication information producing section 122, and stored in the working situation storing section 14 by the working situation control section 33. In this example, as the information indicating the time at which the change in window information or in indication information occurs, a time at which the change occurs is stored. As the information Specifying the change in the window information or in the indication information, the contents of each event, the name of the subject user, and the location are stored. The subject user and the location are specified based on the relationship among the identifiers of the input devices, the users and the uses of the input devices. The relationship is previously set. For example, the first row of FIG. 15 represents the working situation that, in "Chapter 1" of "Material No. 1" which is displayed in the window of the terminal device which is used by "Mr. Yamaguchi", "Indication by mouse pointer" (event) occurs at "5/3 18:03" (time). The operation for windows may be performed by regarding a logical page, chapter, or section as a basic unit. Moreover, in the case where the windows include a personal memorandum notating portion for notating a personal memorandum, the change of the contents of the personal memorandum notating portion may be handled. In this way, by storing the working situation in the working situation storing section 14, it is possible for the user to retrieve any specific video or voice information captured during the working based on the memory for the working.

Referring to FIGS. 17 to 20, examples of various predetermined changes which are preferably managed by the working situation managing section 13 in the case of the teleconference which is held by a plurality of users by utilizing a plurality of terminal devices interconnected via a network are described.

Figure 17:
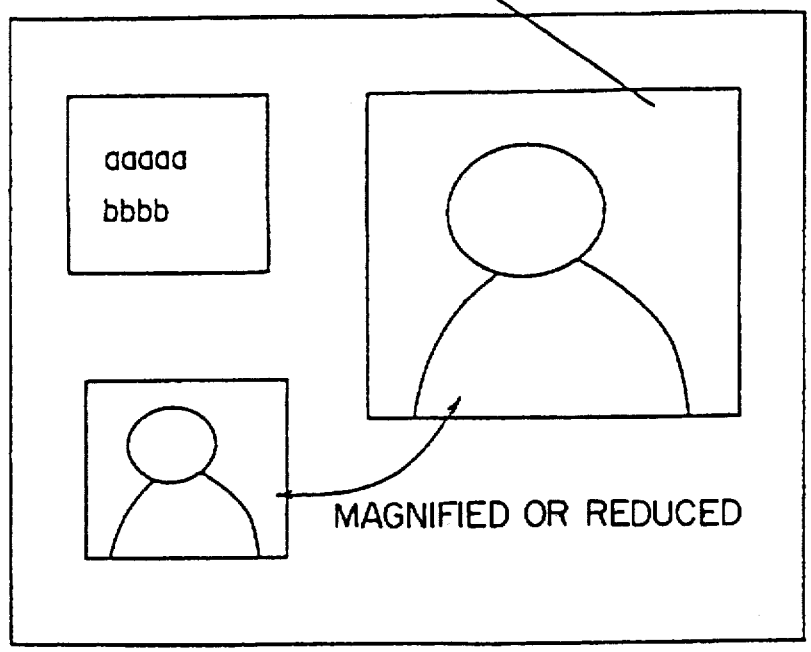
FIG. 17 is a diagram for illustrating a method for determining a specific window which is viewed by a user, by utilizing the size change information of the window.

First, referring to FIG. 17, a method for determining a window which is specifically viewed by the user by detecting the change in window information is described. Hereinafter, a window which is assumed by the working situation managing section 13 to be specifically viewed by the user is referred to as a specific window. The method is described by using the change of window size as the change in window information. It is assumed that the window includes a window size changing portion for changing the window size. In the conventional window system, the window size changing portion is often provided in a peripheral portion of the window. The user usually changes the size of the window by dragging the mouse while the window size changing portion is indicated by the mouse. The working situation managing section 13 detects the change of the window size, and determines the window whose size is changed as being the specific window. The working situation managing section 13 stores the information indicating which window is the specific window in the working situation storing section 14 in time sequence. In the case where the change of window size is to be performed for a plurality of windows, the working situation managing section 13 may determine the window whose size is most lately changed as being the specific window. Alternatively, the working situation managing section 13 may determine the window having a size which is larger than a predetermined size as being the specific window. In another alternative case where a time period for which the window is viewed is shorter than a predetermined time period, the working situation managing section 13 may judge that the user merely performs the retrieval of materials, and determine that the window is not specifically viewed. This is because such a window is assumed not to be the subject which is discussed by the users. Similarly, instead of the change of window size, another change in window information (e.g., the change of window focus, the change of display between windows) may be used for determining which window is the specific window.

Figure 18:
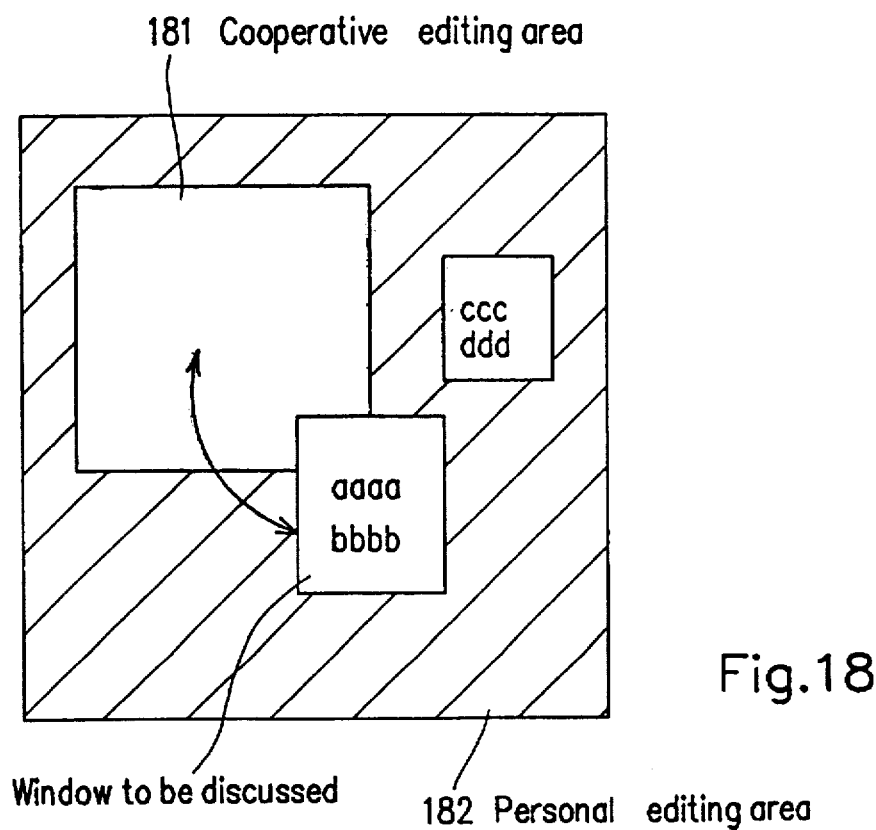
FIG. 18 is a diagram for illustrating a method for determining a specific window which is viewed by a user, by utilizing the owner information of the window.

Referring to FIG. 18, a method for determining a specific window which is viewed by the user by using the window owner information is described. As is shown in FIG. 18, the editing area on the display includes s cooperative editing area 181 in which the information can be edited by a plurality of users and a personal editing area 182 in which the information can be edited by only one user. It is assumed that the position of the cooperative editing area and the position of the personal editing area are previously set. The working situation managing section 13 detects that the window position is moved from the personal editing area 182 to the cooperative editing area 181 by the operation of the user, and determines the destination window as being the specific window. By the working situation managing section 13, the information indicating which window is the specific window and the information indicating in which one of the cooperative editing area 181 and the personal editing area 182 the specific window is positioned are stored in the working situation storing section 14 in time sequence.

Figure 19:
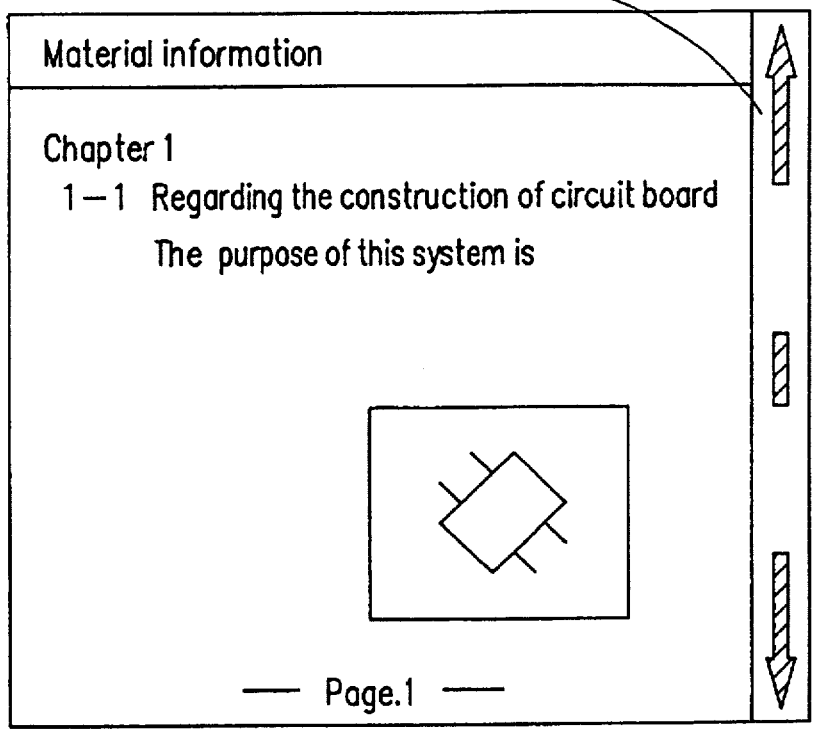
FIG. 19 is a diagram for illustrating a method for determining specific information which is viewed by a user based on the operation information of a display position changing portion.

Referring to FIG. 19, a method for determining which information is specifically viewed by the user by detecting the change of window display area is described. It is assumed that the window includes a window display area changing portion 191 for scrolling the display contents. In the conventional window system, the window display area changing portion 191 often includes a user interface of the scroll bar type. Alternatively, the window display area changing portion 191 may include another user interface of the depressing button type. When the user operates the window display area changing portion 191, the display contents of the window is scrolled. The working situation managing section 13 detects that the window display area is changed. After the window display area is changed, the working situation managing section 13 judges whether the voice signal of a level equal to or higher than a predetermined level continues for a time period equal to or longer than a predetermined time period (e.g., 1 second or longer). The reason why such judgment is effective is that, when a person explains the materials to another person, the person of an indicates a specific position of the materials so as to clearly determine the subject to be explained, and then makes an explanation by uttering a voice (by using a language). When it is judged that the voice signal of a level equal to or higher than the predetermined level continues for a time period equal to or longer than the predetermined time period after the window display area is changed, the temporal and positional information of the material information which is specifically viewed by the user (e.g., a document name, an item name, etc.) is stored in the working situation storing section 14 by the working situation managing section 13. Alternatively, the working situation managing section 13 may detect that an indication to the material information occurs after the window display area is changed, and the temporal and positional information of the indication may be stored in the working situation storing section 14 as the information indicating the point to be specifically viewed by the user. In another alternative case where the above two detecting methods are combined, the working situation managing section 13 may detect that the voice uttered by the user continues for a time period equal to or longer than a predetermined time period, and also detect that any indication to the material information occurs, and the temporal and positional information of the material information which is specifically viewed by the user may be stored in the working situation storing section 14.

Figure 20:
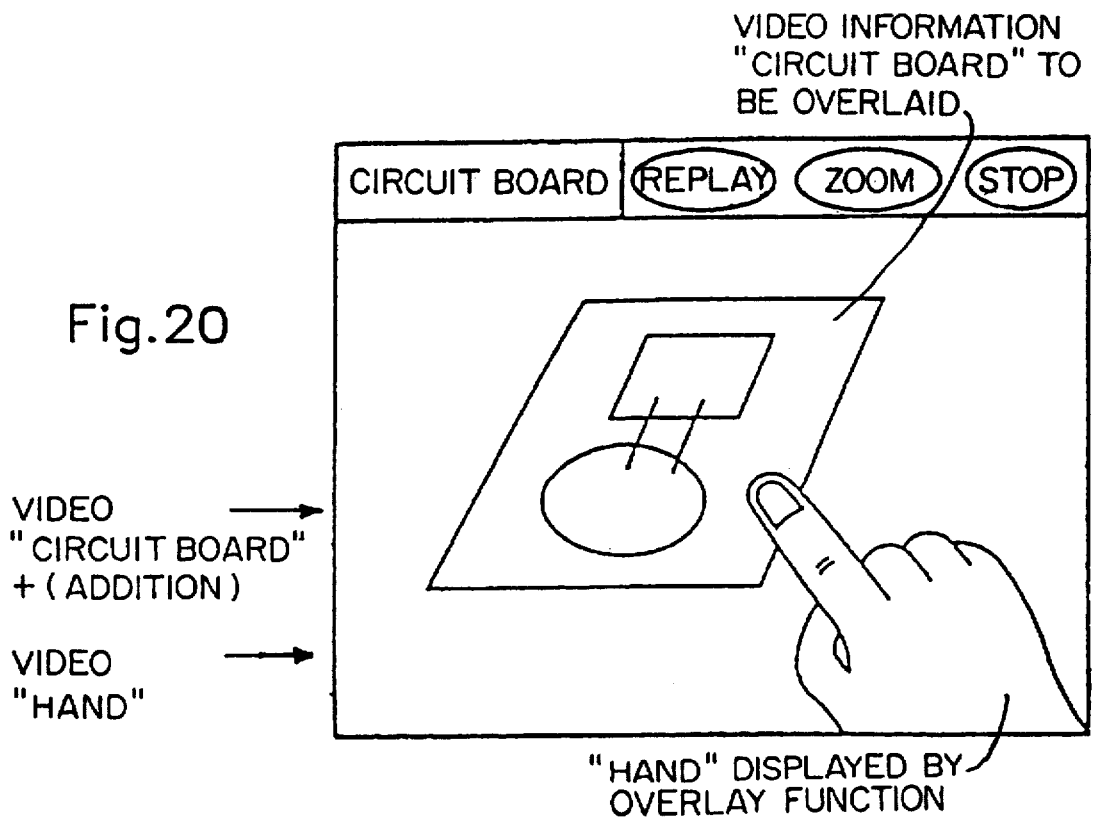
FIG. 20 is a diagram for illustrating a method for detecting a point which is specifically viewed by a user in video information.
Figure 21:
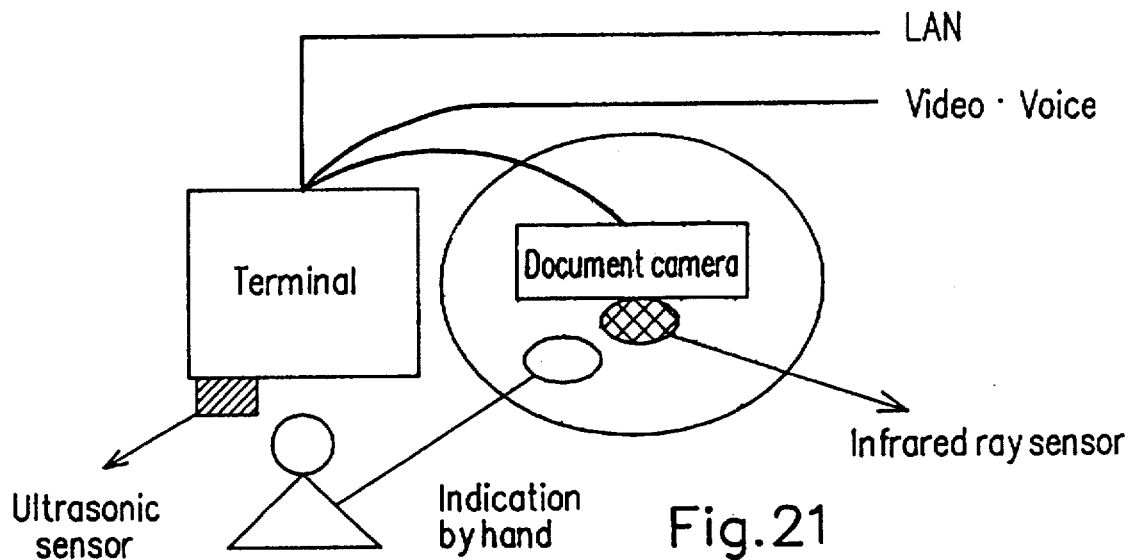
FIG. 21 is a diagram for illustrating a method for detecting a point which is specifically viewed by a user in video information.

Referring to FIGS. 20 and 21, a me%hod for detecting a point of the video information which is specifically viewed by the user is described. As is shown in FIG. 21, it is assumed that a document camera for capturing the material information is connected to the terminal device. The working situation managing section 13 detects that voice information is produced by the user after a predetermined camera operation is performed by the user. The predetermined camera operation includes, for example, the video channel switching in the case where there are a plurality of video sources, the zooming operation of the camera, and the recording operation for a VTR device, etc. The reason why such detection is effective is that the user often utters a voice for intentionally explaining something after the predetermined camera operation is performed. The working situation managing section 13 judges that the production of the voice information at such a timing represents a point to be specifically viewed by the user, so that the temporal and positional information indicating the point to be specifically viewed by the user is stored in the working situation storing section 14 (e.g., information indicating when and which position of the video information is indicated).

FIG. 20 shows a condition that a certain user uses the document camera so as to display the materials on which "Circuit Board" is shown, and another video image "Hand" in which a hand of another participant indicates a point overlays the video image "Circuit Board" by the operation of the participant. At this time, by storing the conversation situation of voice information (e.g., by whom and when the information corresponding to a sound portion is produced), it is possible to easily retrieve by whom and when the specific speech is made. The working situation managing section 13 detects that an indication to the material information occurs after the predetermined camera operation is performed by the user. The working situation managing section 13 judges that the indication to the material information at such a timing represents a point which is specifically viewed by the user, and the temporal and positional information of the indication is stored in the working situation storing section 14.

As the method for detecting the indication to the material information, there are, for example, a method for detecting an indication by a mouse pointer, and a method for detecting an indication by a hand, etc. by an infrared ray sensor and the like provided for the document camera. In a method for detecting an indication to the material information by utilizing the video information captured by the document camera, the difference between frames in the video information may be utilized. Alternatively, when the working situation managing section 13 detects the voice information produced by the user and also detects the occurrence of an indication to the material information after the camera operation is performed by the user, the temporal and positional information may be stored in the working situation storing section 14 as information indicating a point to be specifically viewed by the user. The reason why such detection is effective is that, in many cases where the user wants to explain the materials to participants, the user first indicates a specific point of the materials so as to clearly show the subject to be explained, and then the user explains the subject by uttering a voice (by using a language). As is shown in FIG. 20, especially in the case where a plurality of users discuss the video while viewing the video, it is effective that the production time period of voice (an interval of the sound portion of the voice) and the indication to the video are stored by each user. The reason is that each user remembers the time point at which the user might pay attention to the video, so that the retrieval and editing of the material information can easily be performed. In addition, by recording or outputting the video information and the voice information only at the time at which the user might pay attention, it is possible to reduce the amount of information presented to the user and to reduce the memory capacity.

Next, a working situation management apparatus having a keyword managing section 220 for attaching a keyword to the video information or the voice information by utilizing the working situation stored in the working situation storing section 14. In this specification, the phrase "attaching a keyword to the video information or the voice information" means determining a keyword corresponding to a time zone t. For example, the keyword managing section 220 assigns a keyword "A" to a time zone $t_1$, a keyword "B" to a time zone $t_2$, and a keyword "C" to a time zone $t_3$. The video information or the voice information is represented by a function of the time t, so that a desired part of the video information or the voice information can be retrieved by using the keyword as a retrieval key.

Figure 22:
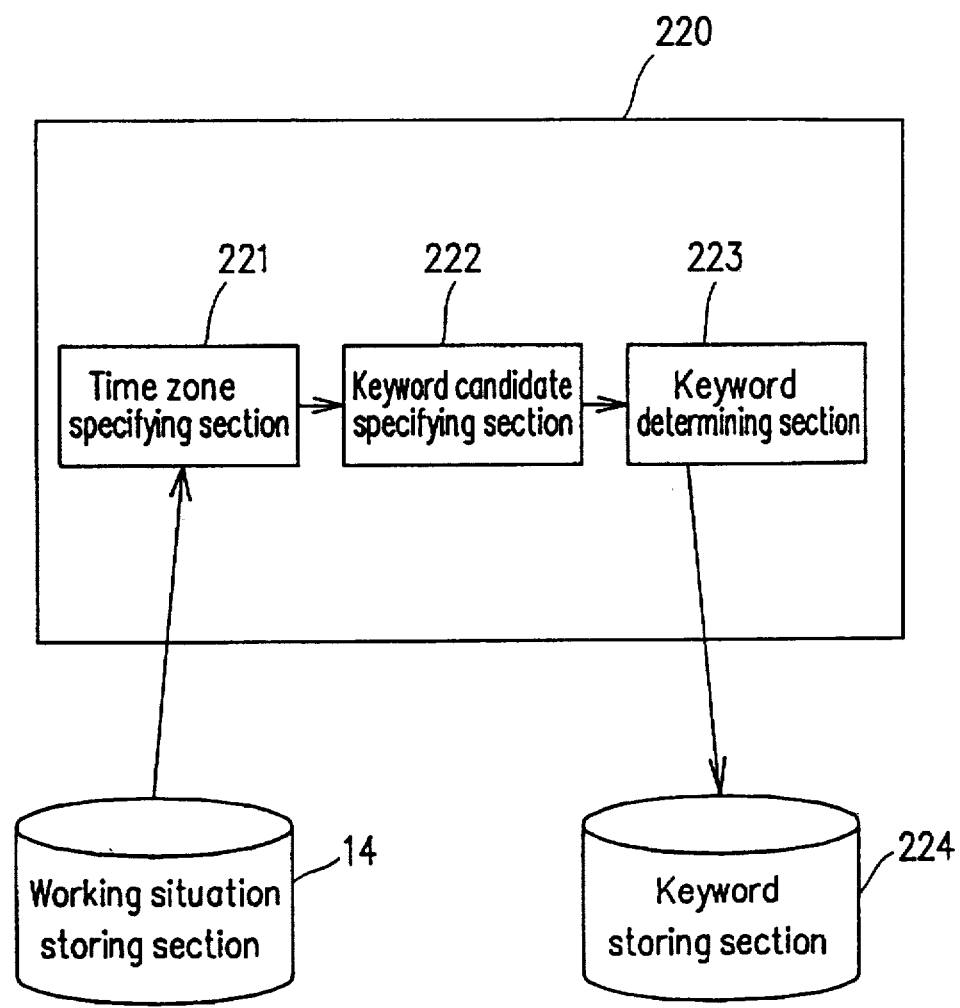
FIG. 22 is a diagram showing a construction of a keyword information managing section.

FIG. 22 shows a construction of the keyword managing section 220. The keyword managing section 220 receives the information indicating the time sequential progress of working from the working situation storing section 14, and outputs a pair (t, K(t)) of a time zone t and a keyword K(t) corresponding to the time zone t to a keyword storing section 224. The keyword managing section 220 includes a time zone specifying section 221, a keyword candidate specifying section 222, and a keyword determining section 223. The time zone specifying section 221 reads out the information indicating the time sequential progress of working from the working situation storing section 14 and specifies the time zone to which a keyword is to be attached in the time period required for the working based on the read-out information. The keyword candidate specifying section 222 specifies at least one keyword candidate for the time zone specified by the time zone specifying section 221. The keyword determining section 223 selects one keyword candidate from the keyword candidates under a predetermined rule, and determines the selected keyword candidate as being the keyword corresponding to the time zone. The time zone and the keyword corresponding to the time zone are stored in the keyword storing section 224.

In order to attach a keyword to the video information or the voice information by the keyword managing section 220 as described above, it is necessary that the information indicating the time sequential progress of working is previously stored in the working situation storing section 14. The information indicating the time sequential progress of working is produced by the working situation managing section 13 and stored in the working situation storing section 14. Hereinafter, which type of information is to be stored in the working situation storing section 14 is described.

Figure 23A:
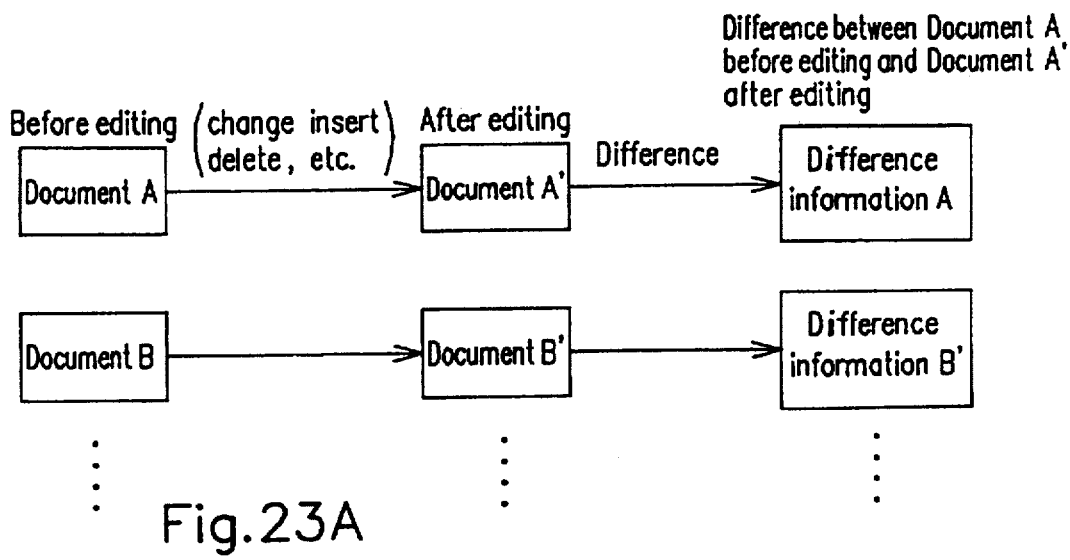
FIG. 23A is a diagram illustrating a flow of operation for editing a document.

FIG. 23A illustrates a flow of working for editing a document. For example, an editing operation such as change, insert, and delete is performed to a document A, so as to produce a document A'. The working situation managing section 13 generates a difference between the document A before the editing and the document A' after the editing, and outputs information indicating the time at which the difference is produced and information specifying the difference to the working situation storing section 14. The information specifying the difference is, for example, a file name for storing the difference character string. Instead of the information specifying the difference, the working situation managing section 13 may output information specifying the document A' after the editing to the working situation storing section 14. This is because there may be a case of no difference. The difference between the document A before the editing and the document A' after the editing may be taken at a regular interval, or at the time when the window is opened or closed.

Figure 23B:
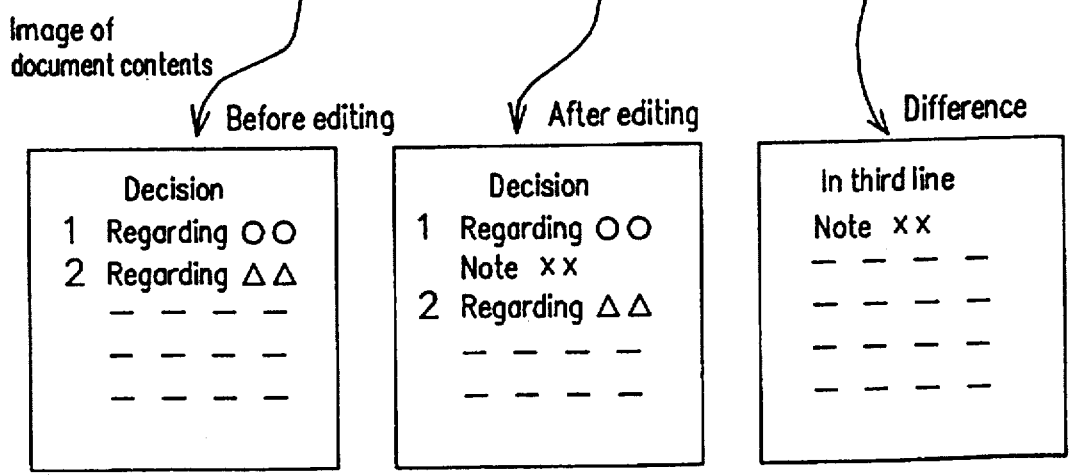
FIG. 23B is a diagram showing exemplary information stored in the working situation storing section by the operation shown in FIG. 23A.

FIG. 23B shows exemplary information stored in the working situation storing section 14 by the working situation managing section 13 in the case where the operation shown in FIG. 23A is performed. In this example, the time zone in which the document is edited, the document name before the editing, the document name after the editing, and the difference are stored.

FIG. 24A shows a scene in which a portion of the material information is indicated by the user. The user indicates a portion of the material information by using a mouse pointer or a touch panel, so as to specify the range of the portion of the material information. In FIG. 24A, the portion indicated by the user is displayed in a reverse video. The working situation managing section 13 detects the range indicated by the user, and outputs information indicating the time at which the indication by the user occurs, and information specifying the range indicated by the user to the working situation storing section 14.

FIG. 24B shows exemplary information stored in the working situation storing section 14 by the working situation managing section 13 in the case where the indication shown in FIG. 24A occurs. In this example, the name of a person who makes the indication, the time zone in which the indication occurs, and the range indicated by the indication are stored.

Figures 25A, 25B:
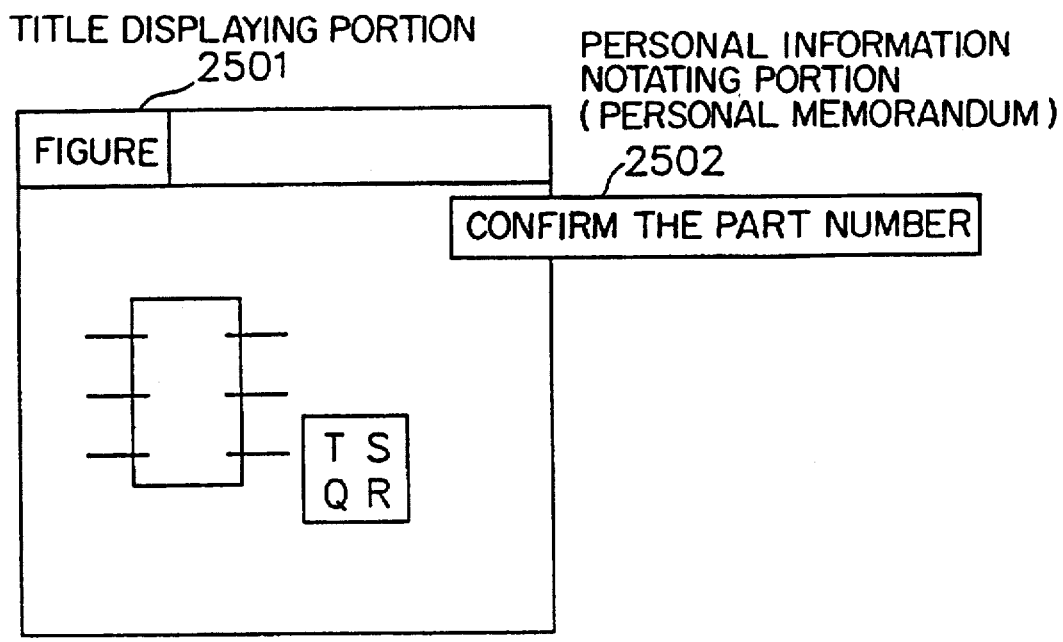
FIG. 25A is a diagram illustrating a scene in which the material information is displayed on a window in the working.
FIG. 25B is a diagram showing exemplary information stored in the working situation storing section by the operation shown in FIG. 25A.

FIG. 25A shows a scene in which the material information is displayed in a window during the working. The window includes a title displaying portion 2501 for showing the title of the material information. As the title, for example, a name of a chapter, section, or item, or a number is shown. The working situation managing section 13 detects the specific window viewed by the user, and outputs information indicating the time at which the specific window is detected, and information shown in the title displaying portion 2501 of the window to the working situation storing section 14. The window may additionally include a personal information notating portion 2502 for notating the personal information of the user. The working situation managing section 13 detects the specific window viewed by the user, and outputs information indicating the time at which the specific window is detected, and information described in the personal information notating portion 2502 of the window to the working situation storing section 14.

FIG. 25B shows exemplary information stored in the working situation storing section 14 by the working situation managing section 13. In this example, the title, the subject person, the time zoom in which the window is specifically viewed, and the personal memorandum are stored.

Figures 26A, 26B:
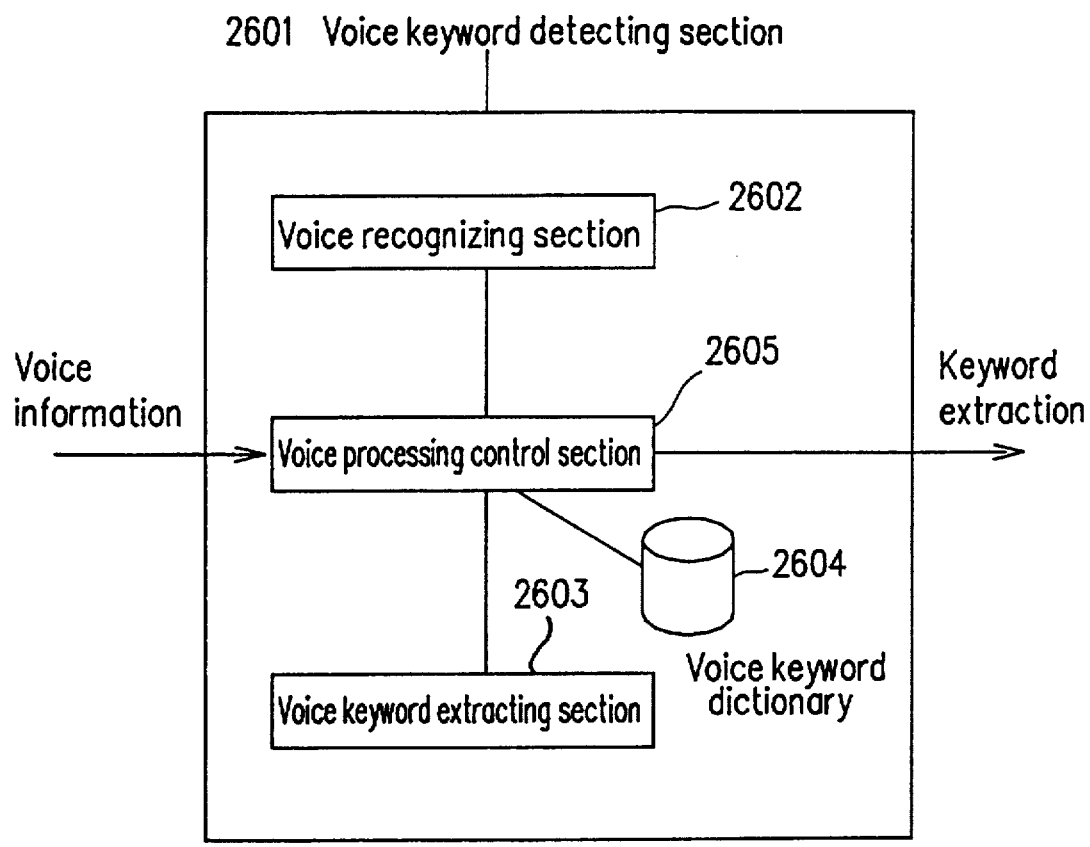
FIG. 26A is a diagram showing a construction of a voice keyword detecting section.
FIG. 26B is a diagram showing exemplary information stored in the working situation storing section by the voice keyword detecting section.

FIG. 26A shows a construction of the voice keyword detecting section 2601. The voice keyword detecting section 2601 is included in the working situation managing section 13. The voice keyword detecting section 2601 detects a predetermined voice keyword included in the voice information input from the input section 11, and outputs information indicating the time at which the predetermined voice keyword is detected, and information indicating the detected voice keyword to the working situation storing section 14. The voice keyword detecting section 2601 includes a voice recognizing section 2602, a voice keyword extracting section 2603, a voice keyword dictionary 2604, and a voice processing control section 2605. The voice recognizing section 2602 receives the voice information from the input section 11 and converts the voice information into a character string corresponding to the voice information. The voice keyword extracting section 2603 receives the character string corresponding to the voice information from the voice recognizing section 2602 and extracts a voice keyword from the character string corresponding to the voice information by retrieving the voice keyword dictionary 2604. In the voice keyword dictionary 2604, voice keywords to be extracted are previously stored. For example, it is assumed that a voice keyword "software" is previously stored in the voice keyword dictionary 2604. When the following voice information "the feature of this software is to operate at a high speed" is input, the voice recognizing section 2602 generates a character string "the feature of this software is to operate at a high speed". The voice keyword extracting section 2603 receives the character string "the feature of this software is to operate at a high speed", and extracts a character string corresponding to "software", which is the voice keyword stored in the voice keyword dictionary 2604, from the received character string. The voice processing control section 2605 controls the above processing.

FIG. 26B shows exemplary information stored in the working situation storing section 14 by the working situation managing section 13. In this example, the name of the speaker, the time zone in which the speech is performed, and the voice keyword extracted from the speech contents are stored.

Figure 27:
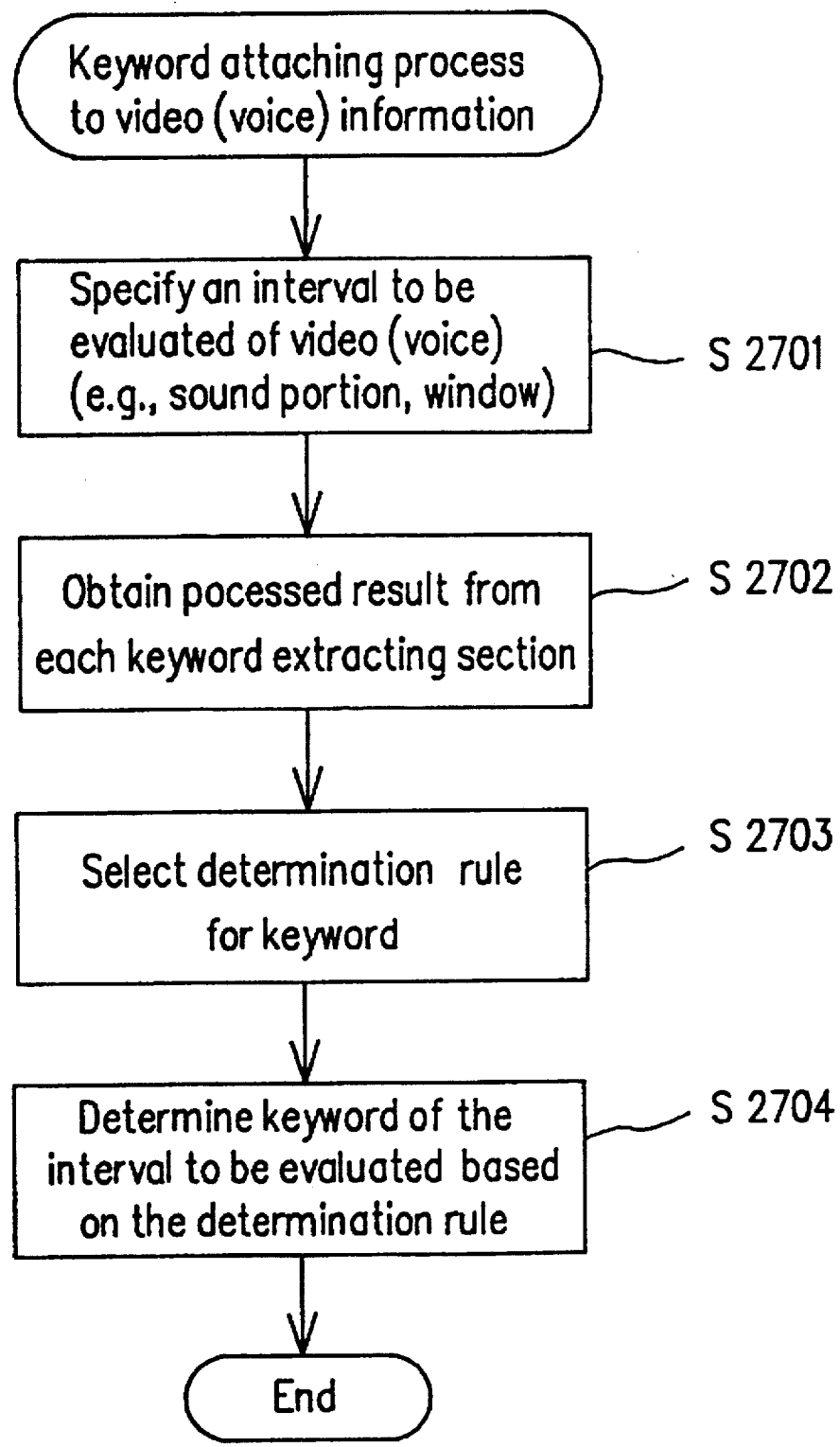
FIG. 27 is a diagram illustrating a flow of a process of attaching a keyword to video information or voice information.

FIG. 27 illustrates a flow of a keyword attaching process to the voice information or the video information performed by the keyword managing section 220. The time zone specifying section 221 specifies an interval (time zone) to be evaluated of the video information or the voice information (step S2701). The method for specifying an interval to be evaluated will be described below with reference to FIGS. 28A to 28C. The keyword candidate specifying section 222 specifies at least one keyword candidate based on the processed result of each keyword extracting section which is described later (step S2702). In order to adopt one of the keyword candidates, the keyword determining section 223 selects one determination rule among determination rules for keywords which are described later (step S2703). The keyword determining section 223 determines a keyword corresponding to the interval (time zone) to be evaluated, based on the selected determination rule (step S2704).

Figure 28A:
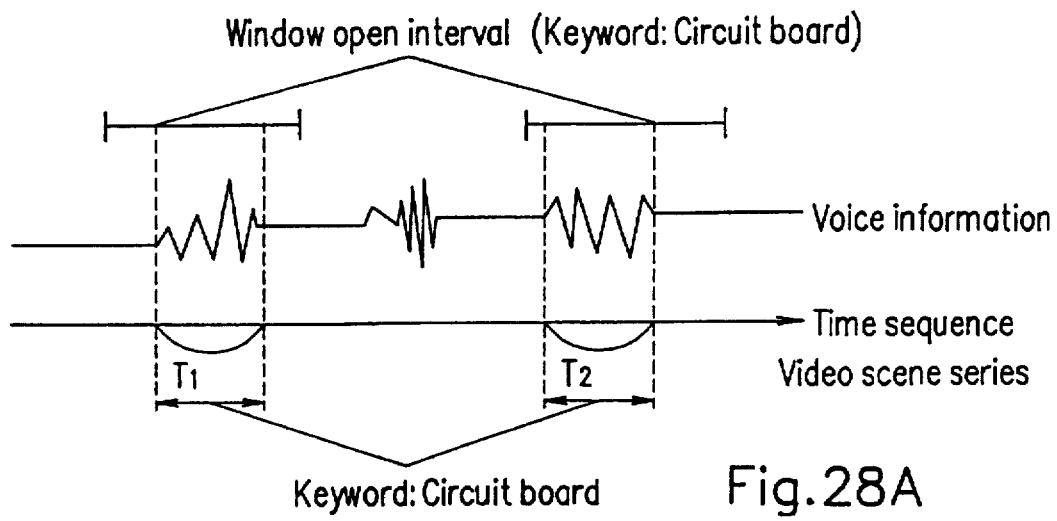
FIGS. 28A to 28C are diagrams for illustrating a method for designating an interval (time zone) to be evaluated of video information or voice information.
Figure 28B:
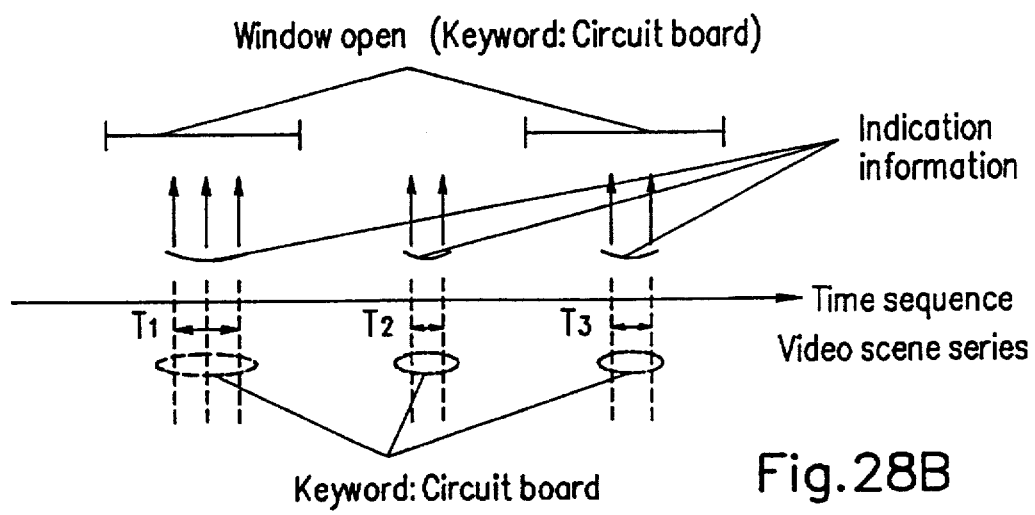
Figure 28C:
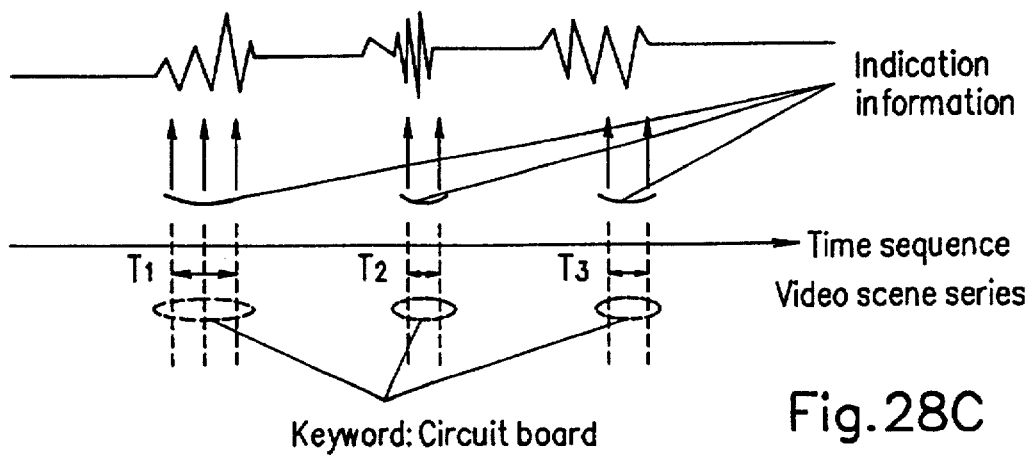

Referring to FIGS. 28A to 28C, a method for specifying an interval to be evaluated of the video information or the voice information is described. There are mainly three methods. One is a method in which the range to which the keyword is to be attached is limited to the sound portion of the voice information. The second method is one in which the range to which the keyword is to be attached is limited to an interval in which the user specifically views the window. The method for detecting that the user is viewing a specific window is described above with reference to FIGS. 17 to 21. The remaining method is one in which the range to which the keyword is to be attached is limited to an interval in which the indication information occurred. As described above, the indication information includes the indication by a mouse pointer, the indication by a finger to the material information, and the like. The method obtained by combining the above three methods for specifying the range to be evaluated is shown in FIGS. 28A to 28C.

FIG. 28A shows the method in which the range to which the keyword is to be attached is limited based on the window information and the voice information. The time zone specifying section 221 limits the range to which the keyword is to be attached to an overlapping portion of the sound portion of the voice signal and the time interval in which the user specifically views the window. In the example shown in FIG. 28A, as the overlapping portion of the sound portion of the voice information and the time interval in which the user specifically views the window, time zones $T_1$ and $T_2$ are specified by the time zone specifying section 221.

FIG. 28B shows the method in which the range to which the keyword is to be attached is limited based on the window information and the indication information. The time zone specifying section 221 limits the range to which the keyword is to be attached to an overlapping portion of the time zone in which the user specifically views the window and the time zone in which the indication information is produced. In the example shown in FIG. 28B, as the overlapping portion of the time zone in which the user specifically views the window and the time zone in which the indication information is produced, tame zones $T_1$, $T_2$, and $T_3$ are specified by the time zone specifying section 221.

FIG. 28C shows the method in which the range to which the keyword is to be attached is limited based on the indication information and the voice information. The time zone specifying section 221 limits the range to which the Keyword is to be attached to an overlapping portion of the time zone in which the indication information occurs and also the sound portion of the voice information. In the example shown in FIG. 28C, as the overlapping portion of the time zone in which the indication information occurs and also the sound portion of the voice information, time zones $T_1$, $T_2$, and $T_3$ are specified by the time zone specifying section 221.

To the above time zones $T_1$, $T_2$, and $T_3$, keywords different from each other may be attached, and alternatively one and the same keyword may be attached. For example, in the example shown in FIGS. 28A to 28C, the same keyword "circuit board" is attached to the time zones $T_1$, $T_2$, and $T_3$. A single keyword is attached to different time zones as described above, so that video information in different time zones can be treated as a video block which is regarded as one logical group having the common keyword. Similarly, a single keyword is attached to different time zones, so that voice information in different time zones can be treated as a voice block which is regarded as one logical group having the common keyword. As a result, the video information and the voice information can be easily treated by the logical information unit.

Figures 29, 30:
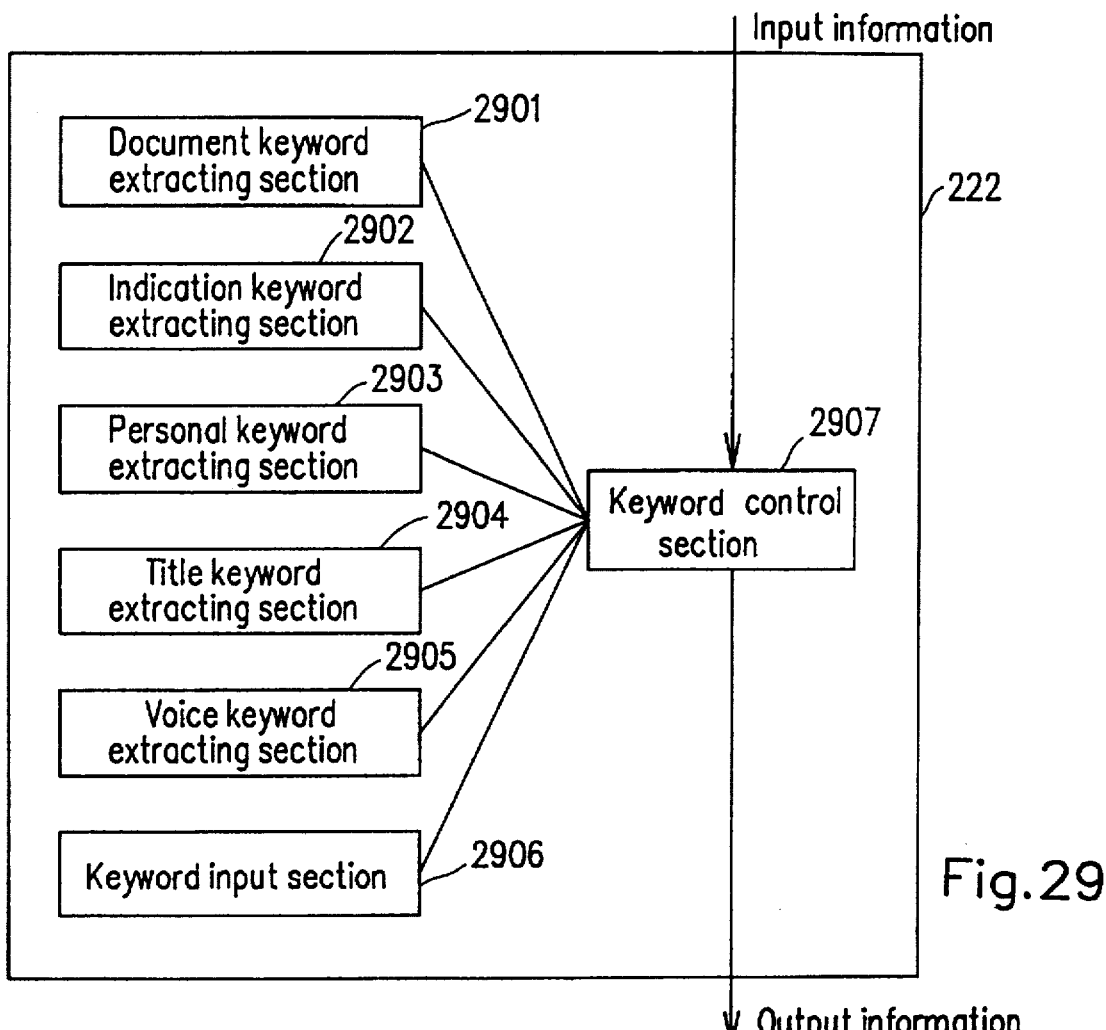
FIG. 29 is a diagram showing a construction of a keyword candidate specifying section.
FIG. 30 is a diagram showing determination rules for a keyword attached to video or voice information.

FIG. 29 shows a construction of the keyword candidate specifying section 222 shown in FIG. 22. The keyword candidate specifying section 222 includes a document keyword extracting section 2901 for extracting a keyword candidate based on the difference between the document before editing and the document after editing, an indication keyword extracting section 2902 for extracting a keyword candidate based on the indication information, a personal keyword extracting section 2903 for extracting a keyword candidate based on the contents of the memorandum described in the personal information notating portion 2502, a title keyword extracting section 2904 for extracting a keyword candidate based on the contents of the title shown in the title displaying portion 2501, a voice keyword extracting section 2905 for extracting a keyword candidate based on the voice information, a keyword input section 2906 for inputting a keyword candidate from the user, and a keyword control section 2907.

Next, the operation of the keyword candidate specifying section 222 is described. The time zone T specified by the time zone specifying section 221 is input into the keyword control section 2907. The keyword control section 2907 sends the time zone T to each of the extracting sections 2901 to 2905, and to the keyword input section 2906. Each of the extracting sections 2901 to 2905 extracts a keyword candidate to be attached to the time zone T, and returns the extracted keyword candidate to the keyword control section 2907. The keyword candidate which is input by the user is also sent to the keyword control section 2907. In this way, at least one keyword candidate for the time zone T is sent for collection to the keyword control section 2907. Also, at least one keyword candidate collected for the time zone T is sent to the keyword determining section 223.

For example, it is assumed that a time zone "10:00–10:01" is input into the keyword candidate specifying section 222. The document keyword extracting section 2901 retrieves the table shown in FIG. 23A which is stored in the working situation storing section 14. As a result, a time zone "10:00–10:03" (10:00→10:03) including the time zone "10:00–10:01" hits. The document keyword extracting section 2901 extracts a keyword candidate from the difference in the document which was edited in the hitting time zone. An example of a method for extracting a keyword candidate from the difference in document is a method in which only a character string corresponding to a noun is selected as a keyword candidate among the character strings included in the document difference. In order to judge whether a character string corresponds to a noun or not, it is sufficient to use a "kana-kanji conversion dictionary" which is usually used in a word processor and the like.

The indication keyword extracting section 2902 retrieves the table shown in FIG. 24A which is stored in the working situation storing section 14. As a result, a time zone "10:00–10:01" (10:00→10:01) corresponding with the time zone "10:00–10:01" hits. The indication keyword extracting section 2902 extracts a keyword candidate from character strings included in the identified range in the hitting time zone.

In a similar manner, the personal keyword extracting section 2903 and the title keyword extracting section 2904 retrieve the table shown in FIG. 25B which is stored in the working situation storing section 14. The voice keyword extracting section 2905 retrieves the table shown in FIG. 26B which is stored in the working situation storing section 14.

Next, the operation of the keyword determining section 223 is described. The keyword determining section 223 receives at least one keyword candidate from the keyword candidate specifying section 222, and selects one of the received keyword candidates based on a predetermined keyword determination rule.

FIG. 30 illustrates exemplary keyword determination rules. Rule Nos. 1–4 determine which one of the keyword candidates from the extracting sections is to be preferentially selected. Rule No. 5 determines which one of the keyword candidates extracted from a plurality of extracting sections is to be selected based on the keyword evaluation value.

Next, a method for selecting one of a plurality of keyword candidates based on the keyword evaluation value defined in FIG. 31 is described. The method is classified into four groups based on whether the evaluation of a keyword extracting section and an interval to be evaluated are considered or not.

(1) A method for selecting a keyword candidate based on a keyword evaluation value: The keyword evaluation value is used for selecting one keyword candidate, when a plurality of keyword candidates are extracted from one keyword extracting section. The keyword evaluation value is a value of the keyword occurrence ratio obtained by dividing the occurrence frequency in the keyword extracting section by the number of total keyword candidates obtained by the keyword extracting section.

(2) A method for selecting a keyword candidate based on a keyword overall evaluation value: The keyword overall evaluation value is used to consider the evaluated results of a plurality of keyword extracting sections. The keyword overall evaluation value is obtained in the following manner. First, for each extracting section, a product of the keyword evaluation value and the evaluation value for the keyword extracting section which was previously defined by the user is obtained. Then, a sum of the products is obtained. The sum is the keyword overall evaluation value.

(3) A method for selecting a keyword candidate based on a keyword significance: The keyword significance indicates the overall evaluation of keywords having the same name obtained by one keyword extracting section. The keyword significance is obtained in the following manner. For each video block (voice block), a unit-time keyword evaluation value is obtained by dividing the keyword evaluation value by a keyword occurrence time which indicates a time length of the video block or the voice block. Then, a sum of the unit-time keyword evaluation values is obtained for all the video blocks (voice blocks) in which the keyword occurs. The sum is the keyword significance.

(4) A method for selecting a keyword candidate based on a keyword overall significance: The keyword overall significance is to consider the evaluated results of a plurality of keyword extracting sections. The keyword overall significance is obtained in the following manner. First, for each keyword extracting section, a product of the keyword significance and the evaluation value for the keyword extracting section which is previously defined by the user is obtained. Then, a sum of the products is obtained. The sum is the keyword overall significance.

Referring to FIG. 32, the procedure of the method for determining a keyword based on the keyword evaluation value and the keyword significance is specifically described. First, (1) a keyword evaluation value is obtained for each interval (time zone) to be evaluated and to which a keyword is to be attached. (2) Based on the keyword evaluation value, a keyword is determined. In the example shown in FIG. 32, the keyword evaluation values of the interval (time zone) $T_1$ to be evaluated are 0.5 for "circuit board", 0.4 for "circuit diagram", and 0.1 for "safety", respectively. Accordingly, if the priority is given to a keyword having the highest keyword evaluation value, the keyword for the interval (time zone) $T_1$ to be evaluated is determined to be "circuit board". Similarly, the keyword for the interval (time zone) $T_2$ to be evaluated is determined to be "circuit diagram", the keyword for the interval (time zone) $T_3$ is determined to be "safety", and the keyword for the interval (time zone) $T_4$ is determined to be "circuit board". There may be a case where (3) the same keyword is attached to a plurality of intervals (time zones) to be evaluated. In such a case, in order to evaluate the keyword over the plurality of intervals (time zones), the time length in which the keyword occurs is considered. In the example shown in FIG. 32, the keyword "circuit board" having the keyword evaluation value of 0.5 occurs in the interval (time zone) $T_1$ having the time length of 5, and the keyword "circuit board" having the keyword evaluation value of 0.6 occurs in the interval (time zone) $T_4$ having the time length of 5. Accordingly, the keyword significance of "circuit board" is obtained as being $(0.5+0.6)/(5+5)=0.11$. Similarly, the keyword significance of "circuit diagram" is obtained as being 0.1, and the keyword significance of "safety" is obtained as being 0.25. If the order for presenting the keywords to the user is controlled based on the keyword significance, the order is "safety", "circuit board", and "circuit diagram". Therefore, it is possible to exert control so as to prevent the number of keywords attached to the video information or the voice information from unnecessarily increasing.

Figure 33:
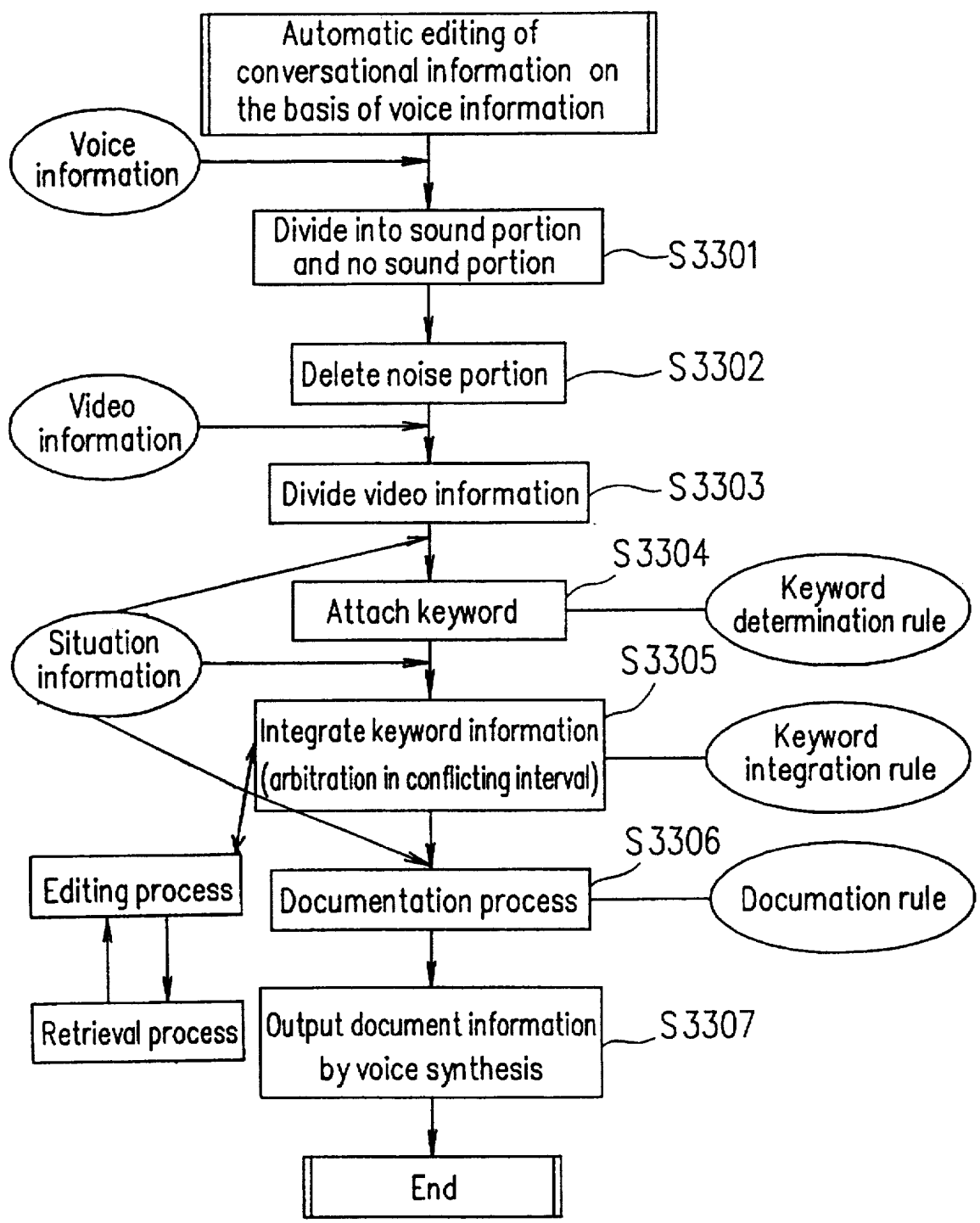
FIG. 33 is a diagram illustrating a procedure of a method for automatically editing conversation information.

Next, referring to FIG. 33, a method for automatically editing conversational information is described. This method is an exemplary one which utilizes the keyword attached to the video information or the voice information.

FIG. 33 illustrates the procedure of the method for automatically editing conversational information in the case where a keyword is attached to the video information or the voice information on the basis of the voice information. First, the voice information generated by the conversation between the users is divided into a sound portion and a no sound portion (step S3301). In order to divide the voice information into a sound portion and a no sound portion, for example, a voice power threshold level is previously determined for separating the sound state from the no sound state of the voice information, and the division is performed in accordance with the threshold level. This dividing method will be described later with reference to FIG. 34. Specifically, when one working is cooperatively performed by a plurality of users, the voice information generated by conversation is recorded and managed for each user, so that it is possible to retrieve and edit the voice information in the conversation in more detail. Next, the noise portion is deleted from the voice information obtained in step S3301 (step S3302). For example, in the case where the length of the sound portion of the voice information is shorter than a predetermined time period (e.g., 1 second), the voice information may be regarded as noise. When the noise portion is deleted from the voice information, no sound information having the same length as that of the noise portion is substituted for the noise portion of the voice information. Based on the voice information from which the noise has been deleted, the video information is divided into an interval corresponding to the no sound portion of the voice information and an interval corresponding to the sound portion of the voice information (step S3303). By using the method for attaching a keyword described in FIG. 27, a keyword is attached to the video information (or the voice information) (step S3304). In order to attach a keyword to the video information (or the voice information), the keyword determination rule such as shown in FIG. 30 may be applied. In the case where a plurality of video information channels (or a plurality of voice information channels) are provided, there may be a case where a plurality of video blocks (or voice blocks) exist in one interval representative of one and the same time zone. Hereinafter, such an interval is referred to as a conflicting interval. In the case where different keywords are attached to the plurality of video blocks (or voice blocks) in the conflicting interval, one of the keywords is selected on the basis of a predetermined keyword integration rule which is described below (step S3305). Based on the keyword attached to the video information (or the voice information) and the time at which the video information (or the voice information) is recorded, the conversational information is converted into character information (step S3306). In the last step, the character information is converted into voice information which is output (step S3307). The conversion of the character information into the voice information may be performed by voice synthesizing.

Figure 34:
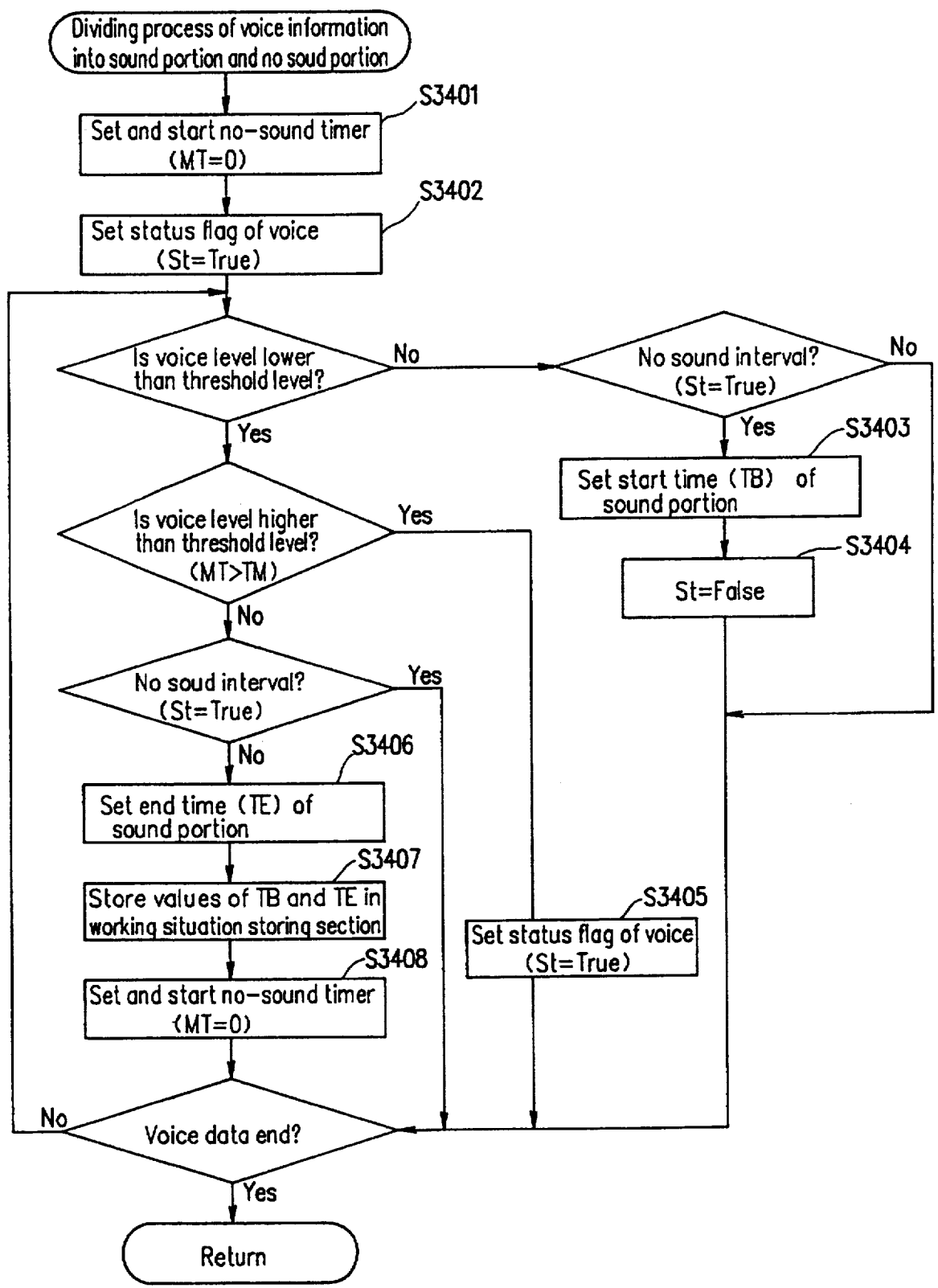
FIG. 34 is a diagram illustrating a procedure of a method for dividing voice information into a sound portion and a no sound portion.

FIG. 34 shows a procedure of the method for dividing the voice information into a sound portion and a no sound portion. In order to measure the time length of the no sound interval of voice, a no-sound timer is set (MT=0) (step S3401). A status flag indicating whether the voice information is the sound portion or the no sound portion is set, that is, St=True (step S3402). If the level of voice is lower than the threshold level (ThV), the time (TB) from which the sound portion starts is set (step S3403). Note that the threshold level (ThV) is previously set based on the voice level in the no-voice condition. The status flag of voice is made clear, that is, St=False (step S3404). If the level of voice is lower than the threshold level (ThV) and the length of the no sound interval exceeds a threshold time period (TM), the status flag of voice is set (step S3405). Note that the threshold time period (TM) is previously set to be a length in the range of approximately 400 milliseconds to 1 second. If the level of voice is lower than the threshold level (ThV), the length of the no sound interval does not exceed the threshold time period (TM), and the previous voice interval was the sound portion, the time (TE) at which the sound portion is over (step S3406). The values of TB and TE are output to the working situation storing section 14 (step S3407). The no-sound timer is set (step S3408).

Figure 35A:
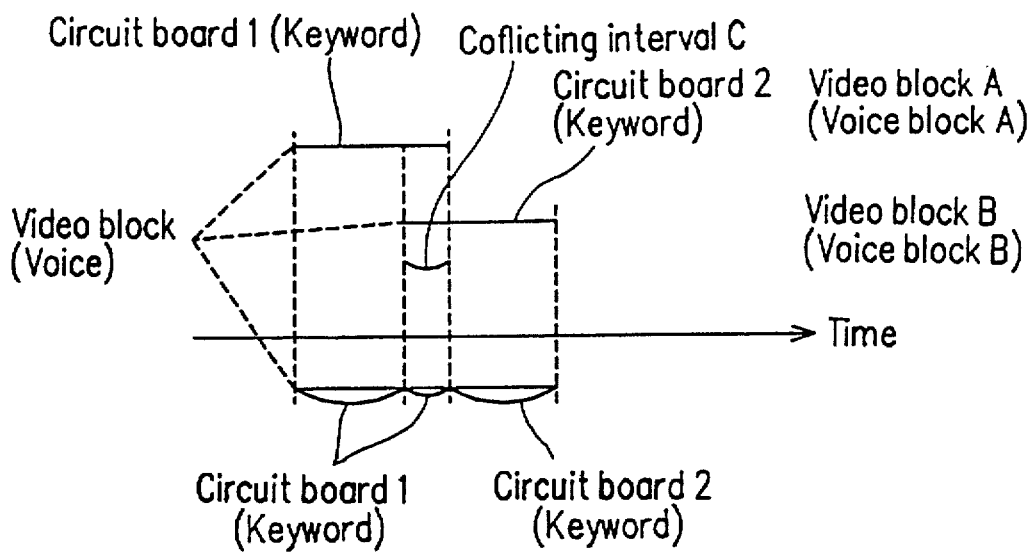
FIGS. 35A and 35B are diagrams illustrating keyword integration rules in a conflicting interval.
Figure 35B:
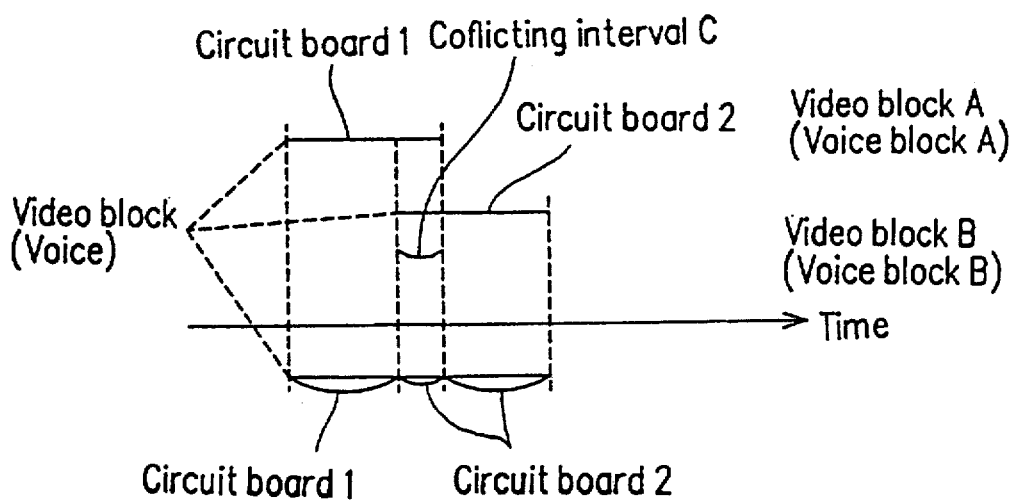
Figure 36A:
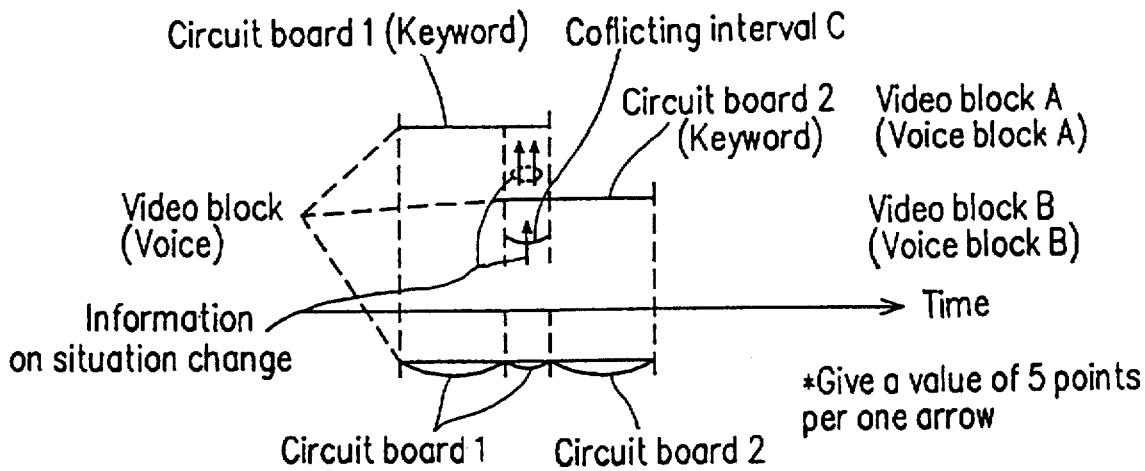
FIGS. 36A and 36B are diagrams illustrating keyword integration rules in a conflicting interval.
Figure 36B:
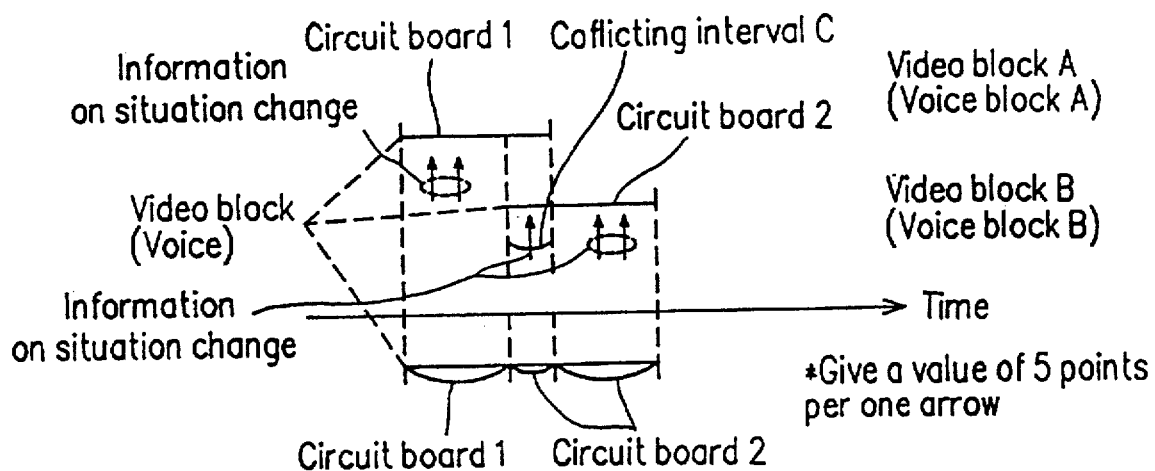

Next, referring to FIGS. 35 and 36, the keyword integration rule in the conflicting interval is described. Hereinafter, the keyword integration rule is described for the case in which video blocks are conflicting. It is appreciated that the rule can be also applied for the case in which voice blocks are conflicting. It is assumed that a video block A and a video block B are conflicting, and there exists a conflicting interval C of the video blocks A and B. There are four exemplary keyword integration rules (a) to (d) as follows.

(a) A rule for giving priority to a video block which starts earlier. In the example shown in FIG. 35A, the start time of the video block A is earlier than the start time of the video block B, so that the keyword "circuit board 1" attached to the video block A is selected in the conflicting interval C.

(b) A rule for giving priority to a video block which starts later. In the example shown in FIG. 35B, the start time of video block B is later than the start time of video block A, so that the keyword "circuit board 2" attached to video block B is selected in conflicting interval C.

(c) A rule for determining the keyword based on the evaluation value of user operation history information (information on situation change) in the conflicting block C. In the example shown in FIG. 36A, the information on situation change is represented by an upward arrow. The number of arrows indicates the frequency of occurrence of situation changes. In the conflicting interval C, the frequency of occurrence of situation changes for video block A is larger than the frequency of occurrence of situation changes for video block B. Accordingly, in conflicting interval C, the keyword "circuit board 1" attached to video block A is selected.

(d) A rule for determining the keyword based on the evaluation value of user operation history information (information on situation change) included in each time zone in the video blocks. In the example shown in FIG. 36B, the frequency of occurrence of situation changes for video block B is larger than the frequency of occurrence of situation changes for video block A. Accordingly, in conflicting interval C, the keyword "circuit board 2" attached to video block B is selected.

Figures 37, 38:
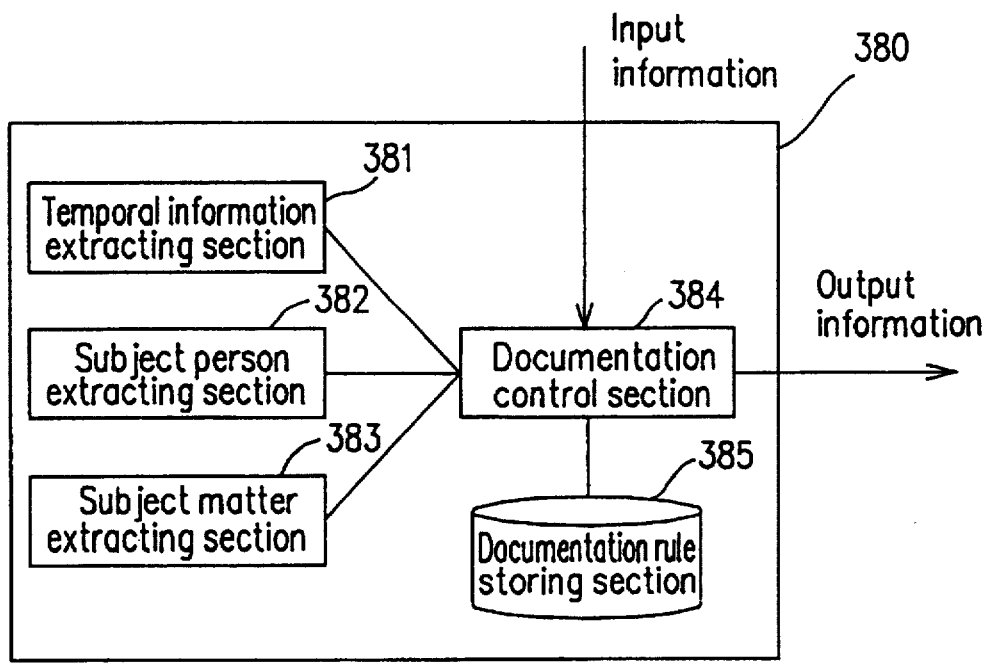
FIG. 37 is a diagram showing keyword integration rules in a conflicting interval.
FIG. 38 is a diagram showing a construction of a documenting section.

FIG. 37 shows an example in which the keyword integration rules in the conflicting interval are described. In FIG. 37, four rules including the keyword integration rules which are described above with reference to FIGS. 35A, 35B, 36A, and 36B are shown. A keyword in the conflicting interval is determined based on these rules.

Next, a documenting section 380 for producing character information on the working situation by utilizing the keyword stored in the keyword storing section 224 will be described. The documenting section 380 is included in the working situation management apparatus.

FIG. 38 shows a construction of the documenting section 380. The documenting section 380 includes a temporal information extracting section 381 for extracting the relationship between the keyword and the time zone in which the keyword occurs (information relating to "When"), a subject person extracting section 382 for extracting the relationship between the keyword and the subject person (information relating to "Who"), a subject matter extracting section 383 for extracting the keyword itself, a documentation rule storing section 385 for storing documentation rules, and a documentation control section 384.

Referring to FIGS. 39A to 39C, a method for producing character information on the working situation is described. Hereinafter, a method by which the character information on the working situation is produced based on the video information is described. However, it is appreciated that the voice information can also be used for the method for producing the character information on the working situation. (a) Attribute information for producing character information is previously assigned to each video block. The attribute information includes information specifying the subject person to be captured (information relating to "Who"), information indicating start and end times of the capturing (information relating to "When"), information specifying a hypothetical conference place set by the user (information relating to "Where"), information specifying the subject matter (information relating to "What"), and information indicating whether voice output exists or not (information relating to "How"), as shown in FIG. 39A. As the information specifying the subject matter, the keyword attached to the video block may be used. As described above, in order to document the working situation based on the 5W1H (Who, Why, What, When, Where, How) viewpoint, the attribute information is previously assigned to each video block. (b) A specific video block of a plurality of video blocks included in the video information is selected based on a predetermined documentation rule. The predetermined documentation rule is previously produced by the user. For example, there is a documentation rule that "the no sound interval is not documented" as is shown in FIG. 39B, only the video blocks corresponding to the sound portions of the video information are selected. (c) Character information on working situation corresponding to the selected video blocks is produced based on the attribute information previously assigned to the video blocks and in accordance with the predetermined documentation rule. For example, to a specific video block, "Mr. Yamaguchi" is assigned as information relating to "Who", "at about 0 0 o'clock" is assigned as information relating to "When", "regarding ΔΔ" is assigned as information relating to "What", and "talked" is assigned as information relating to "How". In such a case, for example, as is shown in FIG. 39C, character information "Mr. Yamaguchi talked regarding ΔΔ about 0 0 o'clock" is produced.

Figure 40:
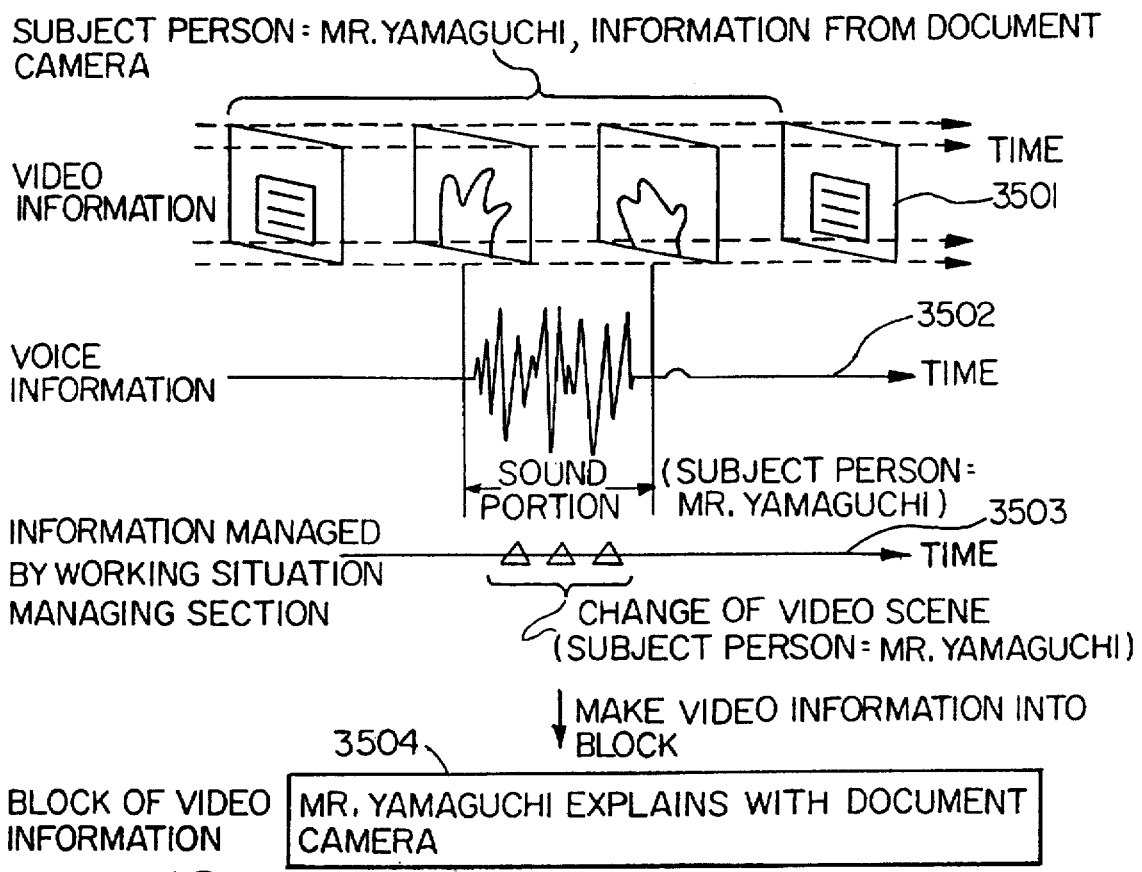
FIG. 40 is a diagram illustrating another method for producing character information indicating the working situation.

Referring to FIG. 40, another method for producing character information indicating the working situation is described. The method includes a step of specifying the sound portion in the voice information, a step of specifying the video block corresponding to the sound portion, a step of detecting the change in working situation, and a step of producing character information for the video block based on the detected change in working situation. For example, when a change of video scene and a voice block are detected, character information "Mr. Yamaguchi explains with document camera" can be produced in accordance with the rule No. 3 in FIG. 39B. In addition, when the keyword attached to the video block is "circuit board", the keyword is used as information for specifying the subject matter, so as to produce character information "Mr. Yamaguchi explains circuit board with document camera". As described above, character information indicating the kind of working can be produced based on the video information (or voice information), and the video information (or the voice information) can be retrieved by using the character information as a retrieval key.

Next, the keyword retrieving section 410 is described. The keyword retrieving section 410 retrieves the working situation stored in the working situation storing section 14 by using the keyword stored in the keyword storing section 224. The keyword retrieving section 410 is included in the working situation management apparatus.

Figure 41:
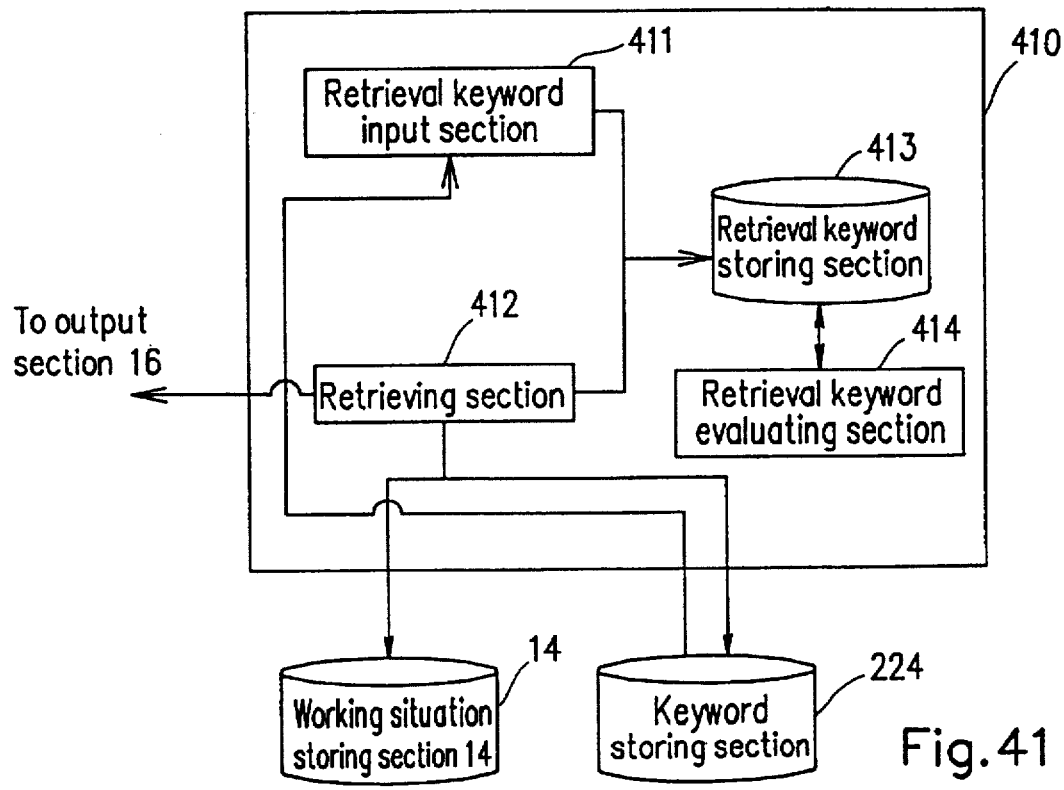
FIG. 41 is a diagram showing a construction of a keyword retrieving section.

FIG. 41 shows the construction of the keyword retrieving section 410. The keyword retrieving section 410 includes a retrieval keyword input section 411 for inputting a retrieval keyword from the user, a retrieving section 412 for retrieving the working situation storing section 14 based on the input retrieval keyword, a retrieval keyword storing section 413 for storing the input retrieval keyword and the retrieval result, and a retrieval keyword evaluating section 414 for evaluating whether the retrieval keyword is appropriate or not based on the retrieval result.

Next, the operation of the keyword retrieving section 410 is described.

The retrieval keyword input section 411 inputs a retrieval keyword from the user. In order to facilitate the input of a retrieval keyword by the user, the retrieval keyword input section 411 displays a plurality of keywords stored in the keyword storing section 224 in a menu style, so as to allow the user to selectively input one of the displayed keywords as a retrieval keyword. The retrieval keyword input via the retrieval keyword input section 411 is stored in the retrieval keyword storing section 413.

The retrieving section 412 retrieves the working situation storing section 14 based on the input retrieval keyword. In more detail, the retrieving section 412 judges whether the retrieval keyword matches any one of the plurality of keywords stored in the keyword storing section 224, and outputs the video information to which the matched keyword is attached to the output section 16 as the retrieval result. Instead of the video information, or in addition to the video information, any desired information stored in the working situation storing section 14 may be output to the output section 16 as the retrieval result. The retrieving section 412 makes an inquiry as to whether the retrieval result output to the output section 16 is the desired one or not, to the user. The response to the inquiry from the user is stored in the retrieval keyword storing section 413. In this way, information indicating whether a desired retrieval result can be obtained for the input retrieval keyword or not is accumulated in the retrieval keyword storing section 413.

FIG. 42 shows exemplary information stored in the retrieval keyword storing section 413. In this example, in addition to the retrieval keyword input from the user, the group name to which the user belongs, the name of the user, the time and date when the retrieval keyword is input, the item name to which the keyword is input, the document name which is retrieved based on the retrieval keyword, and information indicating whether the retrieved document matches the document which is desired by the user or not are stored. In this example, when the retrieved document matches the document which is desired by the user, "Adopted" is stored. Otherwise, "Not adopted" stored. Alternatively, any value indicating the degree of matching of the retrieved document and the document which is desired by the user may be stored. For example, a matching degree "70%" is stored. Herein, an example in which a document is to be retrieved is described. It is appreciated that, instead of the document or in addition to the document, any information stored in the working situation storing section 14 can be retrieved. In order to make it possible that the retrieval is performed in a plurality of viewpoints, it is preferred that a plurality of items to which the retrieval keyword can be input are provided as is shown in FIG. 43.

Figure 43:
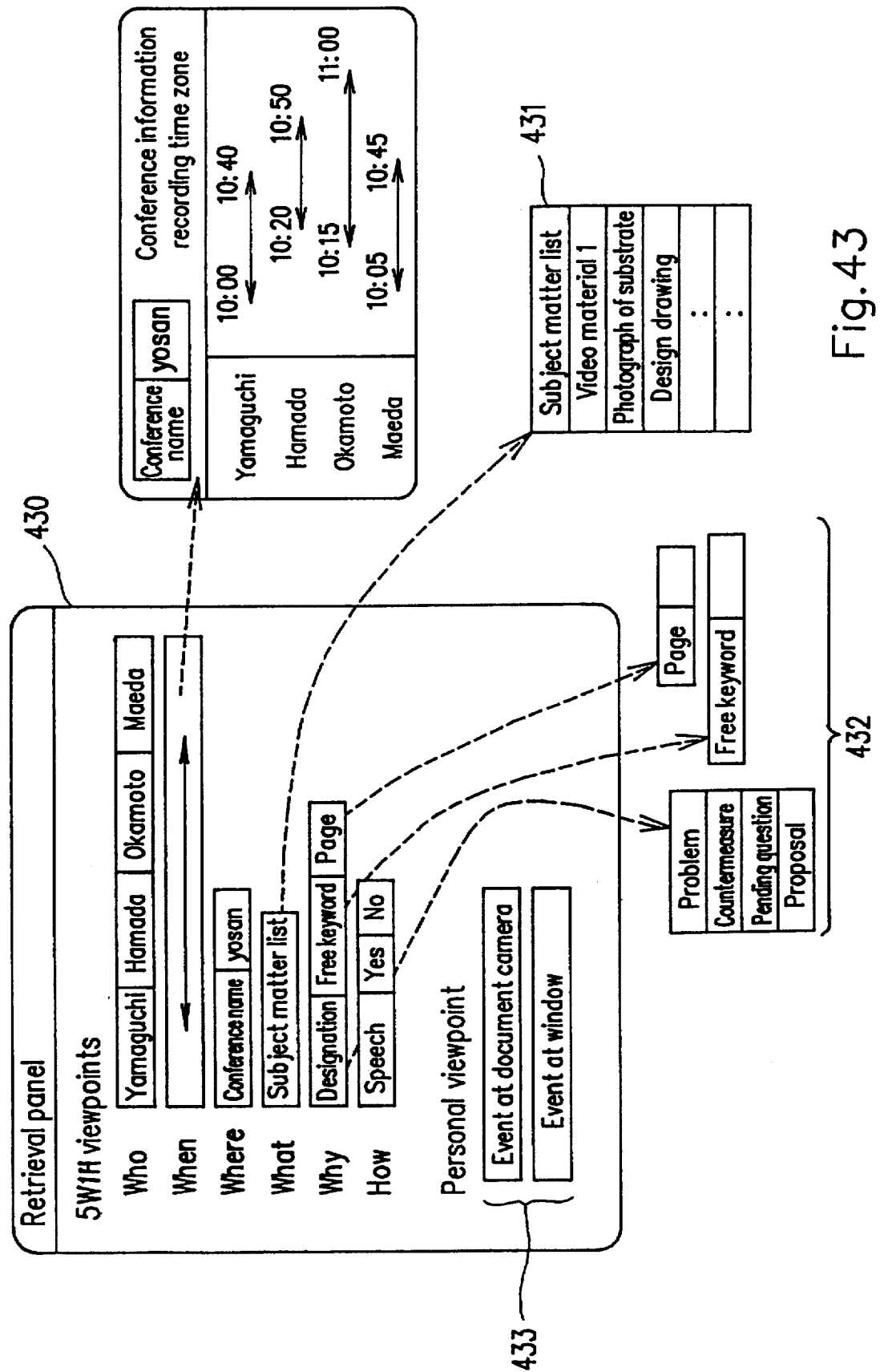
FIG. 43 is a diagram showing a retrieval panel for inputting a retrieval keyword.

FIG. 43 shows an exemplary retrieval panel 430 for inputting retrieval keywords. The retrieval panel 430 provides a user interface for retrieving information to the user. The retrieval panel 430 includes a video keyword input section 431, a document keyword input section 432, and an event input section 433. The video keyword input section 431 displays a plurality of keywords which are attached to the video information in a menu style, and allows the user to selectively input one of the displayed keyword as a retrieval keyword. The document keyword input section 432 allows the user to input a retrieval keyword for retrieving a document. The event input section 433 allows the user to input any situation change caused by the operation of the document camera (e.g., change of video scene, change of video channel, and the like), or any situation change caused by the operation of windows by the user (e.g., move of mouse pointer, the open or closed state of window, and the like), as a retrieval keyword.

Next, the operation of the retrieval keyword evaluating section 414 shown in FIG. 41 is described.

Figure 44:
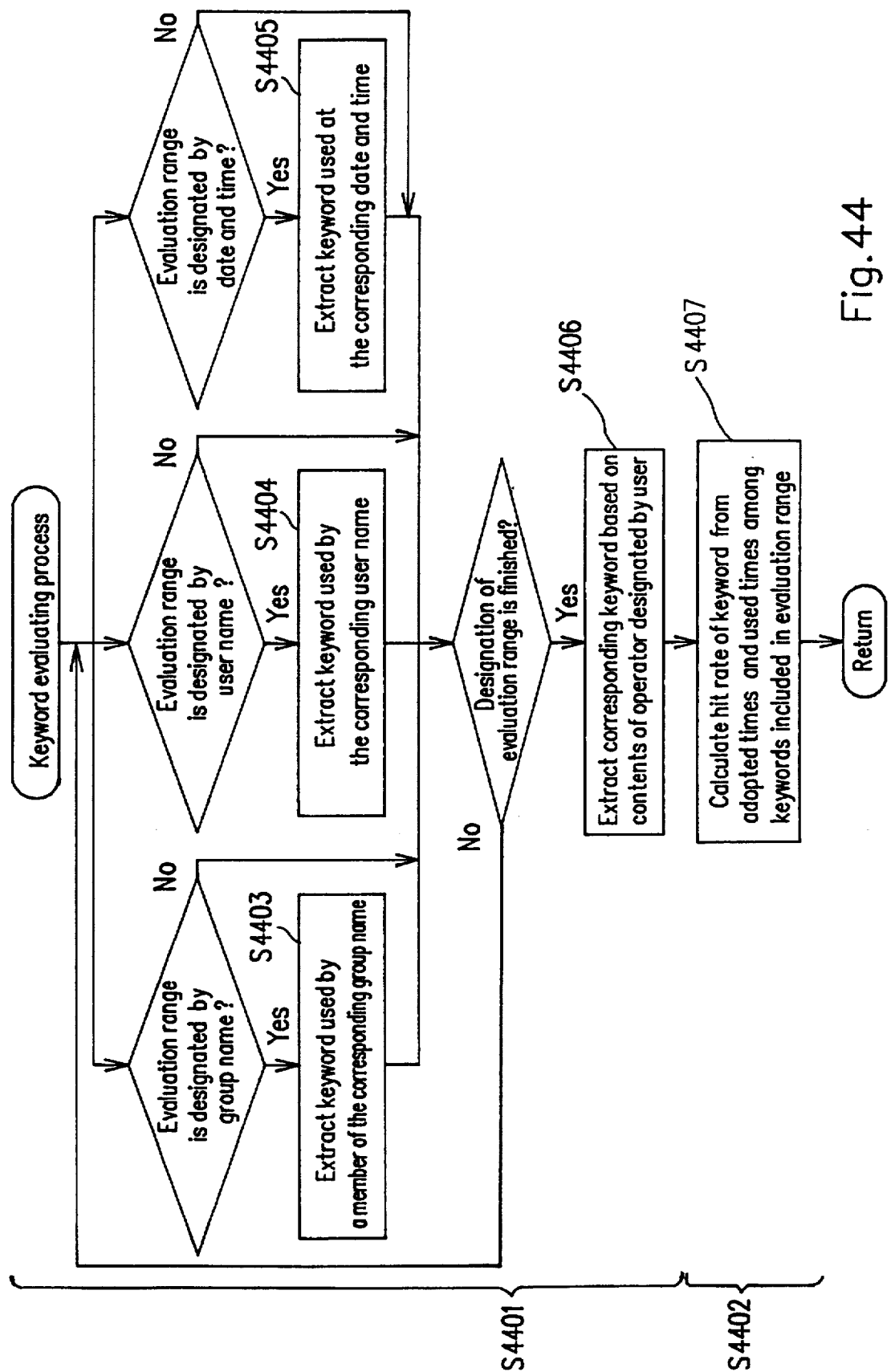
FIG. 44 is a diagram illustrating a procedure of an evaluation process of a retrieval keyword.

FIG. 44 shows the flow of a process executed by the retrieval keyword evaluating section 414. The process includes a step of designating an evaluation range (S4401) and a step of evaluating a retrieval keyword in the designated evaluation range (S4402). In order to designate the evaluation range, at least one of a group name, a user name, and the date and time is input into the retrieval keyword evaluating section 414.

The step of designating the evaluation range (S4401) includes a step of, when a group name is input, extracting a retrieval keyword used by any user who belongs to the group from the retrieval keyword storing section 413 (S4403), a step of, when a user name is input, extracting a retrieval keyword used by the user from the retrieval keyword storing section 413 (S4404), a step of, when a date and time is input, extracting a retrieval keyword used at the date and time from the retrieval keyword storing section 413 (S4405), and a step of extracting a retrieval keyword from the retrieval keyword storing section 413 based on the retrieval conditions defined by operators (e.g., OR and AND) designated by the user (S4406).

The step of evaluating the retrieval keyword in the designated evaluation range (S4402) includes a step of calculating, as to the retrieval keyword extracted in step S4401, a hit rate of the retrieval keyword based on the adopted times and the used times of the retrieval keyword (S4407). Herein, the hit rate (%) of the retrieval keyword is calculated by dividing the adopted times by the used times, and then multiplying the divided result by 100 (i.e., the adopted times /the used times x 100).

By presenting, to the user, retrieval keywords which hitherto have been input in the order of high hit rate, it is possible for the user to easily input any one of the keywords with a high possibility that a desired retrieval result is obtained from the retrieval keyword. As a result, the number of operations for inputting a retrieval keyword by the user until the user obtains a desired retrieval result is reduced. In addition, if the evaluation value for the retrieved information (i.e., the matching degree of the information desired by the user and the retrieved information, e.g., a value between 0 to 1) is accumulated in the retrieval keyword storing section 413, it becomes possible to present a retrieval keyword with a higher possibility that a desired retrieval result is obtained to the user. In such a case, the hit rate (%) of the retrieval keyword is obtained by the adopted times x the evaluation value/the used times x 100.

Figure 45:
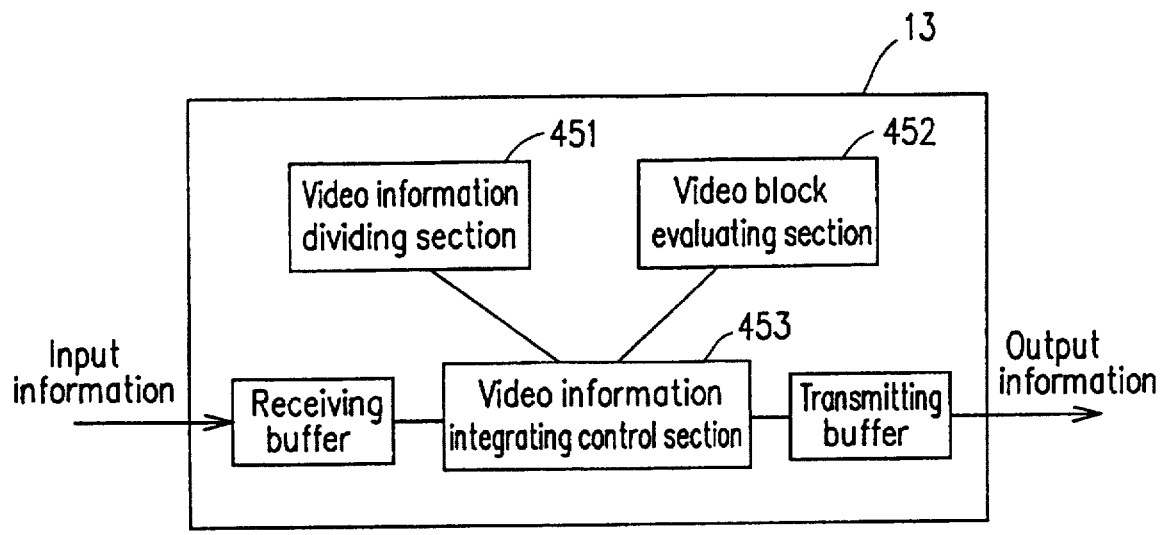
FIG. 45 is a diagram showing another construction of the working situation managing section.

FIG. 45 shows another construction of the working situation managing section 13. The working situation managing section 13 includes a video information dividing section 451 for dividing the video information into s plurality of video blocks, a video block evaluating section 452 for evaluating the video blocks, and a video information integrating control section 453 for controlling the video information dividing section 451 and the video block evaluating section 452.

Next, the operation of the working situation managing section 13 shown in FIG. 45 is described.

The video information dividing section 451 divides the video information into logical video blocks based on the working situation stored in the working situation storing section 14. Each video block includes at least one video scene. For example, the video information may be divided into video blocks in accordance with the sound portions of the voice information. The detail of the method for dividing the video information into blocks has been described, so that the description is omitted. In this way, the video information dividing section 451 divides first video information into a plurality of first video blocks, and divides second video information into a plurality of second video blocks. For example, the first video information is the video information which was captured by a user A, and the second video information is the video information which was captured by a user B.

The video block evaluating section 452 judges whether there are a plurality of video blocks in one time zone. If it is judged that there are a plurality of video blocks in one time zone, the video block evaluating section 452 determines which one of the video blocks is preferentially selected. Therefore, in an example case where there are one of the first video blocks and one of the second video blocks in one time zone, either one of the video blocks, the first one or the second one, existing in one time zone is selected. In this way, the first video information and the second video information are integrated, so as to produce one unit of video information. As a result, it is possible to produce video information indicating the conversation situation between users A and B, based on the video information captured by user A and the video information captured by user B.

Figure 46:
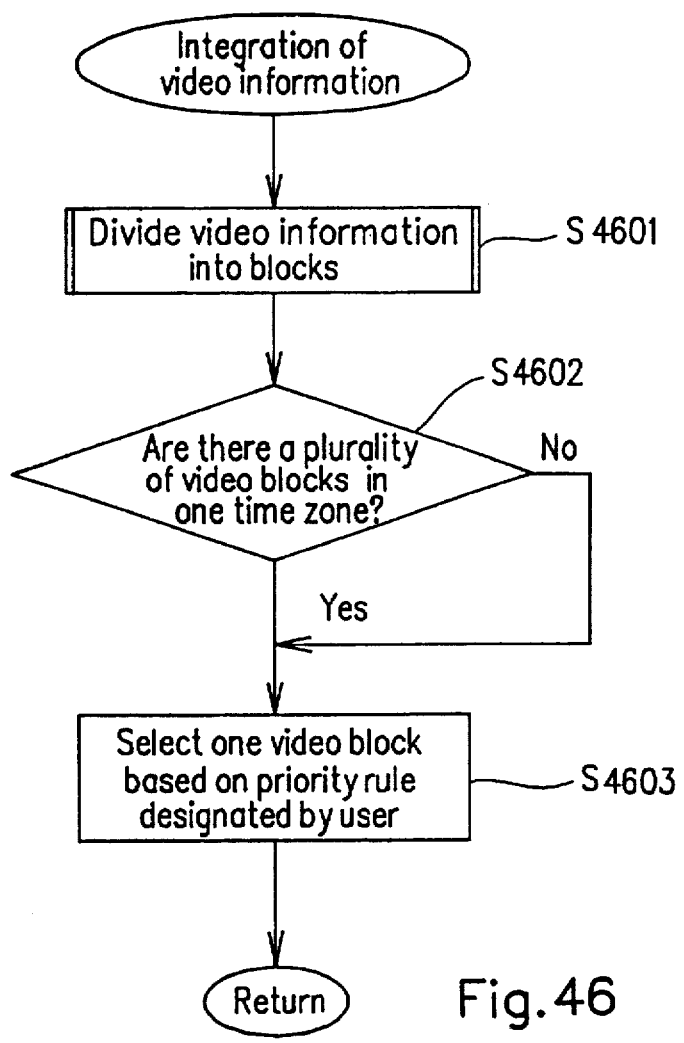
FIG. 46 is a diagram illustrating a procedure of integration of video information.

FIG. 46 shows a procedure of the video information integration process executed by the working situation managing section 13 shown in FIG. 45. The video information dividing section 451 divides the video information into blocks, so as to produce a plurality of video blocks (step S4601). The video block evaluating section 452 judges whether there are a plurality of video blocks in one time zone or not (step S4602). If it is judged that there are a plurality of video blocks in one time zone, the video block evaluating section 452 determines which one of the plurality of video blocks is preferentially selected based on a predetermined priority rule (step S4603). The predetermined priority rule is previously set by the user.

FIG. 47 shows an example of the priority rule. As is shown in FIG. 47, the priority rule may be various priority rules, such as a priority rule relating to the change of working situation, and a priority rule based on the time sequence relationship.

Figure 48A:
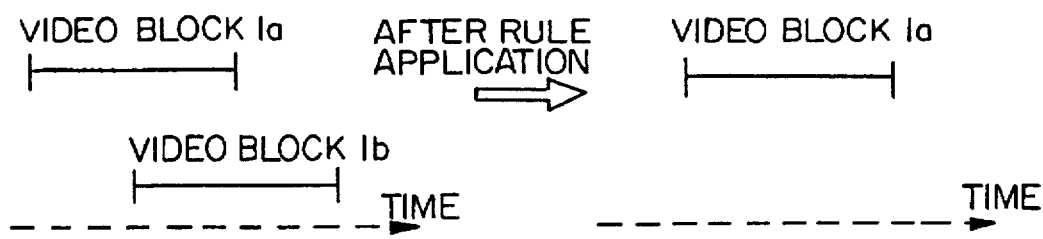
FIGS. 48A to 48C are diagrams for specifically illustrating the priority rules.
Figure 48B:
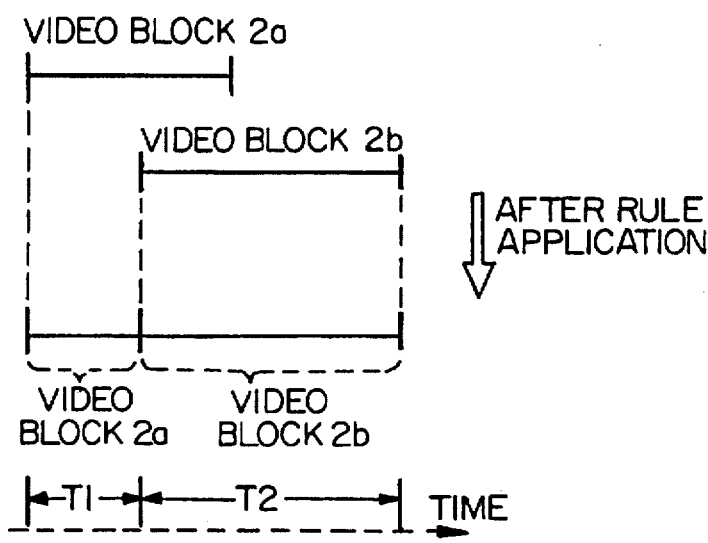
Figure 48C:
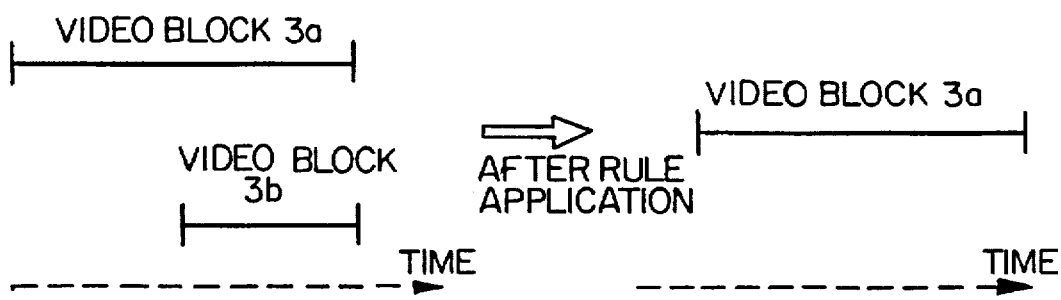
Figure 49A:
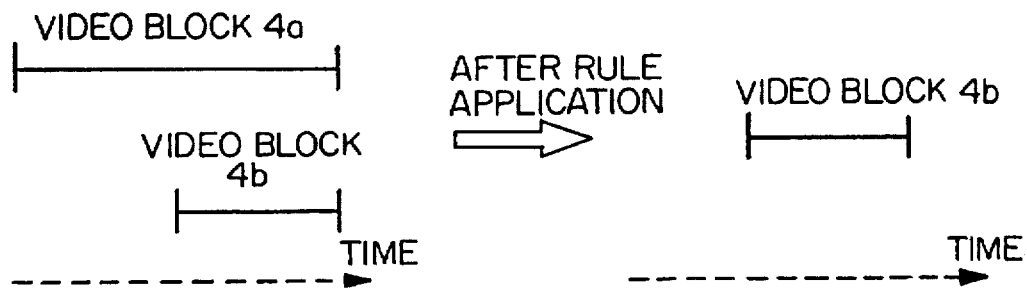
FIGS. 49A to 49C are diagrams for specifically illustrating the priority rules.
Figure 49B:
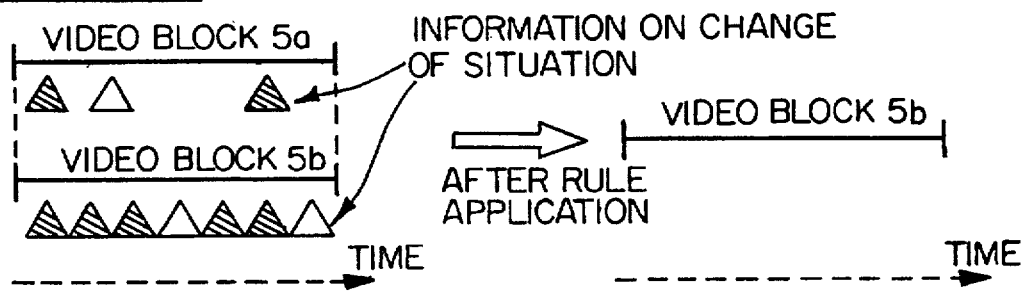
Figure 49C:
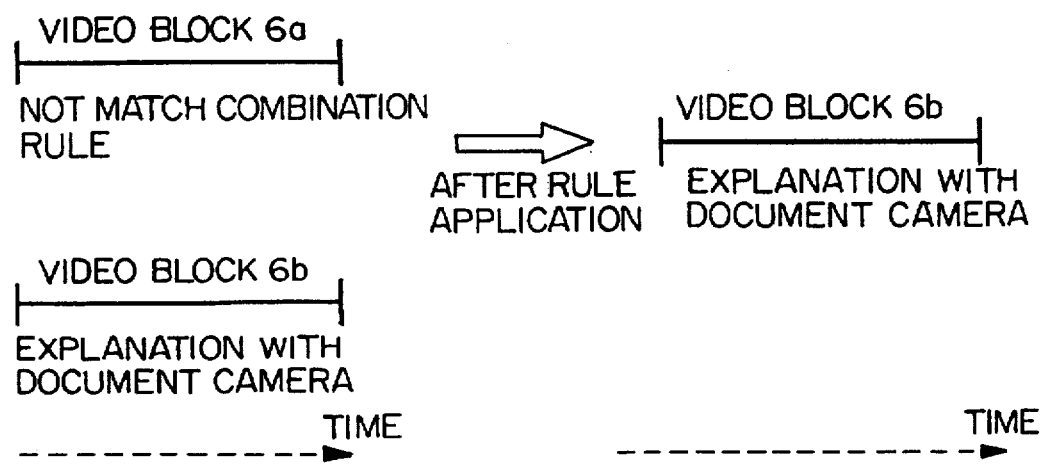

Next, referring to FIGS. 48 to 50, the priority rules which are shown in FIG. 47 as rule Nos. 1 to 10 are specifically described.

Rule No. 1 defines that, if there are a plurality of video blocks in one time zone, the video block which starts earliest should be preferentially selected. In the example shown in FIG. 48A, since the start time of video block 1a is earlier than the start time of video block 1b, video block 1a is selected.

Rule No. 2 defines that, if there are a plurality of video blocks in one time zone, the video block which starts latest should be preferentially selected. In the example shown in FIG. 48B, since the start time of video block 2b is the latest in the time zone T$_2$, video block 2b is selected. However, in the time zone T$_1$, the start time of video block 2a is the latest, so that video block 2a is selected.

Rule No. 3 defines that, if there are a plurality of video blocks in one time zone, the video block which is the longest one in time is preferentially selected. In the example shown in FIG. 48C, video block 3a is longer than video block 3b, so that video block 3a is selected.

Rule No. 4 defines that, if there are a plurality of video blocks in one time zone, the video block which is the shortest one in time should be preferentially selected. In the example shown in FIG. 49A, video block 4b is shorter than the video block 4a, so that video block 4b is selected.

Rule No. 5 defines that, if there are a plurality of video blocks in one time zone, the video block which includes the largest amount of information indicating the change of working situation in one unit time should be preferentially selected. In the example shown in FIG. 49B, video block 5b includes the larger amount of information indicating the change of working situation in one unit time than video block 5a, so that video block 5b is selected.

Rule No. 6 defines that, if there are a plurality of video blocks in one time zone, the video block which matches a combination rule of predetermined events should be preferentially selected. In the example shown in FIG. 49C, video block 6b matches the combination rule of predetermined events, so that video block 6b is selected.

FIG. 51 shows exemplary combination rules of events. The combination rule of events defines a combination of events which occurs substantially at the same time in the working, and an event name corresponding to the combination. For example, when a user explains the materials by using a document camera, the user often indicates the subject matter with a hand. Therefore, the motion of the hand and the voice occur substantially at the same time. As is shown in the first line of FIG. 51, the combination of the event "change of video scene" and the event "voice block" is defined as the event "explanation with document camera". When the user explains the material information displayed on the window, the indication by the mouse pointer and the voice occur substantially at the same time. As is shown in the second line of FIG. 51, for example, the combination of the event "indication by mouse pointer" and the event "voice block" is defined as the event "explanation on window".

Figure 50A:
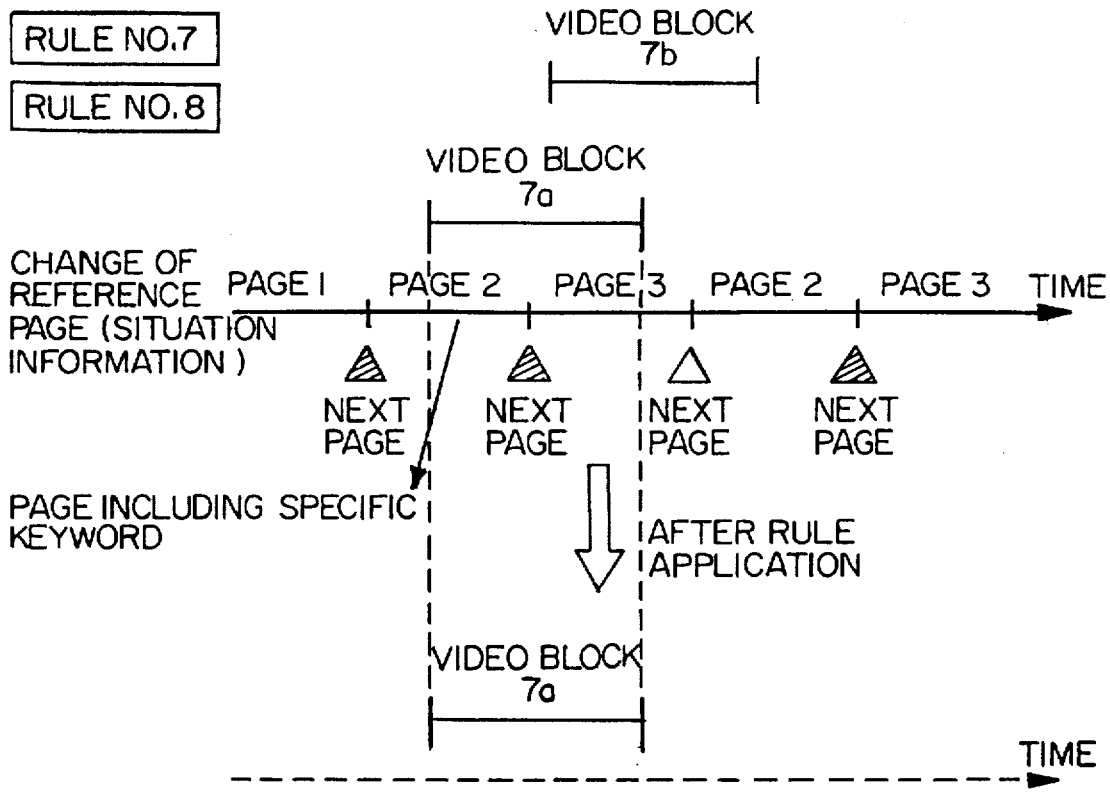
FIGS. 50A and 50B are diagrams for specifically illustrating the priority rules.
Figure 50B:
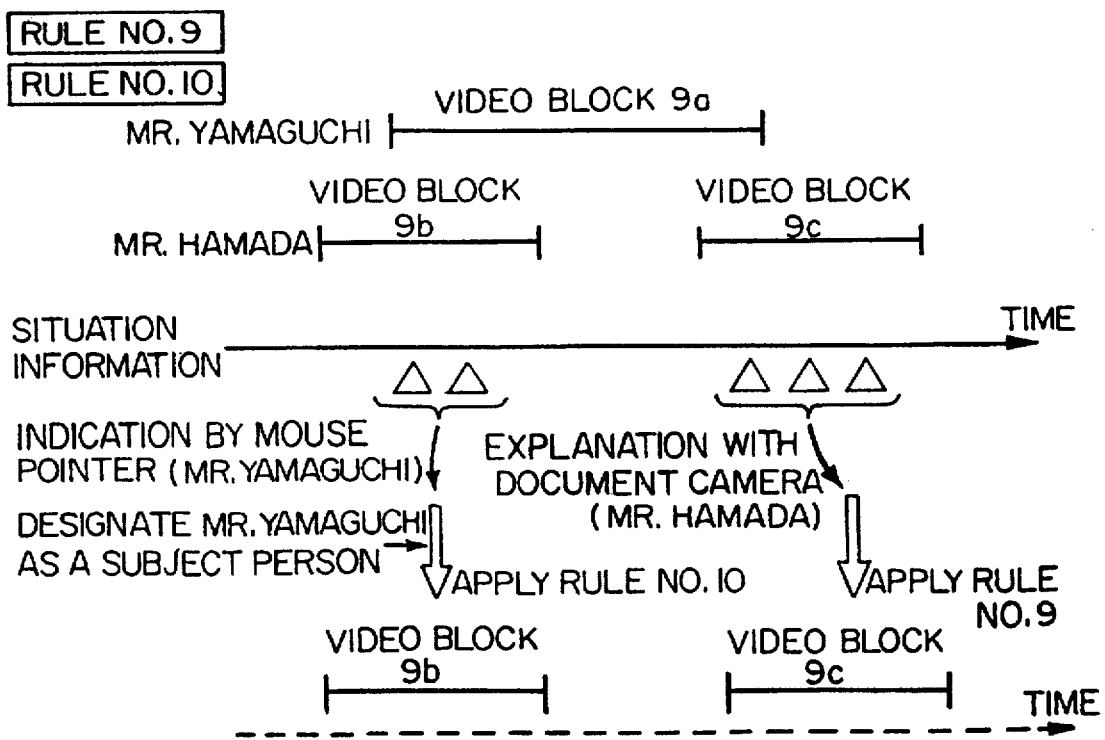

Referring to FIGS. 50A and 50B, rule No. 7 defines that, if there are a plurality of video blocks in one time zone, the video block corresponding to a time zone in which document information including the designated keyword is utilized should be preferentially selected. Rule No. 8 defines that, if there are a plurality of video blocks in one time zone, the video block corresponding to a time zone in which document information including the largest number of the designated keyword is utilized should be preferentially selected. In the example shown in FIG. 50A, the designated keyword is included in the second page of the document information, so that video block 7a is selected.

Rule No. 9 defines that, if there are a plurality of video blocks in one time zone, the video block corresponding to a time zone in which the designated change of working situation occurs should be preferentially selected. Rule No. 10 defines that, if there are a plurality of video blocks in one time zone, the video block relating to the designated subject person should be preferentially selected. In the example shown in FIG. 50B, if rule No. 9 is adopted, video block 9b is selected, and if rule No. 10 is adopted, video block 9c is selected.

Figure 52:
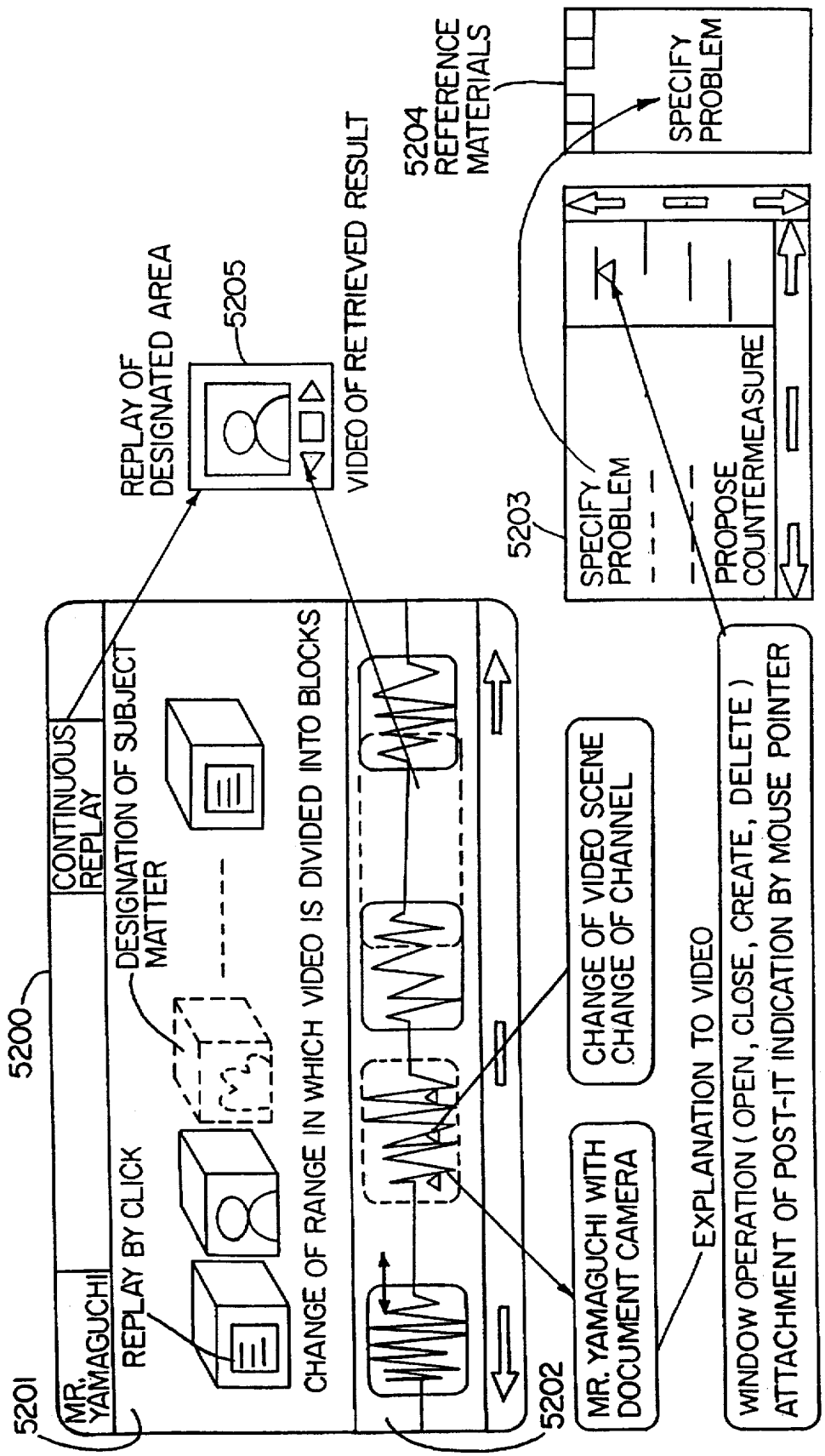
FIG. 52 is a diagram showing a screen image of the operation panel for operating information.

FIG. 52 shows an operation panel 5200 for operating information. The operation panel 5200 provides a user with a user interface to the working situation management apparatus. The operation panel 5200 includes a panel 5201 for displaying the result obtained by dividing the video information into video blocks constituted of at least one video frame, a panel 5202 for displaying the result obtained by dividing the voice into sound and no sound portions, and information indicating the change of working situation (switch of video scene, and switch of video channel), a panel 5203 for displaying information indicating the operation to the window by the user (e.g., open, close, create, delete of window), the writing into post-it (personal memorandum attached with the window), and the history of indication by a mouse pointer, a panel 5204 for displaying reference materials, and a panel 5205 for displaying the retrieval result.

Figure 53:
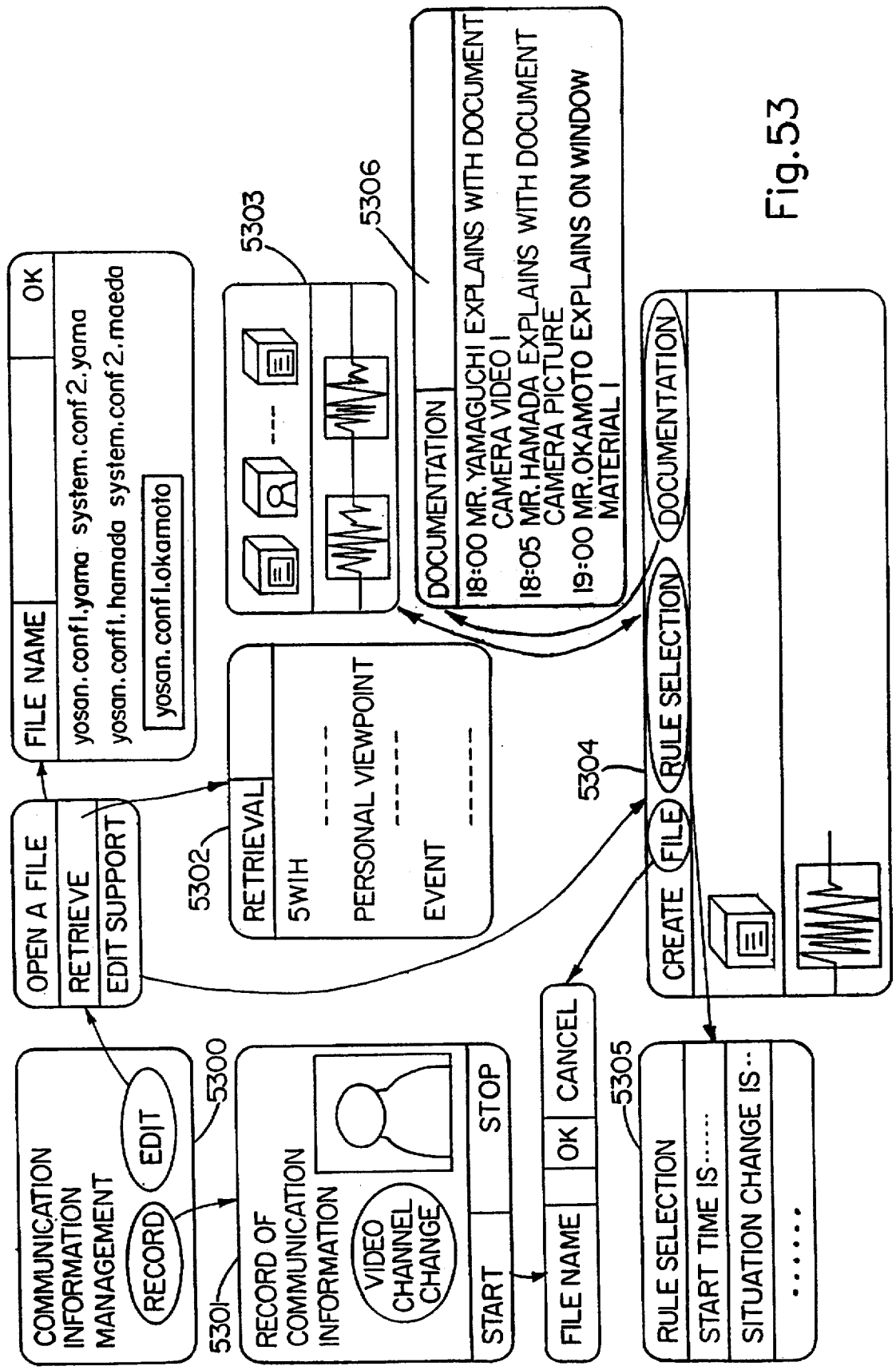
FIG. 53 is a diagram showing a screen image of the operation panel for performing the retrieval and editing of information.

FIG. 53 shows an operation panel 5300 for retrieving and/or editing information. The operation panel 5300 provides a user with a user interface to the working situation management apparatus. As is shown in FIG. 53, the operation panel 5300 includes an operation panel 5301 for recording the working situation, an operation panel 5302 for retrieving the information, an operation panel 5303 for operating the information, an operation panel 5304 for editing a plurality of units of information, and an operation panel 5305 for selecting the priority rule in the case where a plurality of video blocks exist in one time zone. My selecting the priority rule in the operation panel 5305, it is possible to semi-automatically edit the information by a computer. An operation panel 5306 is a panel for automatically converting the working situation (e.g., the contents of the conference) into character information, in accordance with the temporal information, the event name attached to the video block, and the information relating to the subject matter for each video block.

Figure 54:
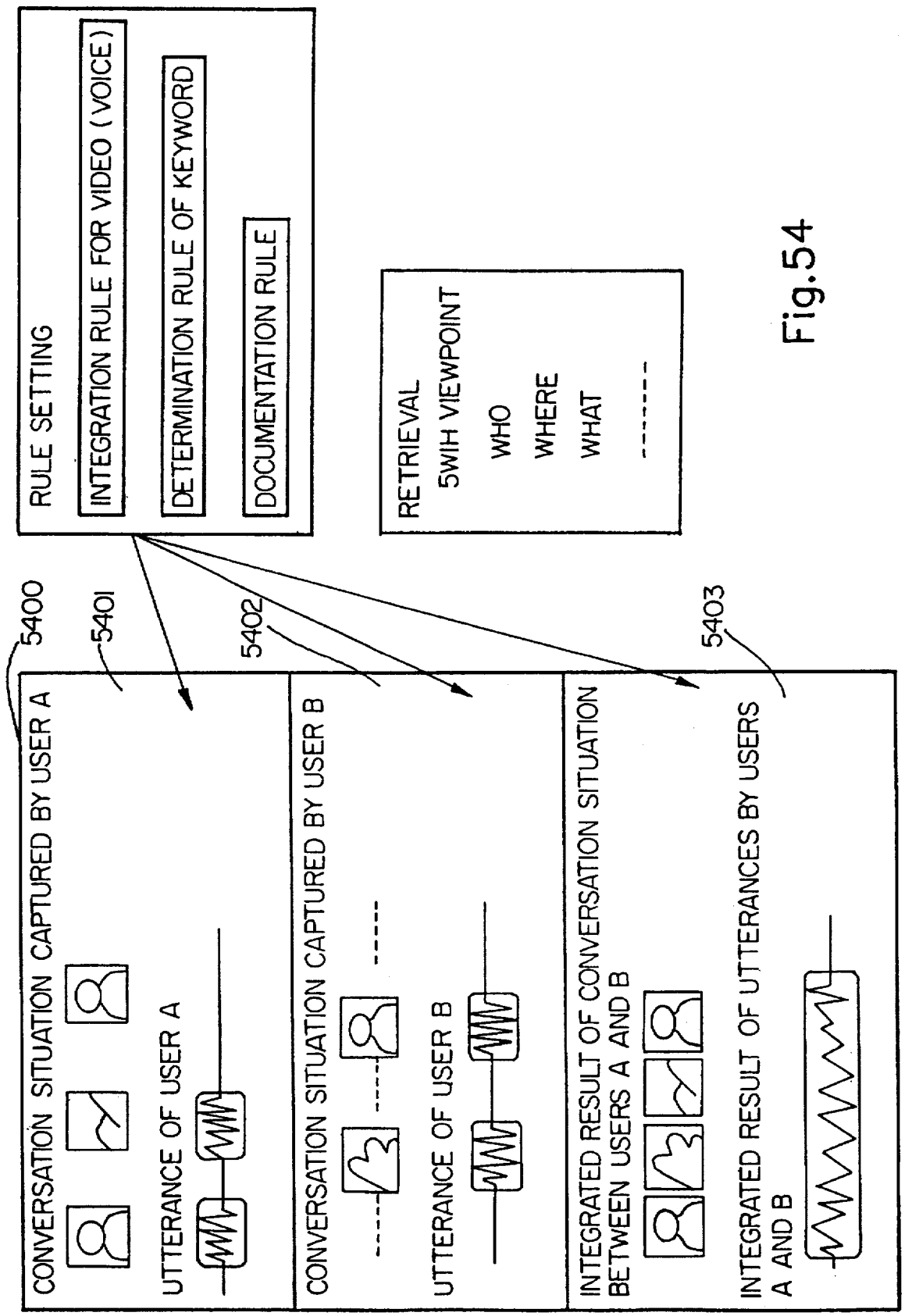
FIG. 54 is a diagram showing a screen image of the operation panel for integrating video information and voice information which are recorded for each participant.

FIG. 54 shows an operation panel 5400 for integrating the video information and voice information recorded for each participant. The operation panel 5400 includes a panel 5401 for displaying the video information captured by a certain user A and the voice information relating to utterance, a panel 5402 for displaying the video information captured by another user B and the voice information relating to utterance, and a panel 5403 for displaying the integrated video information and voice information as the result of the automatic editing.

The present invention can be applied to, in addition to conference, retrieval/editing of multimedia mails when it is used in an editing apparatus for personal use, instructional aid production with CAI (computer-aided instruction) when it is used in an editing apparatus for common use, and the like.

As described above, according to the working situation management apparatus of this invention, it is possible to manage various kinds of information indicating working progress in time sequence. Accordingly, a desired portion of the video information or the voice information recorded during the working can easily be retrieved, specifically based on the change of working situation. In addition, in order that the user can work by effectively using the required information (materials, comments, and situation of the conference), it is possible to manage the working situation based on a personal viewpoint in connection with the personal ordinary working contents. Furthermore, it is possible to handle dynamic information which is difficult to be systematically handled, such as conversation situation, based on the personal viewpoint. In addition, according to the invention, only the video information and the voice information at the time when the user is assumed to be specifically interested is recorded or output so that the amount of information presented to the user and the required memory capacity can be reduced.

Moreover, according to the working situation management apparatus of the invention, it is possible to attach a keyword to video information and voice information. By using such a keyword, a desired portion of the video information and the voice information can easily be retrieved. Also, by using such a keyword, character information indicating the working situation can be produced.

Various other modifications will be apparent and can be readily made by those skilled in the art without departing from the scope and spirit of this invention. Accordingly, It is not intended that the scope of the claims appended hereto be limited to the description as set forth herein, but rather that the claims be broadly construed.

What is claimed is:

1. A working situation management apparatus comprising:

input means for inputting information relating to working;

detecting means for detecting an occurrence of predetermined change in the input information;

producing means for producing information indicating a time at which the predetermined change occurs and information specifying the predetermined change, in accordance with the detected predetermined change; and storing means for storing the information indicating a time at which the predetermined change occurs and the information specifying the predetermined change, as working situation.

2. A working situation management apparatus according to claim 1, wherein the input means includes a camera which produces, in accordance with an operation by a user, a camera operation signal indicating the operation, and wherein the detecting means includes camera operation detecting means for receiving the camera operation signal and for detecting an occurrence of predetermined operation of the camera based on the camera operation signal.

3. A working situation management apparatus according to claim 1, wherein the input means includes a plurality of video channels, and wherein the detecting means includes video channel change detecting means for detecting a change from a certain video channel to another video channel.

4. A working situation management apparatus according to claim 1, wherein the input means includes video information input means for inputting video information, and wherein the detecting means includes video scene change detecting means for detecting a change of video scene based on the video information.

5. A working situation management apparatus according to claim 1, wherein the input means includes voice information input means for inputting voice information, and wherein the detecting means includes voice information change detecting means for dividing the voice information into a sound portion and a no sound portion, and for detecting a change from the no sound portion to the sound portion of the voice information.

6. A working situation management apparatus according to claim 1, wherein the detecting means includes window information detecting means for detecting a change in window information.

7. A working situation management apparatus according to claim 1, wherein the detecting means includes indication information detecting means for detecting a change in indication information.

8. A working situation management apparatus according to claim 1, wherein the detecting means includes means for detecting an occurrence of at least one of any combinations of change in video information, change in voice information, change in window information, and change in indication information.

9. A system including a plurality of terminal devices and a working situation management apparatus which is connected to the plurality of terminal devices via a network, wherein each of the plurality of terminal devices includes input means for inputting information relating to working, and transmitting means for transmitting the input information to the working situation management apparatus, and wherein the working situation management apparatus includes:

receiving means for receiving the information from each of the plurality of terminal devices;

detecting means for detecting an occurrence of predetermined change in the received information;

producing means for producing information indicating a time at which the predetermined change occurs and information specifying the predetermined change, in accordance with the detected predetermined change; and storing means for storing the information indicating a time at which the predetermined change occurs and the information specifying the predetermined change, as working situation.

10. A working situation management apparatus comprising:

storing means for storing working situation information, the working situation information representing time-series information indicating progress of working;

time zone specifying means for specifying a time zone to which a keyword is to be attached as a function of the working situation information stored in the storing means, the specified time zone being within a time period during which the progress of working occurs;

keyword candidate specifying means for specifying at least one keyword candidate for the time zone specified by the time zone specifying means, wherein the keyword candidate specifying means specifies the at least one keyword candidate as a function of the progress of working; and keyword determining means for selecting one keyword candidate from the at least one keyword candidate in accordance with a predetermined rule, and for determining the selected keyword candidate as a keyword corresponding to the time zone.

11. A working situation management apparatus according to claim 10, wherein the working situation is information identifying a sound portion and a no sound portion included in voice information generated in the working, and wherein the time zone specifying means specifies only a time zone which corresponds to the sound portion as a time zone to which a keyword is to be attached.

12. A working situation management apparatus according to claim 10, wherein the working situation information is information indicating a time zone in which a window for displaying material information is assumed to be specifically viewed by a user, and wherein the time zone specifying means specifies only the time zone in which the window is assumed to be specifically viewed by the user as a time zone to which a keyword is to be attached.

13. A working situation management apparatus according to claim 10, wherein the working situation information is information indicating a time zone in which indication information to a window for displaying material information is generated, and wherein the time zone specifying means specifies only the time zone in which the indication information to the window is generated as a time zone to which a keyword is to be attached.

14. A working situation management apparatus according to claim 10, wherein the working situation information includes at least one of information identifying a sound portion and a no sound portion included in voice information generated in the working, information indicating a time zone in which a window for displaying material information is assumed to be specifically viewed by a user, and information indicating a time zone in which indication information to the window is generated, and wherein the time zone specifying means specifies only a time zone which is determined based on at least one of the time zone corresponding to the sound portion, the time zone in which the window is assumed to be specifically viewed by the user, and the time zone in which the indication information to the window is generated, as a time zone to which a keyword is to be attached.

15. A working situation management apparatus according to claim 10, wherein the keyword candidate specifying means includes;

difference information storing means for, when material information including character information capable of being edited is used in the working, storing difference information representing a difference between first character information in the material information at a first time in the working and second character information in the material information at a second time in the working; and document keyword extracting means for extracting the at least one keyword candidate from the difference information stored in the difference information storing means.

16. A working situation management apparatus according to claim 10, wherein the keyword candidate specifying means includes:

positional information storing means for storing positional information indicating a position of character information indicated by a user in the working, when material information including character information is used in the working; and indicated keyword extracting means for extracting the at least one keyword candidate from the material information, based on the positional information stored in the positional information storing means.

17. A working situation management apparatus according to claim 10, wherein the keyword candidate specifying means includes:

title storing means for, when material information is displayed on a window having a portion in which a title is displayed in the working, storing the title; and title keyword extracting means for extracting the at least one keyword candidate from the title stored in the title storing means.

18. A working situation management apparatus according to claim 10, wherein the keyword candidate specifying means includes:

personal information storing means for, when material information is displayed on a window having a portion in which personal information is displayed in the working, storing the personal information; and personal information keyword extracting means for extracting the at least one keyword candidate from the personal information stored in the personal information storing means.

19. A working situation management apparatus according to claim 10, wherein the keyword candidate specifying means includes:

voice recognizing means for recognizing voice information produced in the working, and for producing character information corresponding to the voice information;

voice recognized information storing means for storing the character information corresponding to the voice information; and voice keyword extracting means for extracting the at least one keyword candidate from the character information stored in the voice recognized information storing means.

20. A working situation management apparatus according to claim 10, wherein the keyword candidate specifying means includes:

keyword candidate input means for receiving character information input by a user, and for specifying the received character information as a keyword candidate.

21. A working situation management apparatus according to claim 10, wherein the predetermined rule includes a rule for determining a keyword based on an evaluation value associated with an occurrence ratio of a keyword.

22. A working situation management apparatus according to claim 10, wherein the predetermined rule includes a rule for defining which one of a plurality of keywords which are assigned to a conflicting interval.

23. A working situation management apparatus comprising:

storing means for storing working situation information representing timeseries information indicating progress of working;

retrieval keyword input means for inputting a retrieval keyword from a user, the retrieval keyword being related to the progress of working;

retrieving means for retrieving at least a portion of the working situation information stored in the storing means, based on the input retrieval keyword;

retrieval keyword storing means for storing the input retrieval keyword and a retrieved result; and retrieval keyword evaluating means for evaluating whether the retrieval keyword is proper according to a predetermined criteria, based on the retrieved result.

24. A working situation management apparatus according to claim 23, wherein the retrieval keyword evaluating means evaluates the retrieval keyword, based on at least how many times the retrieval keyword is input by the user, and how many times the retrieved result is adopted by the user.

25. A working situation management apparatus comprising:

video information dividing means for dividing first video information into a plurality of first video blocks, and for dividing second video information into a plurality of second video blocks, the first video information and the second video information occurring within a time period; and video block evaluating means for judging whether there are one of the plurality of first video blocks and one of the plurality of second video blocks existing in a certain time zone within the time period, and for, when it is judged that there are one of the plurality of first video blocks and one of the plurality of second video blocks existing in the time zone, determining which one of the video blocks existing in the time zone is preferentially selected in accordance with a predetermined rule, whereby the first video information and the second video information are integrated to produce one unit of video information based on the selected video block.

26. A working situation management apparatus according to claim 25, wherein the predetermined rule includes a rule for determining a video block to be selected, based on the relationship along a time axis between the video blocks existing in the time zone.

27. A working situation management apparatus according to claim 25, wherein the predetermined rule includes a rule for determining a video block to be selected, based on a change of working situation.

\* \* \* \* \*

UNITED STATES PATENT AND TRADEMARK OFFICE
CERTIFICATE OF CORRECTION

PATENT NO. : 5,546,598
DATED : August 13, 1996
INVENTOR(S) : Takao Yamaguchi, et al.

It is certified that error appears in the above-indentified patent and that said Letters Patent is hereby corrected as shown below:

Claim 11, line 2, after "working situation" insert --information--.

Signed and Sealed this

First Day of July, 1997

Attest:

BRUCE LEHMAN

Attesting Officer

Commissioner of Patents and Trademarks